US010620868B1

(12) United States Patent
Akaike et al.

(10) Patent No.: US 10,620,868 B1
(45) Date of Patent: Apr. 14, 2020

(54) STORAGE SYSTEM AND DATA TRANSFER METHOD

(71) Applicant: Hitachi, Ltd., Chiyoda-ku, Tokyo (JP)

(72) Inventors: Hirotoshi Akaike, Tokyo (JP); Koji Hosogi, Tokyo (JP); Norio Shimozono, Tokyo (JP); Sadahiro Sugimoto, Tokyo (JP); Nobuhiro Yokoi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/573,815

(22) Filed: Sep. 17, 2019

(30) Foreign Application Priority Data

Mar. 22, 2019  (JP) .................................. 2019-054919
Aug. 6, 2019  (JP) .................................. 2019-144572

(51) Int. Cl.
*G06F 3/06* (2006.01)
*G06F 12/1009* (2016.01)

(52) U.S. Cl.
CPC .......... *G06F 3/0647* (2013.01); *G06F 3/0604* (2013.01); *G06F 3/067* (2013.01); *G06F 3/0665* (2013.01); *G06F 12/1009* (2013.01); *G06F 2212/657* (2013.01)

(58) Field of Classification Search
CPC ........ G06F 3/06; G06F 3/0647; G06F 3/0604; G06F 3/0665; G06F 3/061; G06F 3/067; G06F 3/0607; G06F 3/0635; G06F 3/0658; G06F 3/0683; G06F 3/0689; G06F 3/688; G06F 3/0659; G06F 3/619; G06F 12/08; G06F 12/16; G06F 12/1009; G06F 12/0638; G06F 12/0875; G06F 2212/657; G06F 2212/222; G06F 2212/2228

USPC .......................................................... 711/154
See application file for complete search history.

(56) References Cited

U.S. PATENT DOCUMENTS

| | | | | |
|---|---|---|---|---|
| 7,607,035 B2 * | 10/2009 | Kano | .................. | G06F 11/0727 714/6.12 |
| 9,800,661 B2 | 10/2017 | Ori | | |
| 2006/0015697 A1 * | 1/2006 | Morishita | ............. | G06F 3/0607 711/162 |
| 2013/0275802 A1 * | 10/2013 | Endo | .................. | G06F 11/1076 714/6.23 |
| 2014/0164728 A1 * | 6/2014 | Ouchi | ..................... | G06F 12/02 711/170 |
| 2014/0189204 A1 * | 7/2014 | Sugimoto | ............... | G06F 3/061 711/103 |
| 2015/0052276 A1 * | 2/2015 | Klughart | ............... | G06F 3/0608 710/301 |
| 2015/0317093 A1 * | 11/2015 | Okada | .................. | G06F 3/0659 711/119 |
| 2016/0179420 A1 * | 6/2016 | Mei | ..................... | G06F 11/1402 711/162 |

(Continued)

*Primary Examiner* — Mano Padmanabhan
*Assistant Examiner* — Jean C Edouard
(74) *Attorney, Agent, or Firm* — Procopio, Cory, Hargreaves & Savitch LLP

(57) ABSTRACT

A storage system includes at least one drive chassis connected to at least one host computer via a first network, and a storage controller connected to the drive chassis, in which the storage controller instructs the drive chassis to create a logical volume, and the drive chassis creates a logical volume according to an instruction from the storage controller, provides a storage area of the storage system to the host computer, and receives an IO command from the host computer to the storage area of the storage system.

19 Claims, 35 Drawing Sheets

(56) References Cited

U.S. PATENT DOCUMENTS

2016/0210073 A1\* 7/2016 Muroyama ............ G06F 3/0625
2017/0123679 A1\* 5/2017 Yoshii ........................ G06F 3/06
2017/0262184 A1\* 9/2017 Yamada .................. G06F 11/20

\* cited by examiner

FIG. 8

| IO PATTERN 800 | | CACHE HIT 801 | CACHE MISS 802 |
|---|---|---|---|
| DATA TRANSFER LENGTH <= THRESHOLD | READ | NORMAL | NORMAL |
| | WRITE | NORMAL | NORMAL |
| DATA TRANSFER LENGTH > THRESHOLD | READ | NORMAL | DIRECT TRANSFER |
| | WRITE | NORMAL | NORMAL |

| | |
|---|---|
| COMMAND IDENTIFIER | 911 |
| COMMAND TYPE | 912 |
| NID (namespace ID) | 913 |
| START ADDRESS | 914 |
| DATA TRANSFER LENGTH | 915 |
| MEMORY ADDRESS | 916 |
| R_key | 917 |

FIG. 9B

| QUEUE NUMBER 921 | HOST NQN 922 | NVM Subsystem NQN 923 |
|---|---|---|
| QID1 | NQN#H1 | NQN#C1S1 |
| ⋮ | ⋮ | ⋮ |

| DRIVE AREA NUMBER 931 | ENC NUMBER 932 | NVM Subsystem NQN 933 | NID (namespace ID) 934 |
|---|---|---|---|
| Drive1 | ENC1 | NQN#E1D1 | NID1 |
| ⋮ | ⋮ | ⋮ | ⋮ |

| | |
|---|---|
| COMMAND IDENTIFIER | 908 |
| HOST NQN | 901 |
| MEMORY ADDRESS | 902 |
| R_key | 903 |
| DATA TRANSFER DIRECTION | 909 |
| NVM Subsystem NQN (IDENTIFIER OF NVMe DRIVE) | 904 |
| NID (namespace ID) | 905 |
| START ADDRESS | 906 |
| DATA TRANSFER LENGTH | 907 |

FIG. 22

| QUEUE NUMBER 2201 | HOST NQN 2202 | NVM Subsystem NQN 2203 |
|---|---|---|
| QID1 | NQN#H1 | NQN#C1S1 |
| : | : | : |

| | |
|---|---|
| COMMAND IDENTIFIER | 2211 |
| HOST NQN | 2212 |
| ENC NUMBER | 2213 |
| ENC MEMORY ADDRESS | 2214 |
| NVM Subsystem NQN | 2215 |
| COMMAND TYPE | 2216 |
| NID (namespace ID) | 2217 |
| START ADDRESS | 2218 |
| DATA TRANSFER LENGTH | 2219 |
| MEMORY ADDRESS | 2220 |
| R_key | 2221 |

FIG. 36A

| LOGICAL-PHYSICAL ADDRESS | DRIVE AREA NUMBER | DRIVE ADDRESS |
|---|---|---|
| ... | | |
| 20480 | Drive1 | 10240 |
| 21504 | Drive2 | 10240 |
| ... | | |

FIG. 36B

| DRIVE GROUP NUMBER | DATA PROTECTION SYSTEM | DRIVE CONFIGURATION |
|---|---|---|
| 0 | RAID5 (3D+1P) | Drive0, Drive1, Drive2, Drive3 |
| 1 | RAID6 (6D+2P) | Drive4, Drive5, Drive6, Drive7, Drive8, Drive9, Drive10, Drive11 |
| 2 | MIRRORING | Drive 12, Drive 13 |
| ... | | |

STORAGE SYSTEM AND DATA TRANSFER METHOD

BACKGROUND OF THE INVENTION

1. Field of the Invention

The present invention relates to an information processing system, a storage system, and a data transfer method, and is suitably applied to, for example, a system equipped with a flash drive.

2. Description of Related Art

In the related art, a drive box of a storage system used to be just a bunch of disks (JBOD), and the mainstream is one in which a SAS/SATA drive is mounted in a drive slot and which can be connected to a serial attached SCSI (SAS) network as an external I/F. SAS is a communication I/F that occupies a bus in connection units and is suitable fora large number of drive connections. However, SAS has high connection processing overhead and is not suitable for performance improvement. In addition, even in JBOD that supports the NVMe (Registered Trademark) protocol for high-speed SSDs, since a storage controller of the storage system and the JBOD are configured to be directly connected by PCI Express (PCIe) (Registered Trademark), the drive connection has a low scalability, and the storage system cannot be connected with a large number of drives. Recently, with the advancement of performance of flash drives such as SSDs, a fabric-attached bunch of flash (FBOF) having high-performance I/F is emerging as an alternative to JBOD. FBOF can be connected to high-performance networks such as Ethernet (Registered Trademark) and Infiniband (Registered Trademark) and is characterized by being compatible with NVMe over Fabrics (NVMeoF). NVMeoF is a technical standard that can use the NVMe protocol on a network. Under such a background, high-speed data transfer in the storage system and high scalability in the drive connection by network connection are required for the higher performance of the SSD.

Problems of Data Transfer Bandwidth in Storage of Related Art

In the storage of related art, host computers are connected to a front-end (hereinafter abbreviated as FE) network of the storage, the drive boxs are connected to a back-end (hereinafter abbreviated as BE) network which is independent of the front-end network. FE networks are mainly fibre channel (FC) (Registered Trademark) networks or Ethernet network, and BE networks are mainly SAS networks. When the storage controller receives a command from the host computer, for example, in the case of a read command, the storage controller reads data from the drive in the drive box and transfers data to the host computer. By changing the BE network of the storage to a network compatible with FBOF's high-performance I/F, there is an advantage that the data transfer bandwidth of the BE network can be expanded compared to a SAS network. However, since the data transfer path described above has not changed from the past and the storage controller transfers data to the host computer in a conventional manner, there is a problem that even if a plurality of FBOFs are connected, the data transfer bandwidth of the storage controller becomes a bottleneck and the performance of FBOF cannot be enhanced.

Method for Realizing High-Speed Data Transfer

In recent years, host computers and storages are mainly based on Ethernet network, and as in the FBOF, the NVMe over Fabrics standard is supported. Since FBOF has an interface that can connect to Ethernet network and supports the NVMe over Fabrics standard, in the FE network of the storage, direct data transfer (hereinafter, referred to as direct transfer) can be performed between the host computer and the FBOF without data passing through the storage controller. This direct transfer can eliminate the performance bottleneck of the storage controller and realize high-speed data transfer.

Problem of Realizing Direct Transfer

There are the following two problems in realizing direct transfer.

(Problem 1) With regard to a logical volume provided by a storage system, an address space viewed from a host computer is different from an address space of a drive in the FBOF, and the host computer cannot identify in which address of the drive in the FBOF desired data is stored.

(Problem 2) In the case of improving data access by using a cache of the storage system, when there is new data in the cache, it is necessary to read the data from the storage cache, but the host computer cannot determine the presence or absence of the new data in the cache.

For such problems, for example, U.S. Pat. No. 9,800,661 discloses an invention in which agent software operating on the host computer inquires about the drive in the FBOF corresponding to the access destination data of the host computer and the address thereof to the storage controller to access the drive in the FBOF directly based on the obtained information.

In the invention disclosed in U.S. Pat. No. 9,800,661, while the host computer can directly access the drive of the FBOF, Agent software has to perform calculations for data protection such as RAID, and there is a problem that the host computer side is subject to computational load for performing highly reliable processing.

In addition, there is a problem that exclusive control over the network is required to avoid the competition between the operation of a program product (functions of the storage device) such as Snapshot and Thin Provisioning that operate on the storage controller and the operation of the Agent software, and therefore, the performance is degraded.

SUMMARY OF THE INVENTION

The present invention has been made in consideration of the above points, and an object thereof is to propose an information processing system, a storage system, and a data transfer method for realizing high-speed data transfer by direct transfer from FBOF without introducing special software for processing storage data such as Agent software into a host computer.

Another object of the present invention is to propose an information processing system, a storage system, and a data transfer method that can provide data protection and program product functions by a storage device and realize high-speed data transfer by direct transfer from FBOF.

In order to solve such problems, one aspect of the information processing system of the present invention is a storage system which includes at least one drive chassis having a storage unit, and a storage controller connected to the drive chassis, and is connected to the host computer via a network, in which the drive chassis creates a logical volume having a specified identification name according to an instruction from the storage controller, provides the logical volume to the host computer as a storage area, receive a first command issued from the host computer to the drive chassis providing logical volumes, and transmits a second command corresponding to the first command to the storage controller, the storage controller transmits a response to the second command to the drive chassis, the drive chassis transmits a response to the first command to the host computer according to the response to the second command when receiving the response to the second command from the storage controller, and the logical volume corresponds to a data storage area where the storage controller protects data.

According to the present invention, it is possible to realize an information processing system, a storage system, and a data transfer method capable of constructing a highly reliable and high-performance information processing system.

BRIEF DESCRIPTION OF THE DRAWINGS

FIG. 8 is a diagram illustrating data transfer conditions used in determining a transfer method;

FIG. 9A is a diagram illustrating the format of a host command;

FIG. 9B is a diagram illustrating a host information table of the storage controller;

FIG. 9C is a diagram illustrating a drive information table;

FIG. 9D is a diagram illustrating the format of an offload command;

FIG. 22 is a diagram illustrating a host information table of the drive enclosure;

FIG. 23 is a diagram illustrating the format of an enclosure command;

FIG. 36A is a diagram illustrating an example of an address conversion table; and FIG. 36B is a diagram illustrating an example of a data protection drive group table.

DESCRIPTION OF EMBODIMENTS

Figure 1:
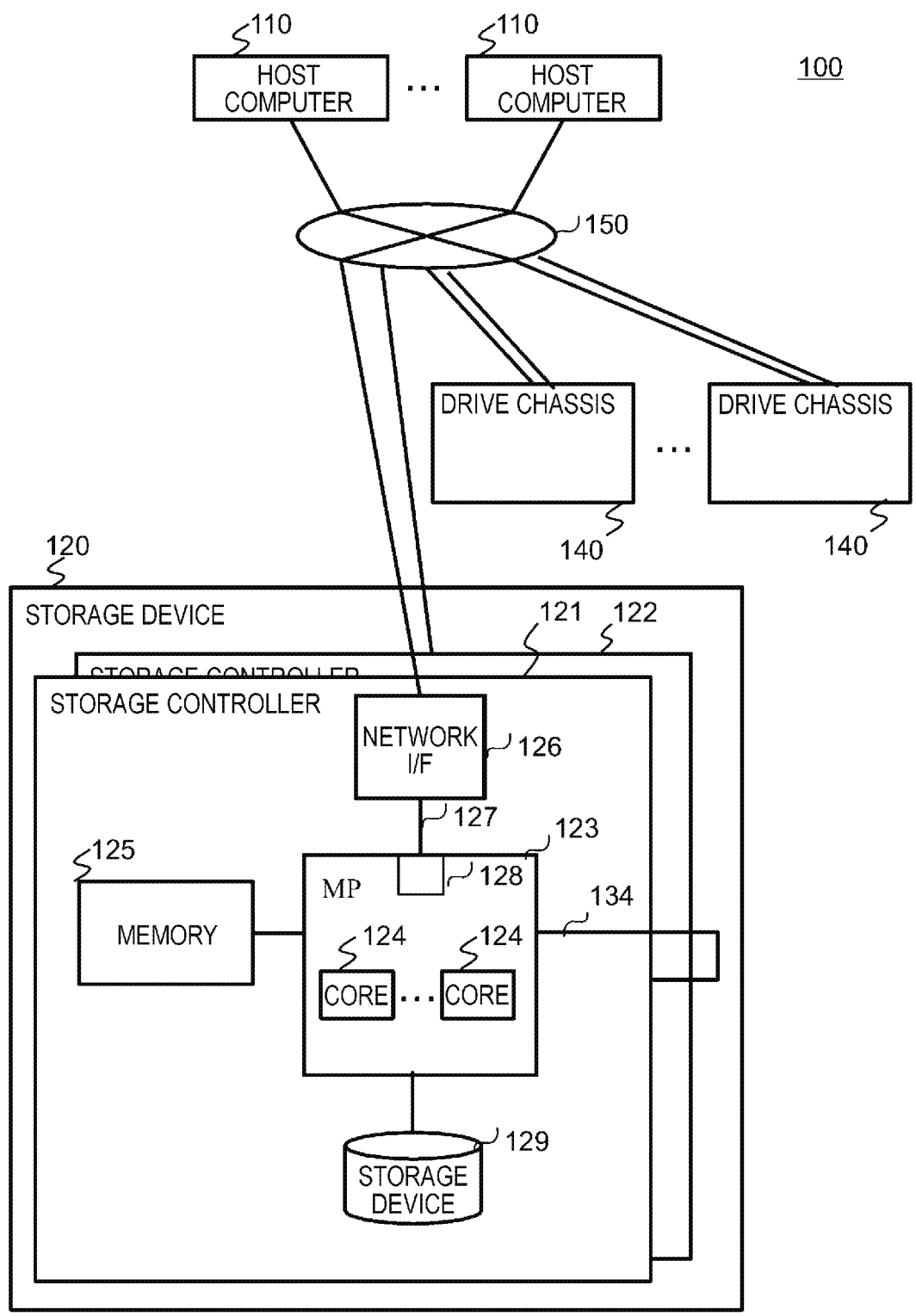
FIG. 1 is a configuration diagram of an information processing system of Example 1.

Hereinafter, embodiments of the present invention will be described with reference to drawings. The following description and the drawings are examples for describing the present invention, and omissions and simplifications are made as appropriate for clarification of the description. The invention can also be implemented in various other forms. Each component may be singular or plural unless specifically limited.

In the following description, various types of information may be described by using expressions such as "table", "list", and "queue", but various types of information may be expressed by using other data structures. In describing the identification information, expressions such as "identification information", "identifier", "name", "ID", "number", and the like are used, but can be mutually replaced.

When there are a plurality of components having the same or similar functions, basically the same reference numerals will be given and described.

In addition, in the following description, processing may be executed by executing a program, but the program is executed by a processor which is a central processing unit (for example, CPU), and a processing subject may be a processor in order to perform predetermined processing while using a storage resource (for example, memory) and/or an interface device (for example, communication port) as appropriate.

The program may be installed on a device such as a computer from a program source. The program source may be, for example, a program distribution server or a computer readable storage medium. When the program source is a program distribution server, the program distribution server may include a processor and a storage resource for storing a distribution target program, and the processor of the program distribution server may distribute the distribution target program to another computer. In addition, in the following description, two or more programs may be realized as one program, or one program may be realized as two or more programs.

SUMMARY OF INVENTION

FBOF transfers (directly transfers) data read from a drive of a storage system to a host computer based on data transfer information provided from a storage controller. The data transfer information includes the drive in the FBOF and the address in the drive corresponding to the address of a logical volume specified in a read command from the host computer. The above-described correspondence relationship between the logical volume address, and the drive in the FBOF and the address in the drive is derived by a storage device based on configuration information. The storage controller may be denoted as CTL in the drawings. In addition, the storage controller may be called a storage device, as opposed to a storage system that includes drives.

When the storage controller receives a command from the host computer, the data transfer information includes information such as the address of the data storage destination of the host computer. For a storage controller equipped with a cache, the storage controller performs a cache hit/miss determination and transfers data to the host computer for the data hit in the cache, and the FBOF transfers data to the host computer for the data missed in the cache.

According to the storage device and the data transfer method of the present embodiment, the read IO performance can be improved and the latency can be reduced (response performance can be improved) by directly transferring data between the FBOF and the host computer without using the communication I/F of the storage controller and cache control or buffers. Furthermore, for read IO performance, performance scaling can be expected by adding FBOFs.

Example 1

An embodiment of the present invention will be described below in detail with reference to the drawings.

(1) Configuration of Information Processing System of Example 1

FIG. 1 is a configuration diagram of an information processing system of Example 1. FIG. 1 illustrates the configuration of an information processing system according to a form (Connection Form 1: Example 1, Example 2, Example 3, Example 5, Example 7, and Example 9) in which a drive chassis is connected to the same network as a host computer and a storage controller.

An information processing system 100 includes one or a plurality of host computers 110, a storage device 120, and a drive chassis 140, which are configured to be mutually connected via a network 150 such as a local area network (LAN) or the Internet. The drive chassis 140 is FBOF. The drive chassis is sometimes referred to as an ENC or a drive enclosure in the context of drawing notation. The storage device 120 and the drive chassis 140 constitute a storage system. The network 150 is, for example, a high-performance network such as Ethernet or Infiniband and supports NVMe over Fabrics (NVMeoF).

The host computer 110 is a computer device provided with information resources such as a central processing unit (CPU) and a memory, and is, for example, an open system server, a cloud server, or the like. The host computer 110 transmits a write command or a read command to the storage device 120 via the network 150 in response to a user operation or a request from an installed program.

The storage device 120 is a device in which necessary software for providing the host computer 110 with a function as storage is installed and is configured from redundant storage controllers 121 and 122. The storage controller 121 includes a microprocessor 123, a memory 125, a front-end interface (network I/F) 126, and a storage unit 129. The storage controller 122 has the same configuration as the storage 121.

The microprocessor 123 is hardware that controls the operation of the entire storage controller 121 and includes one or a plurality of processor cores 124. Each processor core 124 reads and writes data on the corresponding drive chassis (FBOF) 140 in response to a read command and a write command given from the host computer 110.

The memory 125 is configured from, for example, a semiconductor memory such as a synchronous dynamic random-access memory (SDRAM) and is used to store and hold necessary programs (including an operating system (OS)) and data. The memory 125 is a main memory of the microprocessor 123 and stores a program (storage control program or the like) executed by the microprocessor 123, a management table to which the microprocessor 123 refers, and the like. In addition, the memory 125 is also used as a disk cache (cache memory) of the storage controller 121.

The processor core 124 of the microprocessor 123 executes the programs (programs illustrated in FIGS. 3, 14, and 23) stored in the memory 125 to execute various processing for providing the host computer 110 with storage functions. However, in the following, for ease of understanding, the description will be made assuming that such a program is executed by the microprocessor 123.

A network I/F 126 is an interface to the host computer 110 and performs protocol control at the time of communication with the host computer 110 via the network 150.

The storage unit 129 stores an OS, a storage control program, a backup of a management table, and the like. The storage unit 129 is, for example, an HDD or a solid-state drive (SSD).

Since the storage controller 122 has the same internal configuration as the storage controller 121, the illustration thereof is omitted. The storage controller 121 and the storage controller 122 are connected with an inter-microprocessor (inter-MP) I/F 134 such as a nontransparent bridge and the like, and user data and control information including storage configuration information is communicated. The operation of the storage controller 122 is also the same as that of the storage controller 121, and only the storage controller 121 will be described hereinafter unless otherwise noted for the sake of simplicity of the description.

(2) Configuration of Drive Chassis

Figure 2:
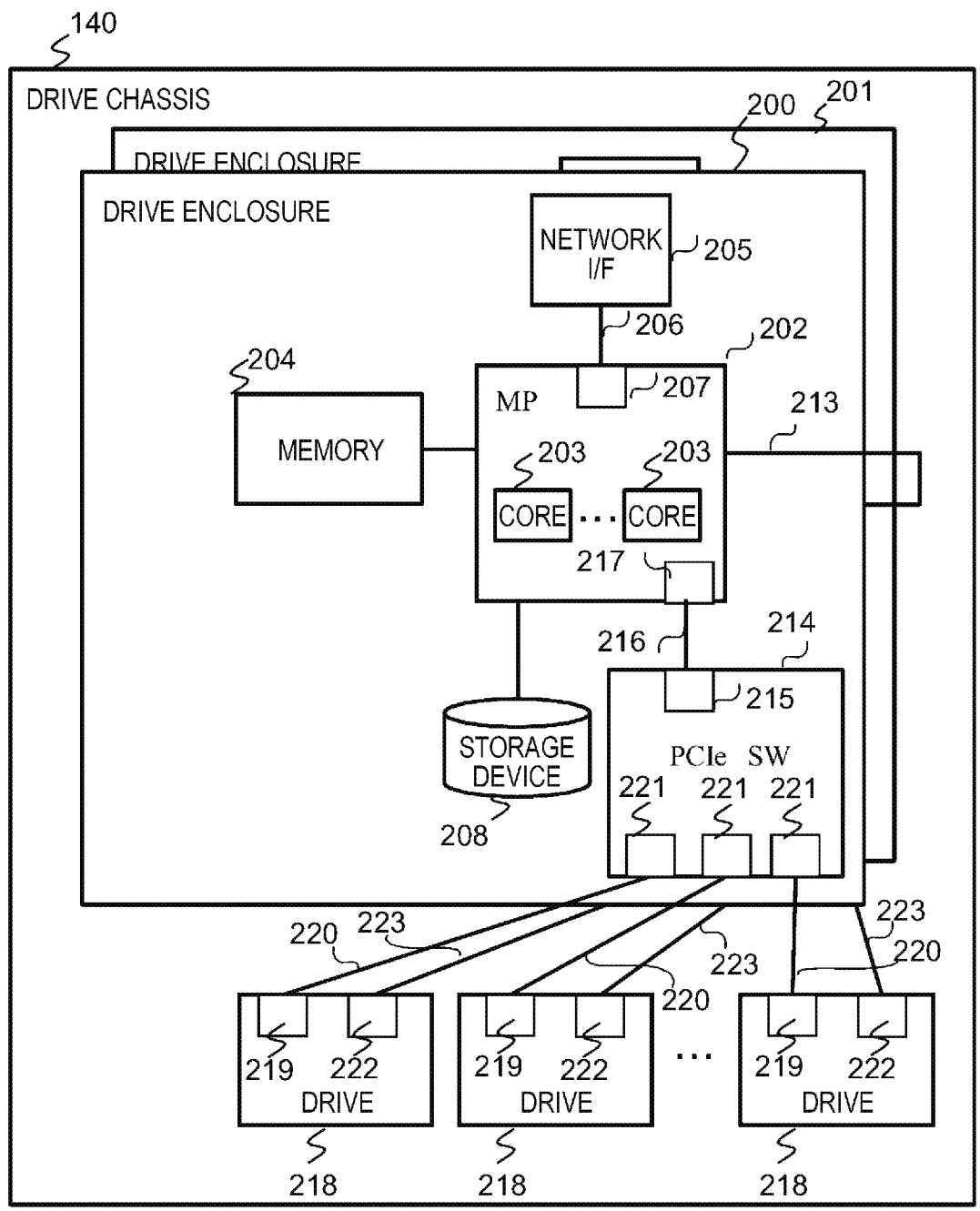
FIG. 2 is a configuration diagram of a drive chassis of Example 1.

FIG. 2 is a configuration diagram of the drive chassis. The drive chassis 140 is a device on which necessary software is installed to provide control of the drive and a function of reading and writing data from and to the drive, which is the storage unit, from remote initiators. In addition, the drive chassis is configured from redundant drive enclosures 200 and drive enclosures 201, one or a plurality of drives 218. Redundancy of drive enclosures is desirable in order to improve the availability and reliability of the drive chassis, but not necessarily required. The drive chassis may be configured from a single drive enclosure without redundancy.

The drive enclosure 200 includes a microprocessor 202, a memory 204, a network I/F 205, a PCIe switch 214, and a storage unit 208. The drive 218 is a dual-port NVMe drive and includes PCIe connection ports 219 and 222. The PCIe connection ports 219 and 222 are connected to a PCIe connection port 221 of the PCIe SW (Switch) 214 of the drive enclosure 200 and a PCIe connection port 221 of the PCIe SW 214 of the drive enclosure 201 with PCIe links 220 and 223, respectively. The drive 218 is a storage unit that constitutes a storage area of the storage system and stores data from the host computer. The drive 218 needs not necessarily be an NVMe drive, and may be, for example, a SAS drive or a SATA drive. In addition, the drive 218 needs not necessarily be a dual-port, but may be a single port.

The microprocessor 202 is hardware that controls the operation of the entire drive enclosure 200 and includes one or a plurality of processor cores 203. Each processor core 203 reads and writes data from and to the corresponding drive 218 in response to a read command and a write command given from the storage device 120, and also performs data transfer with the host computer 110 in response to a data transfer command given from the storage device 120.

In addition, the memory 204 is configured from, for example, a semiconductor memory such as a synchronous dynamic random-access memory (SDRAM), is used to store and hold necessary programs (including an operating system (OS)) and data, and is also used as a cache memory.

The memory 204 is a main memory of the microprocessor 202 and stores a program (drive enclosure control program and the like) executed by the microprocessor 202, a management table to which the microprocessor 202 refers, and the like. The processor core 203 of the microprocessor 202 executes the program stored in the memory 204 to execute various processing for providing the storage device 120 and the host computer 110 with the drive enclosure function including the FBOF. However, in the following, for ease of understanding, the description will be made assuming that such a program is executed by the microprocessor 202.

PCIe ports 215 of the network I/F 205 and the PCIe SW 214 are connected to a PCIe port 207 and a PCIe port 217 of the microprocessor 202 with PCIe links 206 and 216, respectively.

The storage unit 208 stores an OS, a drive enclosure control program, a backup of a management table, and the like. The storage unit 208 is, for example, an HDD or an SSD.

Since the drive enclosure 201 has the same internal configuration as the drive enclosure 200, the illustration thereof is omitted. The drive enclosure 200 and the drive enclosure 201 are connected with an inter-MP I/F 213 such as a non transparent bridge and the like, and user data and control information including drive enclosure configuration information are communicated. The operation of the drive enclosure 201 is also the same as that of the drive enclosure 200, and only the drive enclosure 200 will be described hereinafter unless otherwise noted for the sake of simplicity of the description.

Figure 3:
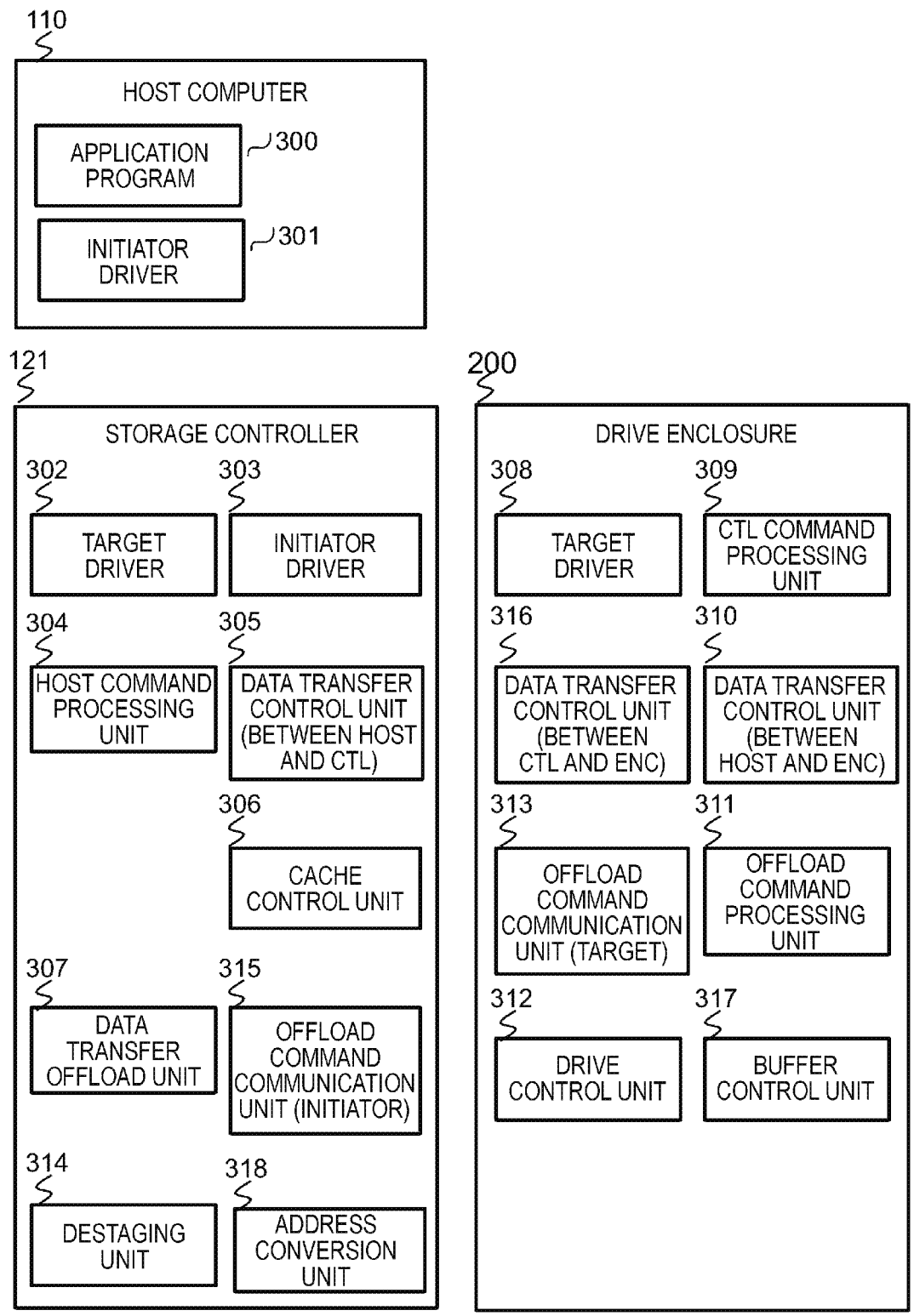
FIG. 3 is a configuration diagram of programs in a host computer, a storage controller, and a drive enclosure of Example 1.

(3) Program Configuration of Host Computer, Storage Controller, and Drive Enclosure FIG. 3 is a diagram of the configuration of a program directly involved in Example 1 in the host computer, the storage controller, and the drive enclosure of Example 1, and illustrates a form in which the storage controller operates as a target of NVMe over Fabrics with respect to the host computer (Target Configuration Form 1: Example 1, Example 2, and Example 9).

The program of the host computer 110 is configured with an application program 300, an initiator driver 301, and an operating system (OS) not illustrated.

The application program 300 is, for example, a program such as a numerical calculation program, a database, and a web service. The initiator driver 301 recognizes a storage area compatible with NVMe over Fabrics (NVMeoF) provided by the target driver and provides the application program with an application I/F of a command such as read or write. In Example 1, the initiator driver 301 of the host computer 110 recognizes the storage area compatible with the NVMeoF provided by a target driver 302 of the storage controller 121 and a target driver 308 of the drive enclosure 200.

The program of the storage controller 121 is configured from the target driver 302, an initiator driver 303, a host command processing unit 304, a data transfer control unit (between the host computer and the storage controller) 305, a cache control unit 306, a data transfer offload unit 307, an offload command communication unit (initiator) 315, a destaging unit 314, an address conversion unit 318, and an OS (not illustrated).

The target driver 302 provides the initiator driver 301 with a storage area compatible with NVMeoF, receives a host command and transmits a completion response of the command.

The initiator driver 303 recognizes a storage area compatible with NVMeoF provided by the target driver 308, transmits a command to the drive enclosure 200, and receives a completion response of the command. A command issued by the storage controller 121 to the drive enclosure 200 is called a controller command.

The host command processing unit 304 receives a command issued by the host computer via the target driver 302, analyzes the command, processes a read command/write command/management command, creates a completion response of the command, and transmits the completion response of the command via the target driver 302, and the like.

The data transfer control unit (between the host computer and the storage controller) 305 performs data transfer processing between the storage controller that supports NVMeoF and the host computer according to an instruction of the host command processing unit 304.

The cache control unit 306 controls a cache hit/miss determination based on cache data search, transition between each state of dirty data (state before writing to a physical drive) and clean data (state after writing to a physical drive), reserve and release of a cache area, and the like. The cache hit/miss determination determines whether or not data responding to an IO command from the host computer exists in the cache memory 204 of the storage controller. For example, if the IO command from the host computer is a read command, it is determined whether or not data responding to the read command exists in the cache memory 204. Each of these cache control processing is a widely known technique, and the detailed description thereof is omitted here.

The data transfer offload unit 307 creates a data transfer offload command (data transfer parameter) and instructs the drive enclosure (200 or 201) to transfer data to the host computer by using the offload command. The offload command communication unit (initiator) 315 transmits an offload command to the drive enclosure and receives a response from the drive enclosure.

The destaging unit 314 performs destaging processing of writing data in the cache to the drive via the initiator driver 303. The address conversion unit 318 has a mapping table of a data range 505 of a namespace 504 managed by the storage controller, and the drive enclosure 200 as a data storage destination, a drive 508 and a storage area 509 in the drive 508 and converts the address of the data range 505 into the corresponding drive enclosure 200, the drive, and the address of the storage area in the drive.

The program of the drive enclosure 200 is configured from the target driver 308, a controller command processing unit 309, a data transfer control unit (between the host computer and the drive enclosure) 310, a data transfer control unit (between the storage controller and the drive enclosure) 316, an offload command communication unit (target) 313, an offload command processing unit 311, a drive control unit 312, a buffer control unit 317, and an OS (not illustrated).

The target driver 308 provides a storage area compatible with NVMeoF to the initiator driver 301 and the initiator driver 303, receives a host command from the host computer, transmits a completion response of the command to the host computer, receives a controller command from the storage controller, and transmits a completion response of the command to the storage controller.

The controller command processing unit 309 receives a command issued by the storage controller by using the target driver 308, and performs analysis of the command, read or write processing, creation of a completion response of the command, transmission of the completion response of the command to the initiator driver 303 via the target driver 308, and the like.

The data transfer control unit (between the host computer and the enclosure) 310 performs data transfer processing between the host computer compatible with NVMeoF and the drive enclosure according to the instruction of the offload command processing unit 311. The data transfer control unit (between the storage controller and the enclosure) 316 performs data transfer processing between the storage controller compatible with NVMeoF and the drive enclosure according to the instruction of the controller command processing unit 309.

The offload command communication unit (target) 313 receives an offload command from the storage controller and transmits a response. The offload command processing unit 311 receives the offload command of data transfer from the storage controller 121, analyzes the offload command, performs the read process, creates a completion response of the offload command, and transmits the completion response of the offload command, and the like.

The drive control unit 312 performs the management of the drive 218, read or write processing on the drive 218 according to the instructions of the controller command processing unit 309 and the offload command processing unit 311. The buffer control unit 317 secures and releases a buffer, which is a temporary memory area for data transfer.

(4) Identification Name of Host Computer and NVM Subsystem in NVMe Over Fabrics

Figure 4:
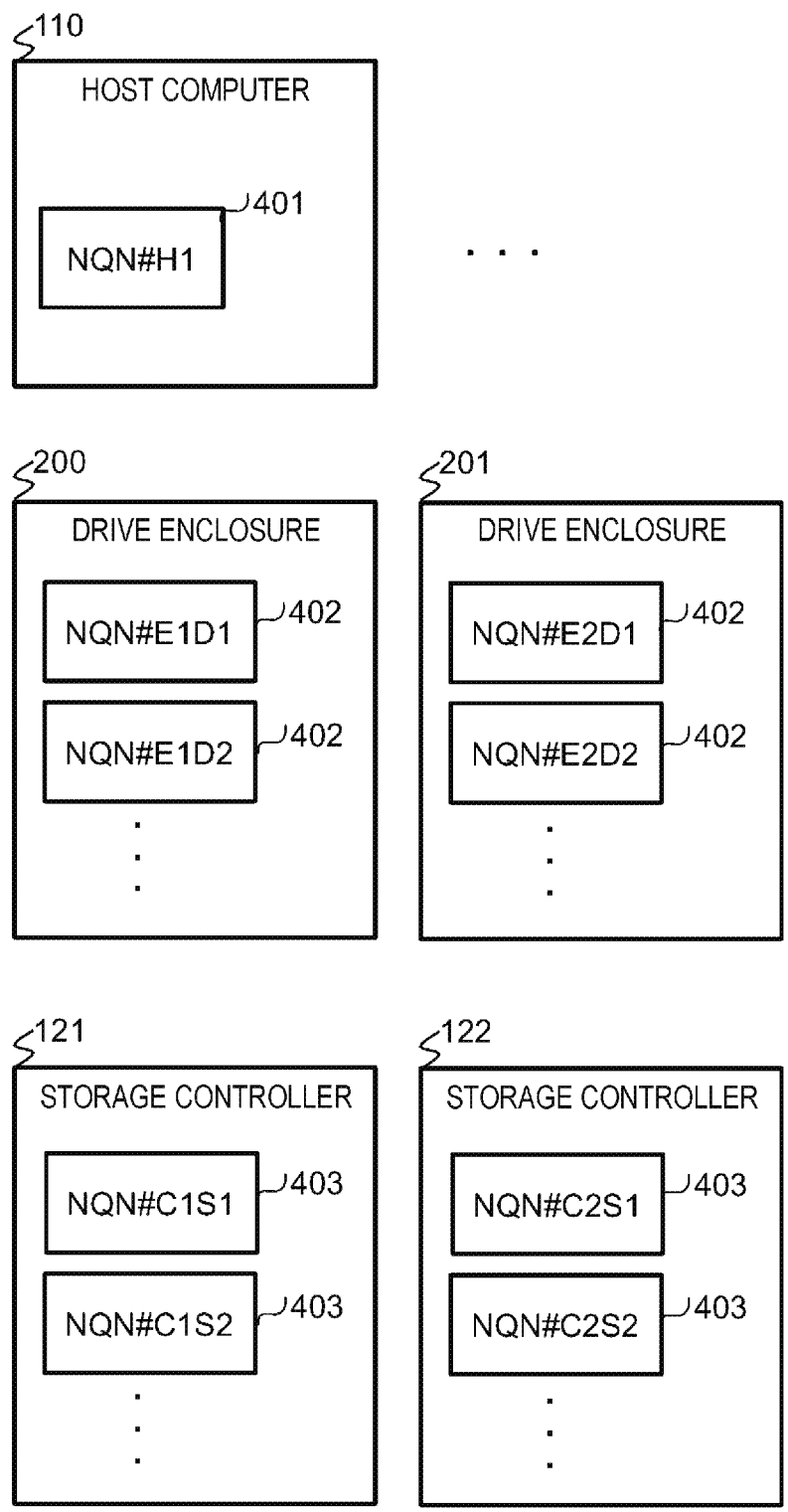
FIG. 4 is a diagram illustrating identification names of a host and an NVM subsystem in NVMe over Fabrics.

FIG. 4 is a diagram illustrating identification names of a host computer and an NVM subsystem in NVMe over Fabrics. That is, FIG. 4 is a diagram illustrating the identification names of the host computer and the NVM Subsystem in the NVMe over Fabrics according to the Target Configuration Form 1.

The identification name is the NVMe qualified name (NQN) of the NVMe over Fabrics standard and is unique within the fabric. The NVM Subsystem is a logical drive having a storage area (called namespace in the NVMe standard) and a function of processing IO commands such as management commands and read/write. The NQN in FIG. 4 is represented by a simplified character string that is not in the format defined by the technical standard, for ease of understanding.

The host computer 110 has at least one identification name 401 (host NQN). Although a plurality of host computers 110 may be used, the illustration is omitted. The drive enclosure 200 has at least one identification name 402 (NVM Subsystem NQN). For example, each drive 218 of the drive chassis 140 has one identification name 402. A drive 218 is a NVMe drive, and has a NVM Subsystem and a plurality of namespaces within the NVM Subsystem. For example, within the NVM Subsystem of the above-described identification name 402, namespaces corresponding to namespaces of a drive 218 are assigned and the drive enclosure 201 provides the storage area to the host computer 110 and the storage device 120. The same applies to the drive enclosure 201, and the description thereof is omitted. Two or more drive enclosures 200 and drive enclosures 201 may be provided, but the description thereof is omitted.

The storage controller 121 has at least one identification name 403 (NVM Subsystem NQN). In the NVM subsystem corresponding to the identification name 403, a logical storage area to which a part of the storage pool is allocated as a namespace. The storage pool is a storage area which is constructed from the storage areas of a plurality of drives 218 and is data protected, for example, with RAID. The above is the same for the NVM Subsystem of the storage controller 122, and the description thereof will be omitted.

After the storage device 120 and the drive chassis 140 are booted up, the drive enclosure 200 (and the drive enclosure 201) creates an NVM subsystem with the above-described identification name 402. The storage controller 121 (and the storage controller 122) sends a connect command to the drive enclosure 200 (and the drive enclosure 201) to enable command transmission and data transfer to the NVM subsystem of the drive enclosure 200 (and the drive enclosure 201) and creates an NVM subsystem having the identification name 403.

The host computer 110 sends a connect command to the storage controller 121 (and the storage controller 122) and the drive enclosure 200 (and the drive enclosure 201) to enable command transmission and data transfer to the NVM subsystem of the storage controller 121 (and the storage controller 122) and the drive enclosure 200 (and the drive enclosure 201).

(5) Address Mapping of User Data

Figure 5:
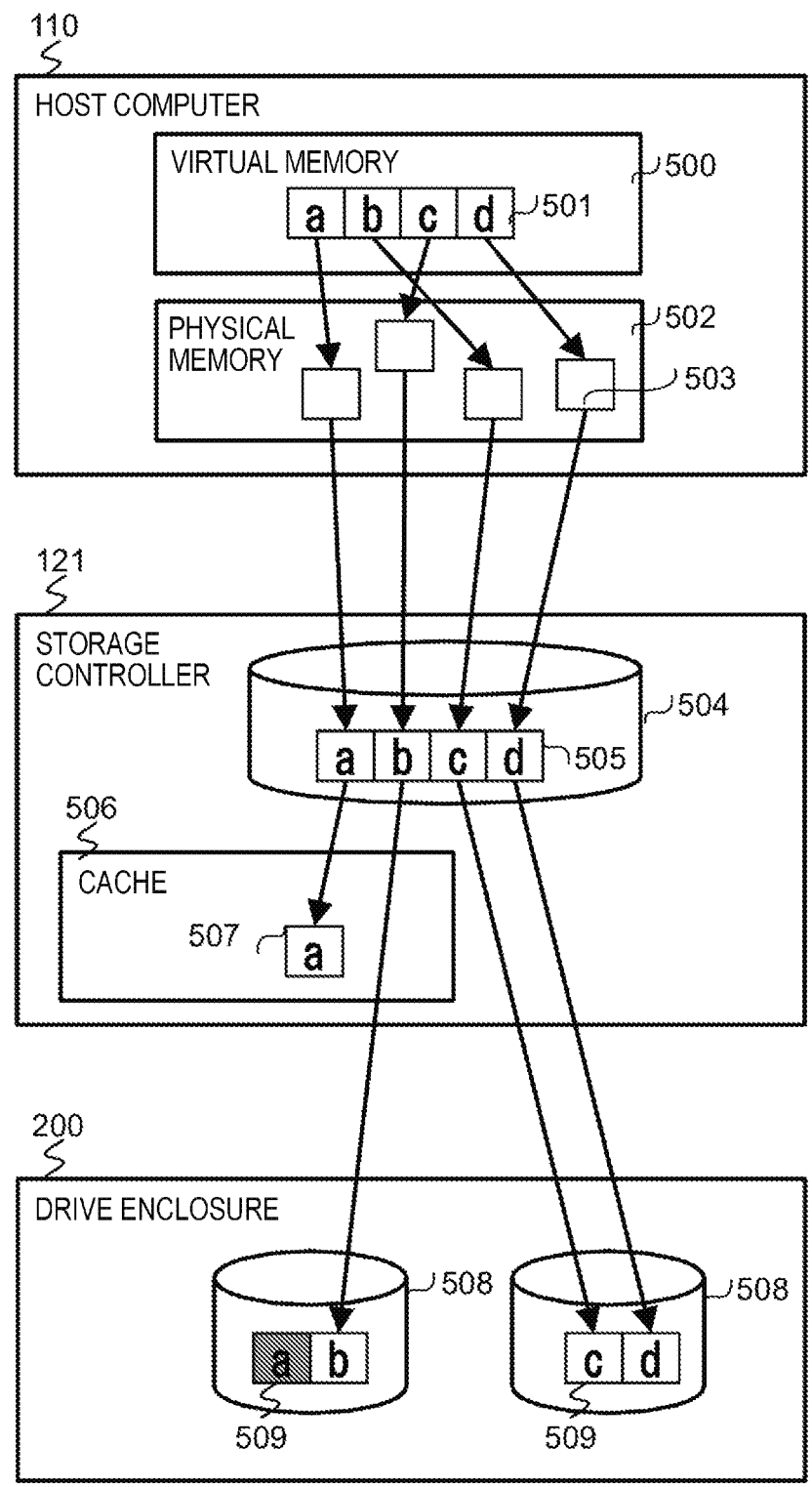
FIG. 5 is a conceptual diagram of address mapping of user data.

FIG. 5 is a conceptual diagram for describing address mapping of user data. That is, FIG. 5 is a conceptual diagram for describing the address mapping of user data.

The host computer 110 includes a continuous virtual memory 500 provided by the OS to the application program, and a physical memory 502 which is an actual data storage destination.

The application program of the host computer 110 secures a virtual memory area 501 as a storage destination of read data in the virtual memory 500 when issuing a read command to the storage controller 121, for example. The virtual memory area 501 corresponds to a physical memory area 503 in the physical memory in page units which are memory management units. The read command issued by the application program 300 to the storage device 120 has fields for specifying the namespace 504 (corresponding to a logical volume in the storage device) as a read target, the address in the namespace 504 corresponding to the data range 505 in the namespace 504, the data transfer length, and information of the physical memory area 503 used for data transfer in the host computer 110.

Data in the data range 505 "a" to "d" is stored in a cache segment 507 which is a cache management unit of a cache 506 in the storage controller 121 or the storage area 509 in the drive 508 connected to the drive enclosure 200. The cache 506 is used to temporarily store data. For example, 64 KB of data can be stored in one cache segment. In Example 1, the cache management unit is described as a cache segment, but one or a plurality of cache segments may be managed in units of cache slots associated with each other.

FIG. 5 illustrates, as an example, a state in which data is written to the "a" location in the data range 505, new data is stored in the cache segment 507, and data in the "a" location of the storage area 509 in the drive 508 become old data. When the data of the cache segment 507 is written to the "a" location of the storage area 509 by the destaging processing of the storage controller 121 to be updated to new data, the cache segment 507 is released to be ready for reuse.

The mapping with the cache segment 507 corresponding to the data range 505 in the namespace 504 and the mapping of the drive enclosure 200, the drive 508, and the address of the storage area 509 is managed by the storage controller 121.

The mapping with the cache segment 507 corresponding to the data range 505 in the namespace 504 is the same as that of the cache memory of the related art, and the description thereof is omitted.

The mapping of the drive enclosure 200, the drive 508, and the address of the storage area 509 corresponding to the data range 505 in the namespace 504 will be described with reference to FIG. 36A.

(36) Address Conversion Table and Data Protection Drive Group Table

FIG. 36A illustrates an address conversion table, and FIG. 36B illustrates a data protection drive group table. The address conversion table and the data protection drive group table are managed by the storage controller 121.

FIG. 36A is a diagram illustrating an address conversion table 3600 which is mapping information of the data range 505 in the namespace 504 and the address of the data storage destination. The address conversion table 3600 is used in address conversion processing of converting an address of a logical volume into an address of a data storage destination. The address conversion table 3600 includes items of a logical address 3601, a drive area number 3602, and a drive address 3603.

In an actual storage system, there are a plurality of layers of logical volumes, storage pools, caches, storage areas protected by data protection method such as RAID or mirroring, and drives, and there are multiple steps of address conversion processing. In the present example, to simplify the description, the layers other than the layers necessary for the description of the example are omitted, and only the correspondence relationship between the logical volume and the address of the drive will be described as an example. A logical volume corresponds to a pair of NVM Subsystem and Namespace. In the example, it is assumed that there is one address conversion table 3600 for each logical volume. The logical address 3601 is a logical address in the logical volume. The drive area number 3602 is an identification number of the drive 508.

The drive area number 3602 will be described in detail in FIG. 9C. The drive address 3603 is an address of a data storage destination in the drive 508. In the following description, a drive address may be called a physical address. The form of the table element of the drive address 3603 depends on the data storage system. In the present example, the data protection method is RAID, and the logical address 3601 is associated with the drive area number 3602 and the drive address 3603 in the address conversion table 3600. If the data protection method is mirroring, the logical address 3601 is associated with the drive area numbers 3602 and drive addresses 3603 of the mirror source and mirror destination in the address conversion table 3600.

A management unit of addresses in the address conversion table, that is, a unit of correspondence between logical addresses and drive addresses is, for example, a RAID stripe unit. The block size of the logical volume is, for example, 512 B, and the size of the RAID stripe is, for example, 512 KB (=1024 blocks). In the present example, the address conversion processing has been described by using the address conversion table so that the correspondence relationship between the logical address and the data storage destination can be easily understood. In the data protection method such as RAID and mirroring, address conversion can be performed by calculation, and the address conversion processing is not limited to this method. For example, in RAID, there is periodicity in the correspondence between logical addresses and drive addresses in units of parity cycles, and the drive area numbers 3602 and the drive addresses 3603 can be calculated from the logical addresses 3601 by using the drive configuration and periodicity of RAID groups. The drive configuration of the RAID groups is described in FIG. 36B.

FIG. 36B is a diagram illustrating a data protection drive group table 3610 which is management information of drive groups used for data protection. The data protection drive group table 3610 includes items of drive group number 3611, data protection method 3612, and drive configuration 3612.

The drive group number 3611 is a drive group identification number. The data protection method 3612 illustrates a data protection method of the drive group. For example, the data protection method includes RAID 5 (3D+1P), RAID 6 (6D+2P), mirroring, and the like. "D" indicates a data drive, and "P" indicates a parity drive. For example, "3D+1P" indicates that a total of four drives are configured from three data drives and one parity drive. The drive configuration 3612 indicates the drive area numbers of the drives constituting the drive group. The data protection drive group table 3610 is managed and stored by the storage device 120 as one of the storage system configuration information.

(6) Processing Procedure of Host Command in Storage Controller

Figure 6:
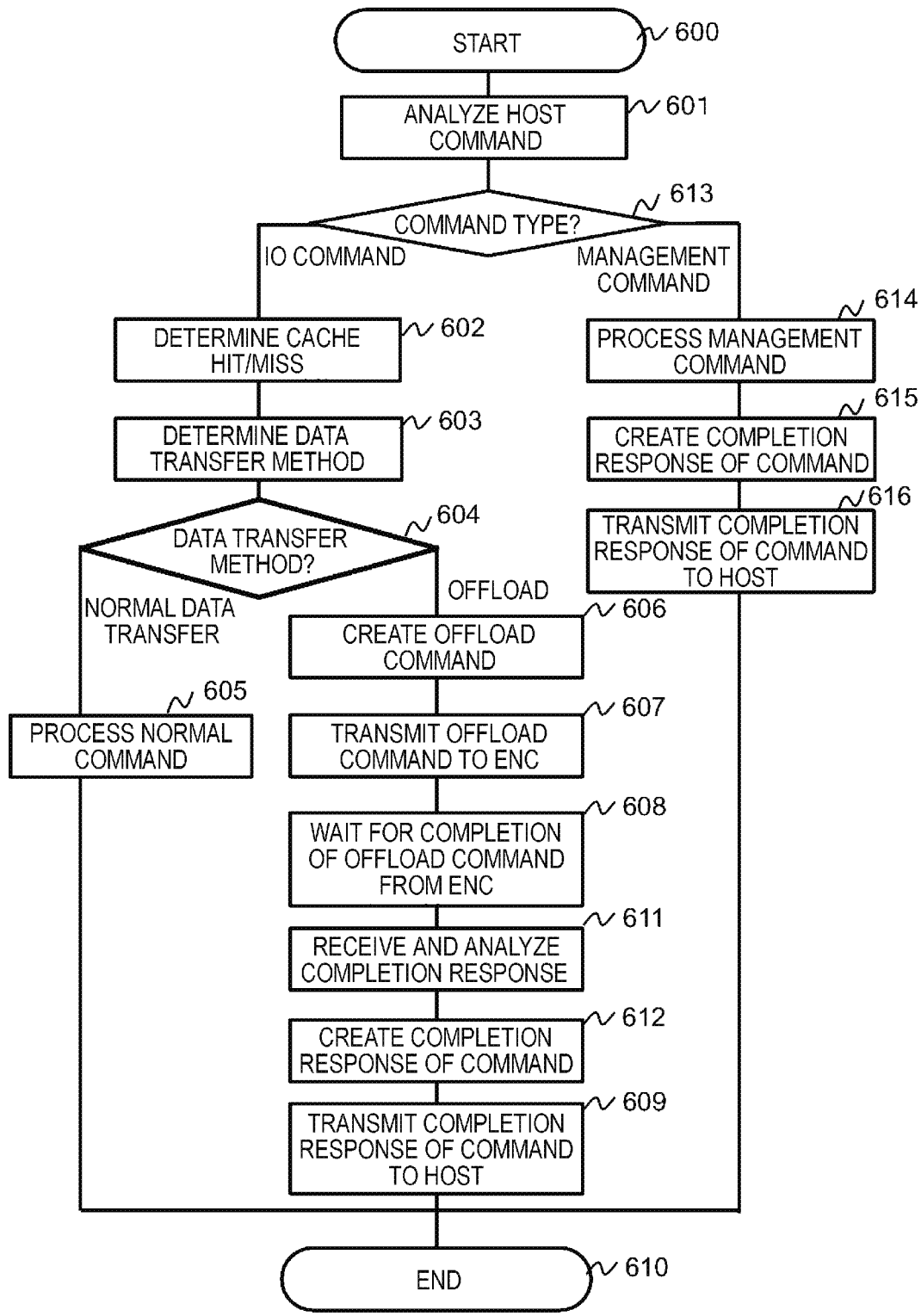
FIG. 6 is a flowchart illustrating a processing procedure of a host command in the storage controller of Example 1.

FIG. 6 is a flowchart of a processing procedure of a host command in the storage controller of Example 1. That is, FIG. 6 is a flowchart illustrating the processing procedure of the host command in the storage controller according to the Target Configuration Form 1.

When the target driver 302 of the storage controller 121 receives a command from the host computer 110, the host command processing unit 304 starts the processing of step 600 and subsequent steps.

First, the host command processing unit 304 uses the information in the host information table 920 of the storage controller to obtain an identification name 923 (403 in FIG. 4) that is an NVM subsystem NQN (refer to FIG. 9B) and analyzes the received NVMe command (refer to FIG. 9A for the received NVMe command) to read a command type 912, an NID (namespace ID) 913 which is an identifier of the namespace, a start address 914, and a data transfer length 915 (step 601).

Next, the processing branches depending on the type of command (step 613). If the command type 912 is an IO command (read command or write command), the processing proceeds to step 602. If the command type is a management command (a command for creating or deleting a namespace, an information acquisition command for NVM subsystem, a setting command for NVM subsystem, and the like), the processing proceeds to step 614. The flow in the case where the command type is an IO command in step 613 will be described below.

When the processing branches from step 613 to step 602, the cache control unit 306 performs a cache hit/miss determination based on the information of the storage controller identification name 403 obtained from the target driver 302, the NID of the received NVMe command, and the start address and the data transfer length (step 602).

Next, the data transfer method is determined based on the cache hit/miss determination and the information on the command type and the data transfer length (step 603). The determination of the data transfer method determines whether to perform normal data transfer or offload data transfer to the drive chassis according to the table illustrated in FIG. 8.

Next, the processing branches depending on the data transfer method (step 604). If the data transfer method is normal data transfer, the processing proceeds to step 605, and if the data transfer method is offload, the processing proceeds to step 606. When the normal data transfer is performed, normal command processing is performed (step 605). The normal command processing will be described with reference to FIG. 11. Finally, the processing ends (step 610).

Hereinafter, returning to the description of step 606 and subsequent steps in the flowchart, the flow of processing of offloading data transfer to the drive chassis will be described.

When the processing branches from step 604 to step 606, the data transfer offload unit 307 creates a data transfer parameter (offload command) necessary for data transfer based on the information of the start address and the data transfer length with reference to the address conversion table 3600 (step 606). That is, the storage controller refers to the address conversion table 3600 to generate an offload command including a physical address for the drive as the storage destination of the data corresponding to the command received from the host computer.

The offload command includes the host NQN for identifying the host computer, information such as the address of the data storage destination of the host computer, the drive address of the data storage destination and the data transfer length. The method of creating the control data will be described with reference to FIGS. 9A to 9D.

Next, the data transfer offload unit 307 identifies the drive enclosure 200 of the data storage destination corresponding to the identification name 923 (403 in FIG. 4) obtained in step 601, NID, and the start address by the address conversion unit 318 by referring to the address conversion table 3600 and transmits the offload command to the drive enclosure 200 by using the offload command communication unit 315 (initiator) (step 607).

Next, the processing waits for the completion of the offload command from the drive enclosure 200 (step 608). Next, the data transfer offload unit 307 receives a completion response of the offload command from the drive enclosure 200 by using the offload command communication unit (initiator) 315 and analyzes the completion response of the offload command (step 611). In the NVMe protocol, since each command is processed by a queue, it is necessary that a device which processes a command always transmits a completion response to a command issuing source. That is, this is because the completion response needs to be returned from a storage controller, which is the request destination of the command, to the host computer if the command from the host computer is a read command. When the completion response is an error, processing at the time of abnormality occurrence is performed, but the description thereof is omitted here. The following description is continued assuming that the completion response is successful.

Next, the host command processing unit 304 creates a completion response of the command in response to the read command of the host computer (step 612). Next, the target driver 302 is used to transmit the completion response of the read command to the host computer 110 (step 609), and the processing is completed (step 610). If the data to be transferred spans the drives 218 of a plurality of drive enclosures 200, the processing of steps 606 and 607 is performed on the plurality of drive enclosures 200. In addition, step 608 waits for the completion of the offload command from all drive enclosures 200 to which the offload command has been transmitted.

Hereinafter, returning to the description of step 614 and subsequent steps in the flowchart, the flow in the case where the command type is a management command in step 613 will be described.

When the processing branches from step 613 to step 614, the host command processing unit 304 processes the management command according to the content specified by the management command (step 614). Next, a completion response of the command including the result of the processing of the management command is created (step 615). Next, the command completion response is transmitted to the host computer 110 by using the target driver 302 (step 616).

Thus, when an IO command such as a read command is received, if a cache hit occurs, the storage controller transfers read data to the host computer, and if a cache miss occurs, the storage controller refers to the address conversion table to create an offload command and controls the drive chassis (FBOF) to directly transfer the read data to the host computer. The read data is directly transferred from the drive chassis to the host computer, but a completion response of the command needs to be transmitted via the target driver 302 by the host command processing unit 304 of the storage controller that has received the command from the host computer.

(11) Continuation of Processing Procedure of Host Command in Storage Controller (Normal Command Processing)

Figure 11:
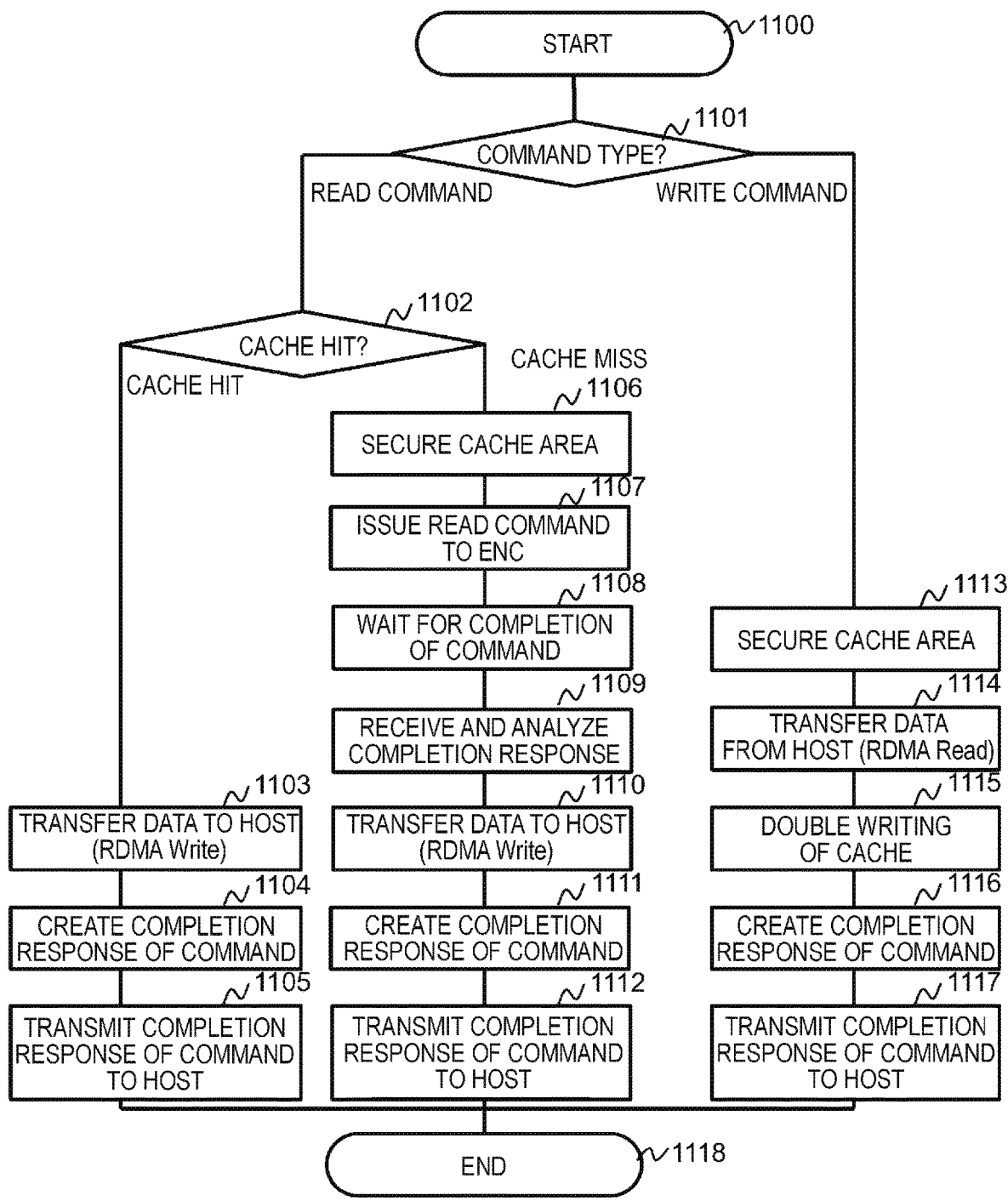
FIG. 11 is a flowchart illustrating host command (normal command) processing in the storage controller of Example 1.

FIG. 11 is a flowchart illustrating a processing procedure of normal command processing following the processing procedure of the host command in the storage controller of Example 1. That is, FIG. 11 is the processing of step 605 of the flowchart illustrating the processing procedure of the host command in the storage controller according to the Target Configuration Form 1 (normal command processing).

First, the host command processing unit 304 branches the processing according to the command type (step 1101). If the command type is a read command, the processing proceeds to step 1102. If the command type is a write command, the processing proceeds to step 1113.

If the processing branches from step 1101 to step 1102, the processing branches depending on cache hit/miss (step 1102). In the case of a cache hit, the processing proceeds to step 1103. In the case of a cache miss, the processing proceeds to step 1106. Here, the cache hit/miss determination determines whether or not data responding to an IO command from the host computer exists in the cache memory 204 of the storage controller. For example, when the IO command from the host computer is a read command, it is determined whether or not data responding to the read command exists in the cache memory 204.

Next, in step 1101 of the flowchart, the flow in the case where the command type is a read command and a cache hit occurs in step 1102 will be described. When the processing branches to step 1103, the data transfer control unit (between the host computer and the storage controller) 305 transfers data in the address range specified by the read command from the cache 506 to the physical memory area 503 in the host computer 110 specified by the read command (step 1103).

Next, the host command processing unit 304 creates a completion response of the command (step 1104). Next, the target driver 302 is used to transmit the completion response of the command to the host computer (step 1105). Finally, the processing ends (step 1118).

Next, in step 1101 of the flowchart, the flow in the case where the command type is a read command and a cache miss occurs in step 1102 will be described. When the processing branches from step 1101 to step 1102 and the processing branches from step 1102 to step 1106, the cache control unit 306 secures a cache area for storing read data (step 1106). Next, the host command processing unit 304 identifies the drive enclosure 200 and the drive 508 of the data storage destination corresponding to the identification name 403, NID, the start address obtained in step 601 by the address conversion unit 318 by referring to the address conversion table 3600 and issues a read command of the controller command to the drive enclosure 200 by using the initiator driver 303 (step 1107).

The read destination of the read command is obtained by the address conversion of the address conversion unit 318, and the read destination is the drive enclosure 200, the drive 508, and the storage area 509 in the drive 508 corresponding to the data range 505. As a transfer destination of read data, the address of the cache area secured in step 1106 is specified in the command. If RDMA is used for the NVMe transport, in the NVMeoF standard, the address of the memory area of the command issuing source is specified as information required for data transfer. Also, in the NVMeoF standard, an Admin queue and an IO queue are created between the host computer and the NVM Subsystem by the connect command, and commands and completion responses of the command are transmitted and received via these queues. In the following, to simplify the description, the transmission and reception of the command and the completion response thereof with the NVM subsystem corresponding to the drive 508 will be referred to simply as the transmission and reception of the command and the completion response thereof with the drive 508.

Next, the processing waits for the completion of the read command from the drive enclosure 200 (step 1108). Next, the host command processing unit 304 receives a completion response of the read command from the drive enclosure 200 by using the initiator driver 303 and analyzes the command completion response of the read command (step 1109). When the completion response is an error, processing at the time of abnormality occurrence is performed, but the description thereof is omitted here. The following description is continued assuming that the completion response is successful.

Next, the data transfer control unit (between the host computer and the storage controller) 305 transfers the read data stored in the cache from the cache 506 to the physical memory area 503 in the host computer 110 specified by the read command (step 1110).

After the data transfer is complete, the host command processing unit 304 creates a completion response of the command with respect to the read command of the host computer (step 1111). Next, the command completion response is transmitted to the host computer 110 by using the target driver 302 (step 1112). Finally, the processing ends (step 1118).

Next, the flow in the case where the command type is a write command in step 1101 of the flowchart will be described. When the processing branches from step 1101 to step 1113, the cache control unit 306 secures a cache area for storing write data (step 1113).

Next, the data transfer control unit (between the host computer and the storage controller) 305 transfers data of the physical memory area 503 in the host computer 110 specified by the write command to the secured cache area (step 1114). Next, the write data transferred to the cache area is transferred to the other storage controller, and the write data is stored in the cache areas of both storage controllers (step 1115). This is called cache double-write.

Next, the host command processing unit 304 creates a command completion response corresponding to the write command of the host computer 110 (step 1116). Next, the command completion response is transmitted to the host computer 110 by using the target driver 302 (step 1117). Finally, the processing ends (step 1118).

(12) Processing Procedure of Destaging in Storage Controller

Figure 12:
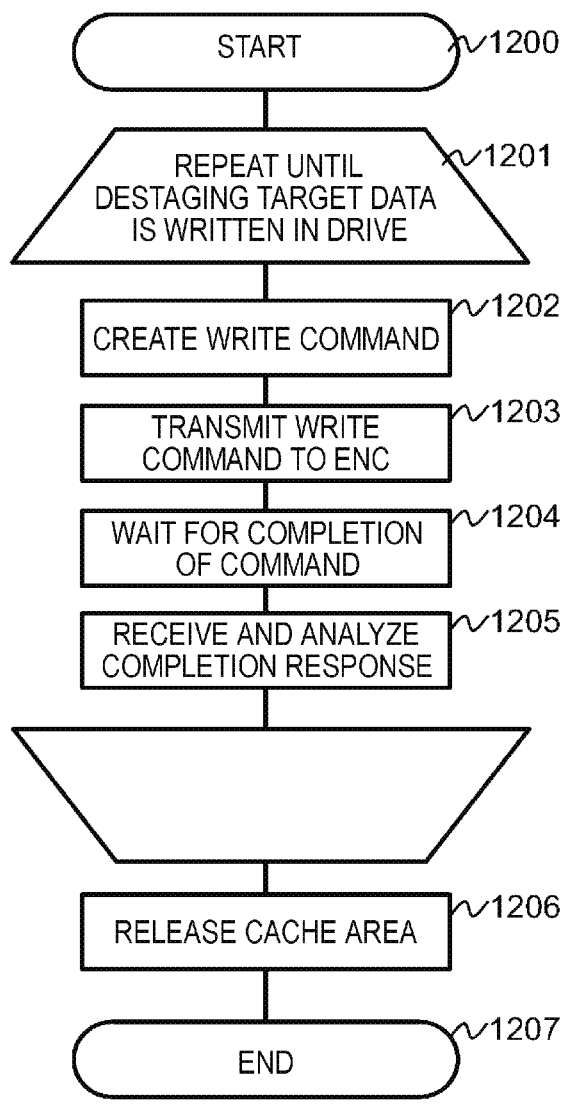
FIG. 12 is a flowchart illustrating a process procedure of destaging in the storage controller of Example 1.

FIG. 12 is a flowchart illustrating a processing procedure of destaging in the storage controller. That is, FIG. 12 is a flowchart illustrating a processing procedure of destaging in the storage controller according to the Target Configuration Form 1.

When the destaging unit 314 determines that destaging conditions are satisfied (for example, the amount of dirty cache is equal to or more than a threshold), the destaging unit 314 starts the processing after step 1200.

The destaging unit 314 repeats the subsequent processing until the destaging target data stored in the cache is written to the drive (step 1201). The method of selecting destaging target data is not the essence of the present example, and thus the description thereof is omitted.

The destaging unit 314 creates a write command of the controller command for writing data to be destaged (step 1202).

The writing destination of the write command is obtained by the address conversion of the address conversion unit 318, and the writing destination is the drive enclosure 200, the drive 508, and the storage area 509 in the drive 508 which are corresponding to the data range 505. Next, the write command is transmitted to the drive enclosure 200 via the initiator driver 303 (step 1203). Next, the processing waits for a command completion from the drive enclosure 200 (step 1204). Next, the completion response of the command from the drive enclosure 200 is received via the initiator driver 303, and the completion response of the command is analyzed (step 1205). When the completion response is an error, processing at the time of abnormality occurrence is performed, but the description thereof is omitted here. The following description is continued assuming that the completion response is successful.

Next, when the repetition of step 1201 continues, the processing proceeds to step 1202. When the repetition of step 1201 ends, the cache area for which destaging has been completed is released (step 1206). Finally, the processing ends (step 1207).

(20) Processing Procedure of Controller Command in Drive Enclosure

Figure 20:
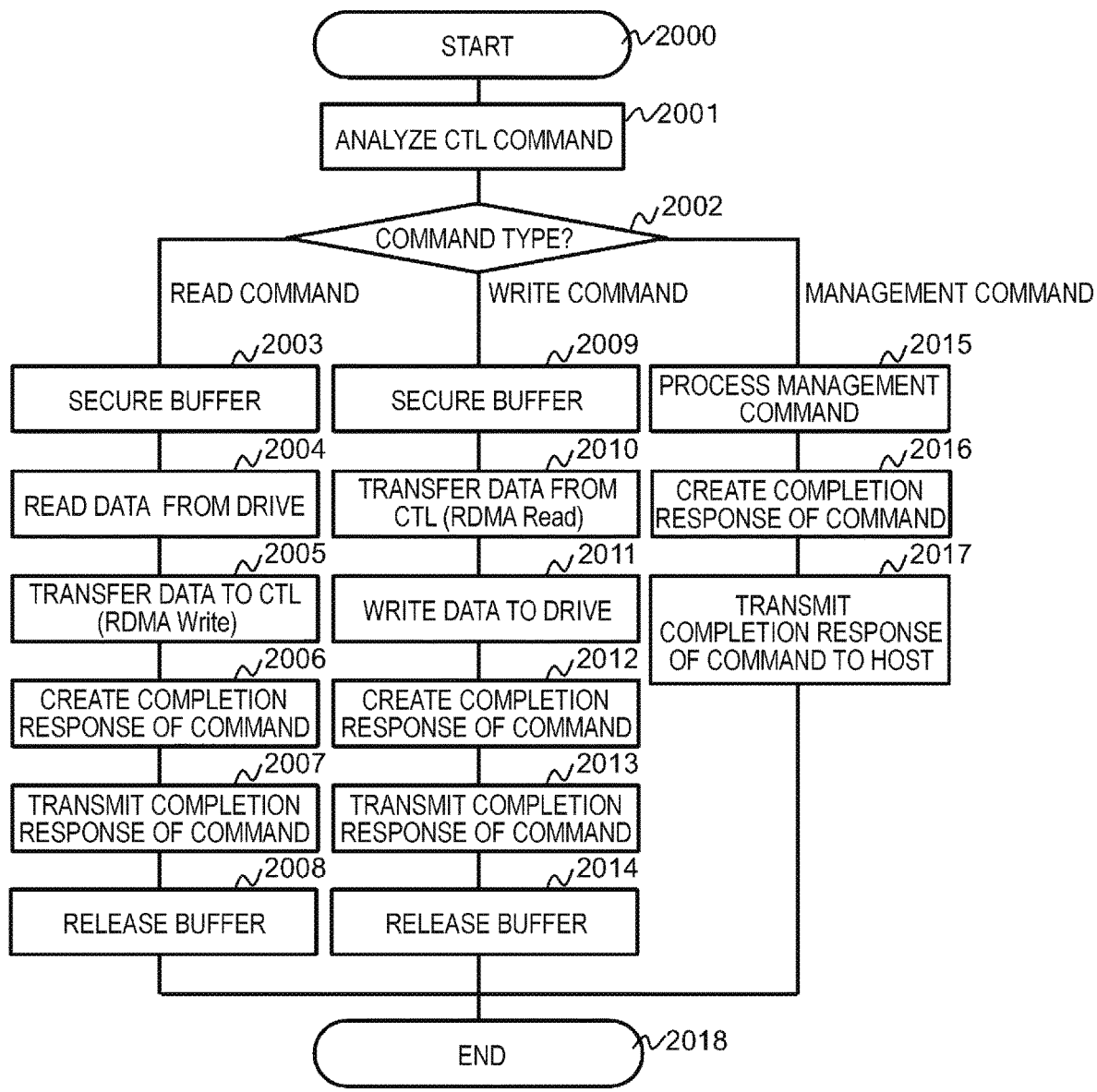
FIG. 20 is a flowchart illustrating a processing procedure of a controller command in the drive enclosure of Example 1.

FIG. 20 is a flowchart illustrating a processing procedure of a controller command in the drive enclosure. When the target driver 308 of the drive enclosure 200 receives a controller command from the storage controller 121, the controller command processing unit 309 starts the processing of step 2000 and subsequent steps.

First, the controller command processing unit 309 analyzes the command received from the storage controller 121 and reads the fields of command type, NID (namespace ID) which is an identifier of the namespace, start address, and data transfer length (step 2001).

Next, the processing branches depending on the command type (step 2002). If the command type is a read command, the processing proceeds to step 2003. If the command type is a write command, the processing proceeds to step 2009. If the command type is a management command, the processing proceeds to step 2015.

Hereinafter, in step 2002, the flow in the case where the command type is a read command will be described. When the processing branches from step 2002 to step 2003, the controller command processing unit 309 secures a buffer area for storing read data (step 2003). Next, data to be read is read from the drive into the secured buffer area (step 2004). The drive 508 storing the data to be read is identified by the identification name 402 of the transmission destination of the controller command. The values of the fields in step 2001 are specified as the namespace ID, start address and the data transfer length of the read command to be issued to the drive. That is, the drive enclosure reads data from the drive which is a storage unit according to a controller command from the storage controller. The method in which the drive enclosure reads data from the own drive is a common method and details thereof are omitted.

Next, the read data stored in the buffer area is transferred to the storage controller (step 2005). In the present example, it is assumed that remote direct memory access (RDMA) is used for the NVMe transport in the NVMeoF standard. That is, data transfer is performed by RDMA Write to the memory area of the command issuing source specified in the command. Next, the completion response of the command corresponding to the read command from the storage controller 121 is created (step 2007). Next, the completion response of the command is transmitted to the storage controller 121 via the target driver 308 (step 2008). Finally, the processing ends (step 2018).

Next, returning to the description of step 2009 and subsequent steps in the flowchart, the processing flow in the case where the command type is a write command will be described. When the processing branches from step 2002 to step 2009, a buffer area for storing write data is secured (step 2009). Next, write data is transferred from the storage controller 121 (step 2010). Data transfer is performed by RDMA Read with respect to the memory area of the command issuing source specified in the command according to the technical standard of NVMeoF in the case of using RDMA for the NVMe transport.

Next, the write data stored in the buffer area is written to the drive (step 2011). The write target drive 508 is identified by the identification name 402 of the transmission destination of the controller command. The values of the fields in step 2001 are specified as the namespace ID and start address and the data transfer length of the write command issued to the drive. The method in which the drive enclosure writes data to the own drive is a common method and details thereof are omitted.

Next, the completion response of the command corresponding to the write command from the storage controller 121 is created (step 2012). Next, the completion response of the command is transmitted to the storage controller 121 via the target driver 308 (step 2014). Finally, the processing ends (step 2018).

Next, returning to the description of step 2015 and subsequent steps in the flowchart, the processing flow in the case where the command type is a management command will be described. When the processing branches from step 2002 to step 2015, the management command is processed (step 2015). Next, the completion response of the command corresponding to the management command from the storage controller 121 is created (step 2016). Next, the completion response of the command is transmitted to the storage controller 121 via the target driver 308 (step 2017). Finally, the processing ends (step 2018).

(7) Processing Procedure of Offload Command of Data Transfer in Drive Enclosure

Figure 7:
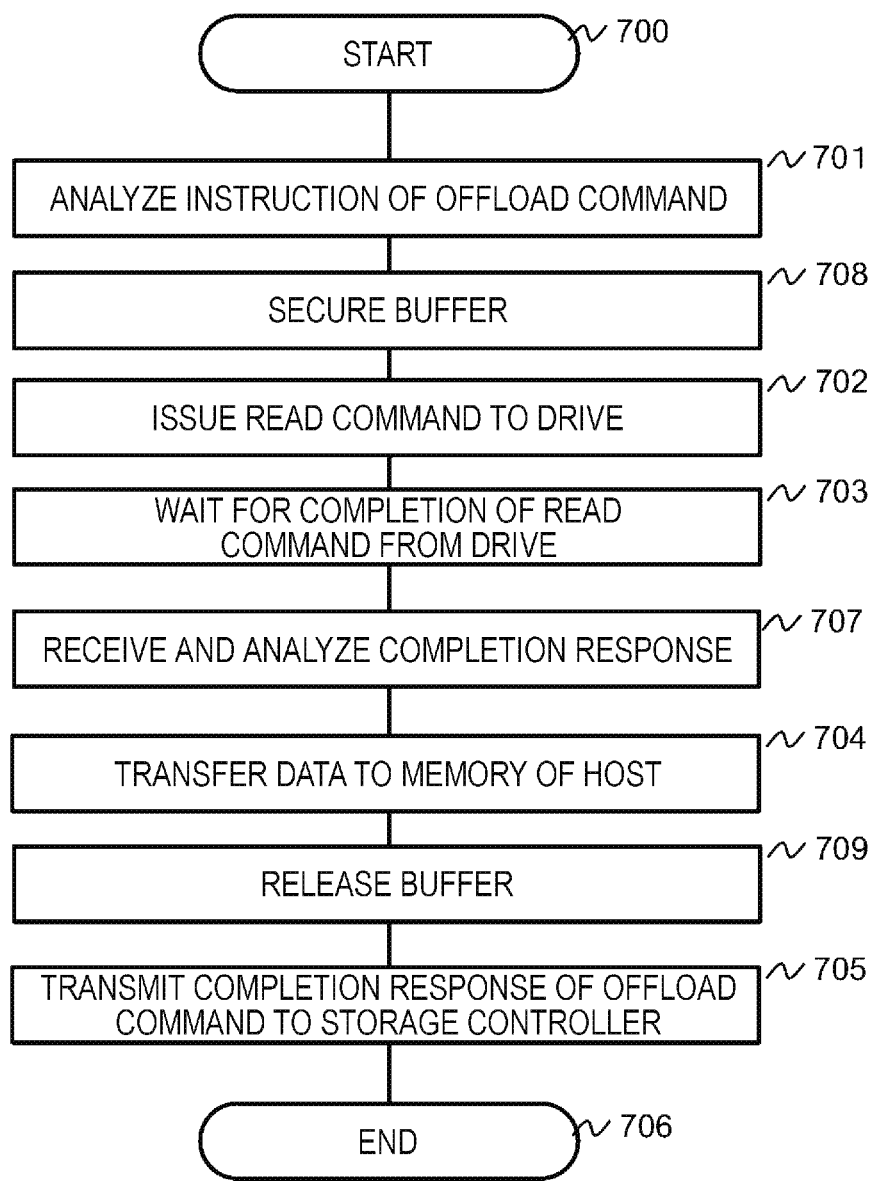
FIG. 7 is a flowchart illustrating a processing procedure of an offload command of data transfer in the drive enclosure of Example 1.

FIG. 7 is a flowchart illustrating a processing procedure of an offload command of data transfer in the drive enclosure of Example 1. That is, FIG. 7 is a flowchart illustrating a processing procedure of an offload command of data transfer in the drive enclosure according to the Target Configuration Form 1.

When receiving the offload command from the storage controller 121 via the offload command communication unit (target) 313, the offload command processing unit 311 of the drive enclosure 200 starts the processing of step 700 and subsequent steps.

First, the offload command processing unit 311 reads each field of the offload command (step 701). Each field is described in FIG. 9D. Next, a buffer for storing read data is secured in the memory 204 (step 708). Next, the corresponding drive 218 is identified from the information of NVM Subsystem NQN and NID in the fields read in step 701 and the mapping information of NVM Subsystem NQN in the drive enclosure and the drive 218, and a read command is issued to the drive 218. The start address and the data transfer length read in step 701, and the address of the buffer secured in step 708 are specified as the start address, the data transfer length and the address of the data storage destinatin of the corresponding read command (step 702). The drive reads the data from the storage unit storing the data according to the offload command.

Next, the processing waits for the completion of the read command from the drive 218 (step 703). Next, a completion response of the read command from the drive 218 is received, and the content of the completion response is analyzed (step 707). When the completion response is an error, processing at the time of abnormality occurrence is performed, but the description thereof is omitted here. The following description is continued assuming that the completion response is successful.

Next, the data transfer control unit (between the host computer and the enclosure) 310 transfers the buffer read data to the host computer 110 (step 704). The data transfer control unit (between the host computer and the enclosure) 310 performs data transfer by RDMA between the drive enclosure 220 and the host computer 110 via the network I/F 205.

The data transfer control unit (between the host computer and the enclosure) 310 creates an RDMA Write command for data transfer of read data, and enqueues the command in a queue for RDMA communication. In the RDMA Write command, the memory address and R key of the fields read in step 701 are specified as information for identifying the physical memory area 503 of the host computer 110 as the data transfer destination. In the RDMA Write command, the data transfer length read in step 701, the address of the buffer secured in step 708 is specified as the data transfer length and the data transfer source. The queue for RDMA communication is created in advance between the network I/F of the host computer and the network I/F 205 by the above-described connect command.

In the NVMe protocol, since each command is processed by a queue, it is necessary that a device which processes a command always transmits a completion response to a command issuing source. That is, this is because the completion response needs to be returned from a storage controller that is the request destination of the command to the host computer when the command from the host computer is a read command. However, since data responding to commands does not necessarily need to be transferred from the request destination device of the queued commands, data is transferred directly from the drive enclosure to the host computer, eliminating the storage controller bottleneck.

Next, after the data transfer of the data transfer control unit (between the host computer and the enclosure) 310 is completed, the offload command processing unit 311 releases the buffer (step 709). Next, the completion response of the offload command is transmitted to the storage controller 121 via the offload command communication unit (target) 313 (step 705), and the processing ends (step 706).

(8) Determination of Data Transfer Method

FIG. 8 is a diagram illustrating data transfer conditions and data transfer types used in the determination of the transfer method. The data transfer type is illustrated as an IO pattern 800, and the IO pattern is classified into a case where the data transfer length is smaller or larger than a threshold, and a read or write command type. For each classification, transfer conditions are determined in the case of a cache hit 801 and in the case of a cache miss 802.

In Example 1, conditions under which data can be directly transferred from the drive chassis 140 to the host computer 110 are when the command type is read and a cache miss occurs. If the data transfer length is large, the possibility of sequential access is high, and there is a significant performance improvement due to direct data transfer. On the other hand, if the data transfer length is small, since the possibility of random access is high and there is a significant performance improvement due to cache hits, data is copied to the cache 506 by normal command processing.

The threshold of the data transfer length does not necessarily be fixed and may be changed according to the workload of the storage device.

(9) Format of Host Command, Host Information Table of Storage Controller, Drive Information Table, Format of Offload Command FIG. 9A illustrates the format of the host command, FIG. 9B illustrates the host information table of the storage controller, FIG. 9C illustrates the drive information table, and FIG. 9D illustrates the format of the offload command.

The fields of the host command illustrated in FIG. 9A include a command identifier 911, a command type 912, an NID 913, a start address 914, the data transfer length 915, a memory address 916, and an R key 917.

The command identifier 911 is used to correspond the issued command to the completion response of the command. For example, in a mechanism for executing a plurality of commands of parallel I/Os, the issued command is used to correspond to the completion response of the command. The command identification by a command identifier is a widely known method in command execution, and the detailed description thereof is omitted.

The command type 912 is a code indicating a read command, a write command, and a management command.

The NID 913 is a namespace ID in the NVM Subsystem. The NVM subsystem is the NVM subsystem of the storage controller 121 in Example 1. In addition, the NQN of this NVM Subsystem is registered in the NVM Subsystem NQN 923 of the host information table of FIG. 9B.

The start address 914 and the data transfer length 915 are the address in the namespace and the data transfer length of the data to be transferred.

The memory address 916 is an address of the memory area in the host computer of a data transfer destination specified by the host computer 110. The R key 917 is an identifier of the memory area in the host computer. Among the host commands, metadata pointers and the like which are fields having low importance in the description of Example 1 are omitted from the drawing. Metadata is additional data allocated to logical block units (for example, 512B) of logical volumes and drives. Example 1 is applicable regardless of the presence or absence of the metadata, and the description thereof will be omitted.

In addition, only one set of the memory address 916 and the R key 917 is illustrated in FIG. 9A to simplify the description, but a list consisting of a plurality of sets may be used. Similarly, the memory address and the R key will be described as one set including the following description of the offload command, but a list consisting of a plurality of sets may be used.

FIG. 9B is a host information table of the storage controller. The host information table 920 includes the items of a queue number 921, a host NQN 922, and the NVM Subsystem NQN 923.

The queue number 921 is the number of the IO queue between the host computer and the NVM subsystem. When the storage controller 121 receives a connect command from the host computer 110 and creates an IO queue, the storage controller 121 assigns the queue number in order to internally manage the IO queue. The queue number is a unique value inside the storage controller 121. The host NQN 922 and the NVM Subsystem NQN 923 are the NQN of the host computer 110 and the NQN of the NVM Subsystem of the storage controller 121 linked with the above IO queue, respectively.

A drive information table 930 illustrated in FIG. 9C includes the items of a drive area number 931, a drive enclosure (ENC) number 932, an NVM Subsystem NQN 933, and an NID 934.

The drive area number 931 is a number of the area of the drive 218 used by the storage controller 121. The drive 218 corresponds to the drive 508 in FIG. 5. The storage controller 121 assigns a drive area number to manage the area of the drive 218 in namespace units. The drive area number is a unique value inside the storage controller 121.

The drive enclosure number 932 is a number of the drive enclosure 200 having the drive 218 therein. The storage controller 121 assigns the drive enclosure number 932 to manage the drive enclosure 200. The drive enclosure number 932 is a unique value inside the storage controller 121. The NVM Subsystem NQN 933 and the NID 934 are the identifier 402 corresponding to the drive 218 and the namespace ID in the drive 218.

FIG. 9D illustrates the format of the offload command. The fields of the offload command 900 include a command identifier 908, host NQN 901, a memory address 902, the R key 903, a data transfer direction 909, an NVM Subsystem NQN 904, an NID 905, a start address 906, and a data transfer length 907.

The command identifier 908 is an identifier for identifying each command. The host NQN 901 is a host NQN of the host computer 110 which is the data transfer destination of the drive chassis 140. The memory address 902 is an address of the memory area in the host computer of the data transfer destination specified by the host computer 110. The R key 903 is an identifier of the memory area in the host computer. The data transfer direction 909 indicates either data transfer from the drive enclosure 200 to the host computer 110 or data transfer from the host computer 110 to the drive enclosure 200. The NVM Subsystem NQN 904 and the NID 905 are NVM Subsystem NQN of NVM Subsystem of the drive enclosure 200 and a namespace ID in NVM Subsystem, respectively. The start address 906 and the data transfer length 907 are the address in the namespace and the data transfer length of the data to be transferred. The NID 905, the start address 906, and the data transfer length 907 are information obtained by referring to the address conversion table 3600 from the logical address of the host command.

The host command processing unit 304 sets the values of the fields 901 to 909 of the offload command as follows.

The host command processing unit 304 collates the IO queue for which the target driver 302 of the storage controller 121 has received a command from the host computer 110 with the entry of the host information table 920 of the storage controller to set the host NQN 922 corresponding to the IO queue to the host NQN 901 and identifies the NVM subsystem NQN 923 as the identification name 403. This processing is performed in step 601 of FIG. 6.

The host command processing unit 304 sets the memory address 916 and the R key 917 to be specified in the host command by the host computer 110 as the memory address 902 and the R key 903. The host command processing unit 304 uses the address conversion unit 318 to identify the drive 508 of the data storage destination and the address of the data storage destination from the information of the identification name 403 (corresponding to the NVM Subsystem NQN 923), the NID 913 of the host command, the start address 914, and the data transfer length 915 obtained in step 601.

Specifically, the processing is performed as follows. First, the address conversion unit 318 converts "(A) identification name 403 (NVM Subsystem NQN)" obtained in step 601, "(B) NID 913 of host command" (corresponding to a logical volume in the storage device), and "(C) start address 914" (corresponding to a logical address in the namespace) into "(D) drive area number 3602", and "(E) drive address 3603" by using the address conversion table 3600.

Next, the address conversion unit 318 converts "(D) drive area number 3602" into "(F) ENC number 932", "(G) NVM Subsystem NQN 933", and "(H) NID 934" by using the drive information table 930.

The drive enclosure 200 which is the transfer destination of the offload command is identified by "(F) ENC number". The NVM Subsystem NQN 904, NID 905, and start address 906 of the offload command correspond to "(G) NVM Subsystem NQN", "(H) NID", and "(E) Drive Address", respectively.

The command identifier 908 is a unique value among the offload commands being executed. In Example 1, since the offload is performed only at the time of the read command, the data transfer direction 909 is only from the drive enclosure 200 to the host computer 110.

The information of each field of the offload command of FIG. 9D is not limited to the above-described order. For example, information that can be set from a host command can be collectively set.

As described above, according to Example 1, when the storage controller that has received the read command from the host computer determines that a cache miss occurs and the data transfer length of the read command is longer than the threshold, the storage controller transfers read data directly from the drive chassis, which is the FBOF, to the host computer. Therefore, even when a plurality of drive chassis are connected to the storage controller, the bottleneck of the storage controller can be eliminated and high-speed data transfer can be realized.

Example 2

In Example 1, an embodiment in which the storage controller has a cache is described, but in Example 2, an embodiment without a cache will be described. Even in a cacheless storage controller, since the configuration of the information processing system, and the processing of the storage controller and the drive enclosure have many similarities, the difference from Example 1 will be described below. Example 2 is the same as Example 1 except the differences described in Example 2, and thus the description thereof is omitted.

In the cacheless storage controller, the difference in the configuration is that the cache control unit 306 in FIG. 3 and the cache 506 in FIG. 5 are eliminated. Therefore, the write data is transferred (destaged) to the storage area 509 in the drive 508 connected to the drive enclosure 200, whereby the data of the storage area 509 in the drive 508 is immediately reflected. However, during destaging, new data and old data are mixed in the storage area 509 in the drive 508, and some steps of the control in FIG. 6 are modified so that consistent data as a storage device can be returned to the host computer. In order to determine whether the storage area 509 in the drive 508 is destaging, the storage controller 121 may manage the storage area 509 with a bitmap indicating a destaging state.

Since the determination of the data transfer method is cacheless, in FIG. 8, only the case of a cache miss 802 is determined, and in the case of read, direct transfer is always performed. That is, in FIG. 8, the determination of the data transfer method corresponds to the determination of the data transfer method in the case where cache hit 801 is not present and the threshold is 0 byte.

(10) Processing Procedure of Host Command in Cacheless Storage Controller

Figure 10:
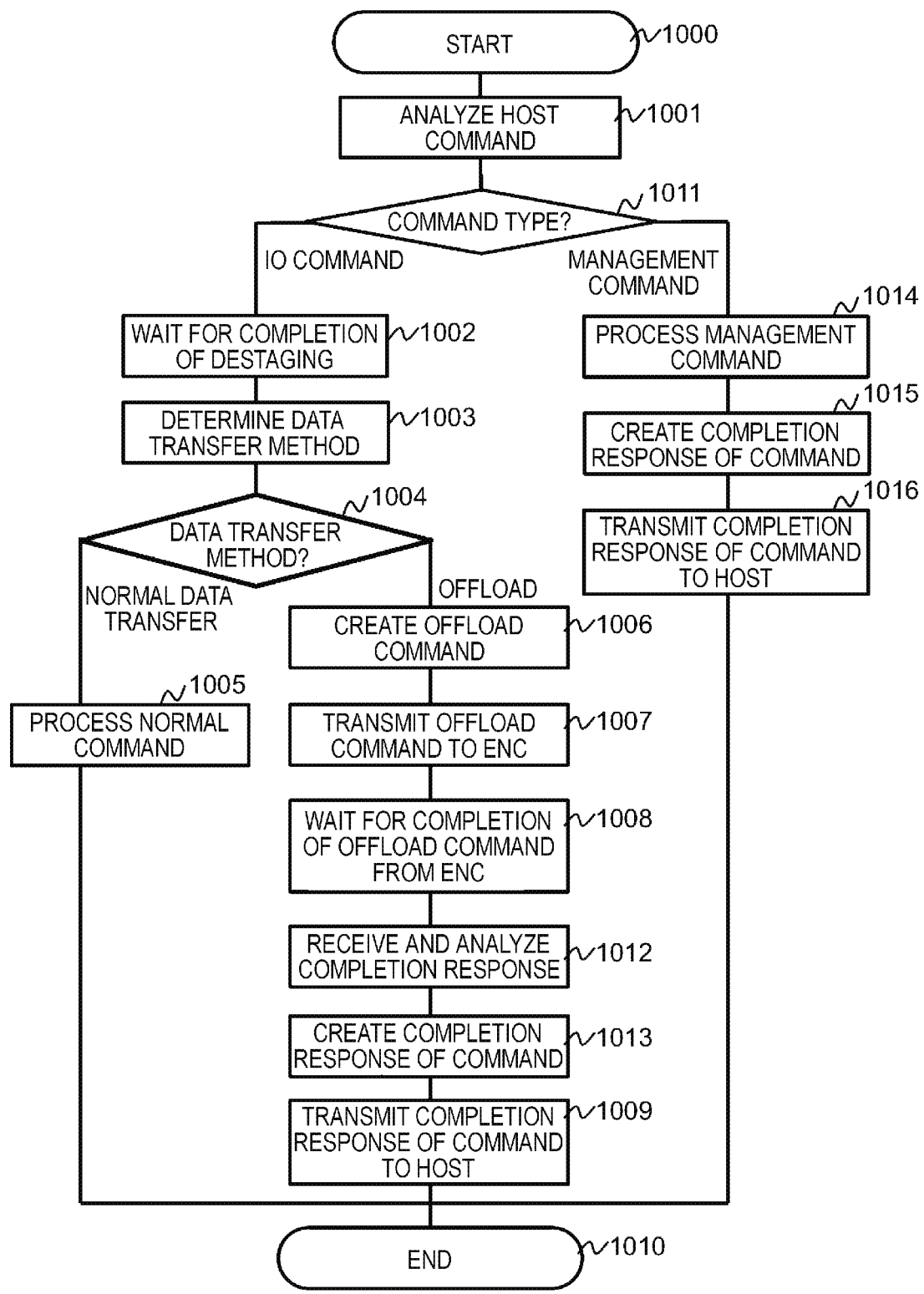
FIG. 10 is a flowchart illustrating a processing procedure of a host command in a cacheless storage controller of Example 2.

FIG. 10 is a flowchart of a processing procedure of a host command in a cacheless storage controller.

Except for step 1002, the contents of steps 600 to 616 and steps 1000 to 1016 are the same. In step 1002, the host command processing unit 304 determines whether the data in the corresponding area has been destaged based on the identification name 403 obtained from the target driver 302, and the information of the NID, the start address and the data transfer length obtained in step 1001, and in the case where destaging is in progress, the host command processing unit 304 waits for the completion of destaging. After the destaging is completed, the drive becomes a state in which the latest data is reflected.

(13) Processing Procedure (Normal Command Processing) of Host Command in Cacheless Storage Controller (Example 2)

Figure 13:
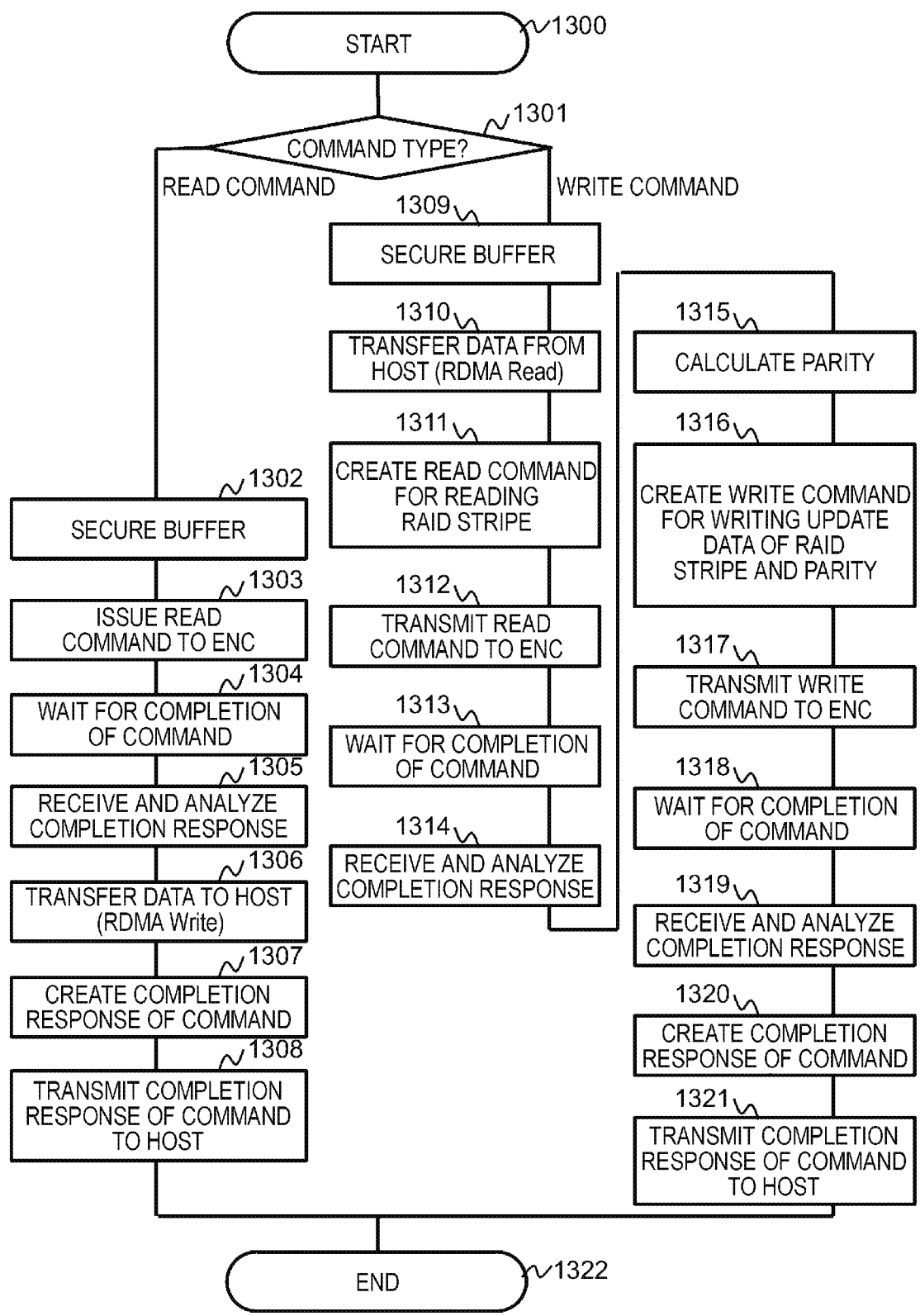
FIG. 13 is a flowchart illustrating a processing procedure of a host command in the cacheless storage controller of Example 2.

FIG. 13 is a continuation of the processing procedure of a host command in a cacheless storage controller (Example 2), and is a flowchart illustrating the processing procedure of normal command processing.

First, the host command processing unit 304 branches the processing depending on the command type (step 1301). If the command type is a read command, the processing proceeds to step 1302. If the command type is a write command, the processing proceeds to step 1309. The flow in the case where the command type is a read command in step 1301 will be described below.

When the processing branches from step 1301 to step 1302, the host command processing unit 304 secures a buffer area for storing read data (step 1302).

Next, the drive enclosure 200 and the drive 508 of the data storage destination corresponding to the identification name 403, NID, and the start address are identified by the address conversion unit 318, and the host command processing unit 304 issues a read command to the drive enclosure 200 by using the initiator driver 303 (step 1303). The namespace ID and the start address of the read command to be issued to the drive are obtained by the address conversion of the address conversion unit 318, and the value of the field of step 1001 is specified as the data transfer length.

Next, the processing waits for the completion of the read command from the drive enclosure 200 (step 1304). Next, the read command completion response is received, and the completion response is analyzed (step 1305). When the completion response is an error, processing at the time of abnormality occurrence is performed, but the description thereof is omitted here. The following description is continued assuming that the completion response is successful.

Next, the data transfer control unit 305 (between the host computer and the storage controller) transfers data of the address range specified by the read command from the secured buffer area to the physical memory area 503 in the host computer 110 specified by the read command (step 1305). After the data transfer is complete, the host command processing unit 304 creates a completion response of the command corresponding to the read command of the host computer 110 (step 1307). Next, the command completion response is transmitted to the host computer 110 via the target driver 302 (step 1308). Finally, the processing ends (step 1322).

Next, returning to the description of step 1309 and subsequent steps in the flowchart, the processing flow in the case where the command type is a write command will be described. The main difference from the processing in FIG. 11 is the timing of transmitting the completion response of the write command to the host computer. That is, when there is a cache, a completion response of the write command is transmitted to the host computer after cache double writing of write data, and writing to the drive is performed when the conditions for destaging are satisfied. On the contrary, in the case of no-cache, after writing the write data to the drive is completed, a completion response of the write command is transmitted to the host computer.

When the processing branches from step 1301 to step 1309, a buffer area for storing the write data and the RAID stripe is secured (step 1309). Next, the data transfer control unit 305 (between the host computer and the storage controller) transfers the data of the physical memory area 503 in the host computer 110 specified by the write command to the secured buffer area (step 1310). Data transfer is performed by RDMA Read according to the technical standard of NVMeoF in the case of using RDMA for the NVMe transport.

Next, a read command of a controller command for reading a RAID stripe corresponding to the writing destination of the write command from the drive is created (step 1311). The writing destination of the write command is obtained by the address conversion of the address conversion unit 318, and the writing destination is the drive enclosure 200, the drive 508, and the storage area 509 in the drive 508 which are corresponding to the data range 505. Next, the host command processing unit 304 transmits a read command to the drive enclosure by using the initiator driver 303 (step 1312). A RAID stripe may span a plurality of drives of a plurality of drive enclosures 200 constituting the RAID. In this case, the read command is issued to each drive of each drive enclosure as described above.

Then, the processing waits for the completion of the read command (step 1313). Next, the completion response of the read command is received and the analysis of the completion response is performed (step 1314). When the completion response is an error, processing at the time of abnormality occurrence is performed, but the description thereof is omitted here. The following description is continued assuming that the completion response is successful.

Next, parity is calculated from the read RAID stripe (step 1315). Next, a write command for writing the updated data and parity of the RAID stripe to the drive is created (step 1316). Next, a write command of the controller command is transmitted to the drive enclosure 200 (step 1317). As described above, if the RAID stripe spans a plurality of drives in the plurality of drive enclosures 200, a write command is issued for each drive in each drive enclosure as described above. Next, the processing waits for the completion of the write command (step 1318). Next, the completion response of the write command is received, and the completion response is analyzed (step 1319). When the completion response is an error, processing at the time of abnormality occurrence is performed, but the description thereof is omitted here. The following description is continued assuming that the completion response is successful.

Next, the completion response of the command corresponding to the write command from the host computer 110 is created (step 1320). Next, the completion response of the command is transmitted to the host computer 110 (step 1321). Finally, the processing ends (step 1322).

In Example 2, since there is no cache with respect to a read command from the host computer in step 1004 of FIG. 10, in FIG. 8, only the case of a cache miss 802 is determined, and it is determined that the data transfer method corresponds to the case where the threshold is 0 byte, and in the case of read, direct transfer is always performed.

According to Example 2, in the case of read, direct transfer is always performed, and therefore even when a plurality of drive chassis are connected to the storage controller, the bottleneck of the storage controller can be eliminated and high-speed data transfer can be realized.

Example 3

Figure 14:
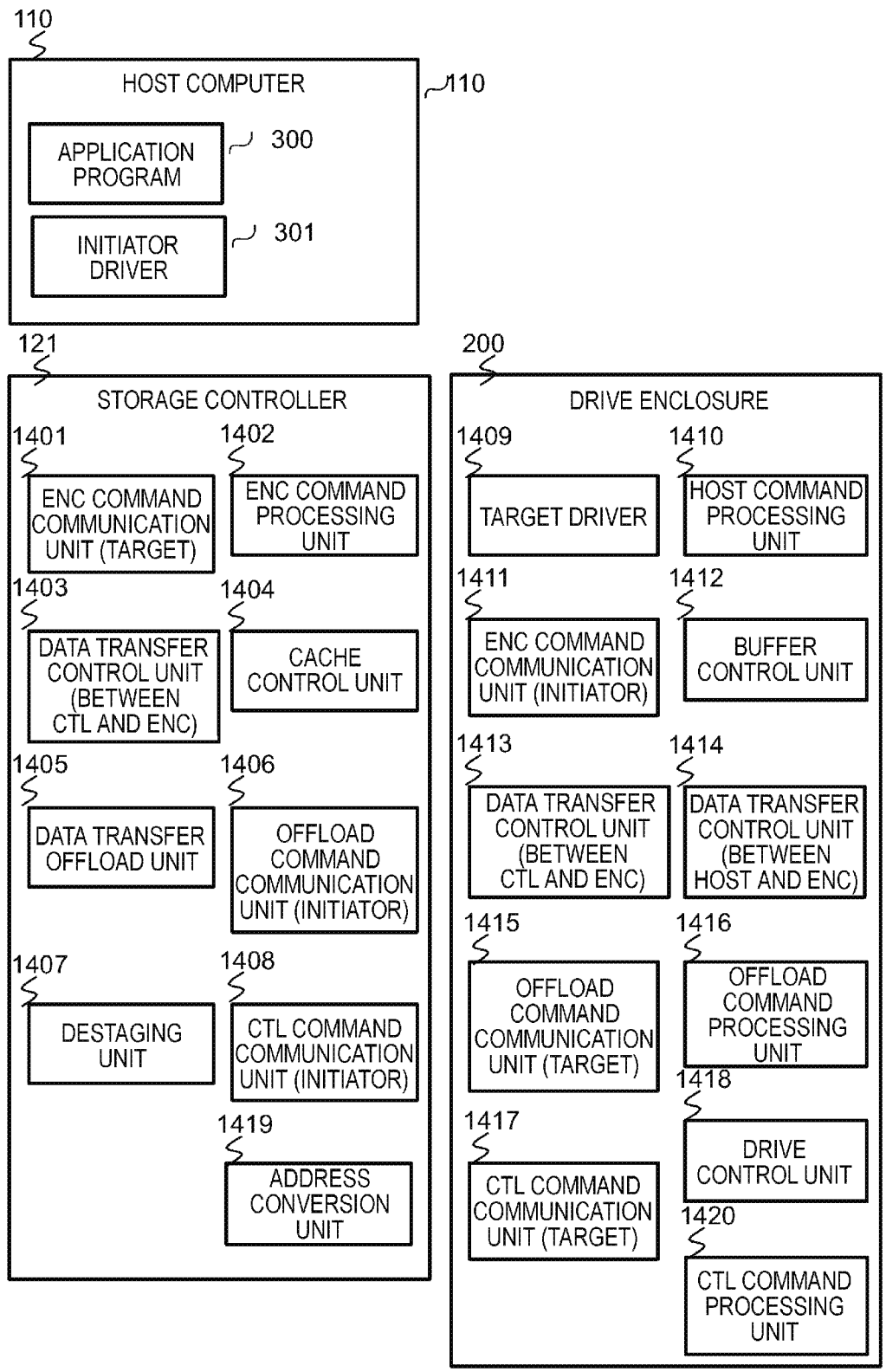
FIG. 14 is a diagram illustrating a program configuration of a host computer, a storage controller, and a drive enclosure in a form in which a drive chassis of Example 3 operates as a target of NVMe over Fabrics with respect to the host computer.

(14) Program Configuration of Host Computer, Storage Controller, and Drive Enclosure in Form (Target Configuration Form 2: Example 3, Example 4, Example 5, Example 6, Example 7, and Example 8) in which Drive Chassis Operates as Target of NVMe Over Fabrics with Respect to Host Computer Instead of Storage Controller FIG. 14 is a diagram illustrating a program configuration of a host computer, a storage controller, and a drive enclosure in a form (Target Configuration Form 2: Example 3, Example 4, Example 5, Example 6, Example 7, and Example 8) in which a drive chassis operates as a target of NVMe over Fabrics with respect to a host computer instead of a storage controller.

The program of the storage controller 121 is configured from an enclosure command communication unit (target) 1401, an enclosure command processing unit 1402, a data transfer control unit (between the storage controller and the enclosure) 1403, a cache control unit 1404, a data transfer offload unit 1405, an offload command communication unit (initiator) 1406, a destaging unit 1407, a controller command transmission unit (initiator) 1408, an address conversion unit 1419, and an OS (not illustrated).

The enclosure command communication unit (target) 1401 provides a storage area compatible with NVMeoF to the enclosure command communication unit (initiator) 1411.

The enclosure command processing unit 1402 receives a command issued by the drive enclosure 200 by using the enclosure command communication unit (target) 1401, and performs analysis of the command, read or write processing, creation of a completion response of the command, transmission of the completion response of the command via the enclosure command communication unit 1401, and the like.

The data transfer control unit (between the storage controller and the enclosure) 1403 performs data transfer processing between the storage controller and the drive enclosure according to the instruction of the enclosure command processing unit 1402. The cache control unit 1404 controls the cache hit/miss determination based on cache data search, a transition between each state of dirty data (state before writing to a physical drive) and clean data (state after writing to a physical drive), reserve and release of a cache area, and the like. Each of the cache control processing is a widely known technique, and the detailed description thereof is omitted here.

The data transfer offload unit 1405 creates a data transfer offload command and instructs the drive enclosure 200 to transfer data to the host computer. The offload command is a command that is created based on storage configuration information such as an address conversion table from the IO command received from the host computer and is used to perform IO command processing on the drive chassis side, and thus, includes data transfer parameters such as host identifier, memory address, drive identifier, drive NS, start address, data length, and the like, as illustrated in FIG. 9D.

The offload command communication unit (initiator) 1406 transmits an offload command to the drive enclosure and receives a response from the drive enclosure. The destaging unit 1407 performs destaging processing of writing data in the cache to the drive. The controller command transmission unit (initiator) 1408 transmits the controller command to the drive enclosure and receives a completion response from the drive enclosure. The address conversion unit 1419 has a mapping table of the data range 505, and the drive enclosure 200 as a data storage destination, the drive 508 and the storage area 509 in the drive 508 and converts the address of the data range 505 into the corresponding drive enclosure 200, the drive 508 and the address of the storage area 509 in the drive 508.

The program of the drive enclosure 200 is configured from a target driver 1409, a host command processing unit 1410, an enclosure command communication unit (initiator) 1411, a data transfer control unit (between the storage controller and the enclosure) 1413, a data transfer control unit (between the host computer and the enclosure) 1414, an offload command communication unit (target) 1415, an offload command processing unit 1416, a controller command communication unit (target) 1417, a drive control unit 1418, a buffer control unit 1412, a controller command processing unit 1420, and an OS (not illustrated).

The target driver 1409 provides a storage area compatible with NVMeoF to the initiator driver 301 of the host computer 110. The host command processing unit 1410 receives a command issued by the host computer or the storage controller by using the target driver 1409, and performs analysis of the command, read or write processing, creation of a completion response of the command, transmission of the completion response of the command via the target driver 1409, and the like. The enclosure command communication unit (initiator) 1411 recognizes a storage area compatible with NVMeoF provided by the enclosure command communication unit (target) 1401. The data transfer control unit 1413 (between the storage controller and the enclosure) performs data transfer processing between the storage controller and the drive enclosure. The data transfer control unit (between the host computer and the enclosure) 1414 performs data transfer processing between the host computer compatible with NVMeoF and the drive enclosure according to the instructions of the host command processing unit 1410 and the offload command processing unit 1416.

The offload command communication unit (target) 1415 receives the offload command of data transfer from the storage controller 121 and transmits a completion response. The offload command processing unit 1416 performs analysis of the offload command, read processing, creation of a completion response of the offload command, transmission of the completion response of the offload command via the offload command communication unit (target) 1415, and the like. The controller command communication unit (target) 1417 performs controller command reception and completion response transmission with the storage controller 121.

The drive control unit 1418 performs the management of the drive 218 and, read or write processing on the drive 218 according to the instructions of the host command processing unit 1410 and the offload command processing unit 1416. The buffer control unit 1412 secures and releases a buffer, which is a temporary memory area for data transfer. The controller command processing unit 1420 receives a command issued by the storage controller by using the target driver 1409, and performs analysis of the command, read or write processing, creation of a completion response of the command, transmission of the completion response of the command via the target driver 1409, and the like.

(15) Identification Names of Host Computer and NVM Subsystem in NVMe Over Fabrics According to Target Configuration Form 2

Figure 15:
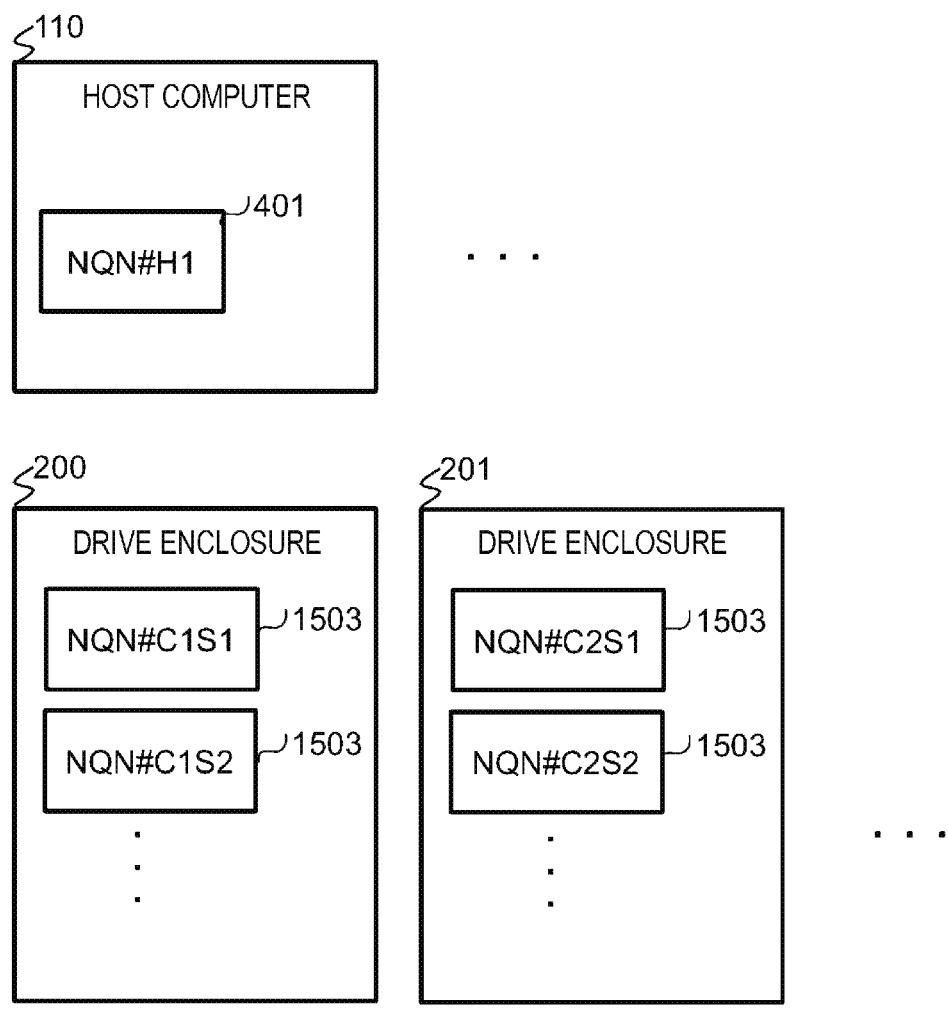
FIG. 15 is a diagram illustrating identification names of a host computer and an NVM subsystem in NVMe over Fabrics of Example 3.

FIG. 15 is a diagram illustrating identification names of the host computer and the NVM Subsystem in the NVMe over Fabrics according to the Farget Configuration Form 2.

The host computer 110 has at least one identification name 401 (host NQN). The host computer 110 may be plural, but the illustration thereof is omitted. The drive enclosure 200 has at least one identification name 1503 (NVM Subsystem NQN). In the NVM subsystem corresponding to the identification name 1503, a logical storage area to which a part of the storage pool is allocated is allocated as a namespace. The storage pool is a storage area which is constructed from the storage areas of a plurality of drives 218 and is data-protected, for example, with RAID. The same applies to the drive enclosure 201, and the description thereof is omitted. Two or more drive enclosures 200 and drive enclosures 201 may be provided, but are not illustrated. The present target configuration form differs from FIG. 4 in that the NVM Subsystem of the storage controller is unnecessary because the drive enclosure receives a command of the host computer, and there is no NVM Subsystem of the storage controller.

The creation of the NVM Subsystem of the drive enclosure is performed by the master-slave method. The storage device 120 is a master, and the drive enclosure 200 (and the drive enclosure 201) is a slave. This is because the storage device 120 having a data protection function manages and stores information defining the NVM subsystem of the drive enclosure as configuration information of the storage device. As a result, it is possible to provide the data protection function of the storage controller and the functions of the program product (the functions of the storage device) such as Snapshot and Thin Provisioning that operate on the storage controller. The information that defines the NVM subsystem includes the NVM subsystem NQN (here, refers to the identifier 1503), information on the NVM transport (information that defines the connection between the host computer and the NVM Subsystem, here, refers to the IP address of the drive enclosure, TCP/UDP port, and the like), a serial number, a model number, and the like.

The main flow until the storage device 120 recognizes the drive of the drive enclosure and provides the storage area to the host computer is as follows. First, the storage device 120 acquires the mounting information of the drive 508 from the drive enclosure and creates the drive information table 930 of FIG. 9C. Next, the storage device 120 combines the storage areas of the drive 508 in the drive information table 930 and constructs a storage area protected by RAID, mirroring or the like according to the data protection method. The combination of storage areas and the setting of the data protection method may be performed automatically or manually. Here, "automatically" means that the storage device 120 sets up automatically, and "manually" means that the storage device 120 sets up according to a user instruction. The combination of storage areas used for data protection is managed and stored in the data protection drive group table 3610. The data protection method in the storage system is a well-known technology, and the description thereof will be omitted. Next, the storage device 120 constructs a storage pool by collecting storage areas protected by RAID, mirroring, and the like. Next, the storage device 120 cuts out a part of the storage areas of the storage pool to construct a logical volume. Next, the storage device 120 creates an NVM subsystem and allocates a logical volume as a namespace. The storage device 120 manages the correspondence between the logical address of the logical volume and the physical address of the drive as the address conversion table 3600.

In the creation of the NVM subsystem, the storage device 120 specifies the information defining the above-described NVM subsystem as parameters so that the drive enclosure can provide the host computer with the logical storage area of the storage device 120, and instructs the drive enclosure 200 (and the drive enclosure 201) to create an NVM subsystem. The drive enclosure 200 (and the drive enclosure 201) creates the NVM subsystem according to the instruction. The creation of the NVM subsystem is performed, for example, at the time of startup, at the time of adding a drive enclosure, or at the time of configuration change.

Thus, the drive enclosure can provide the own storage area to the host computer, and the storage controller can protect the data of the storage area of each drive enclosure, for example, with RAID technology. That is, based on the configuration information of the storage controller, each drive enclosure is instructed to create an NVM subsystem; and based on instructions from the storage controller, the drive enclosure in which the NVM Subsystem has been created provides the created NVM Subsystem to the host computer as a storage area.

The host computer 110 enables command transmission and data transfer to the NVM Subsystem of the drive enclosure 200 (and the drive enclosure 201) by sending a connect command to the drive enclosure 200 (and the drive enclosure 201).

(16) Processing Procedure of Host Command and Offload Command in Drive Enclosure According to Target Configuration Form 2

Figure 16:
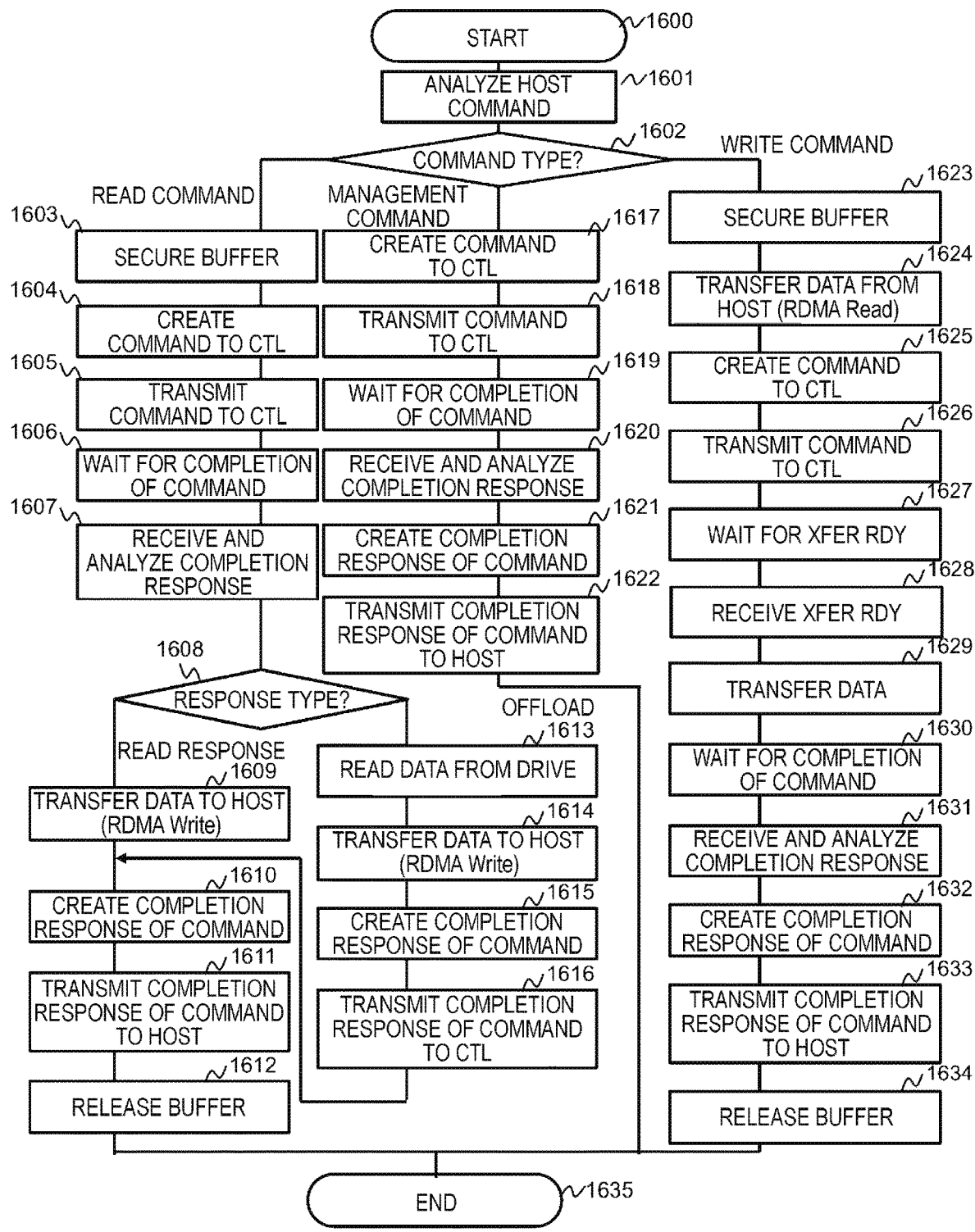
FIG. 16 is a flowchart illustrating processing procedures of a host command and an offload command in a drive enclosure of Example 3.

FIG. 16 is a flowchart illustrating a processing procedure of a host command and an offload command in the drive enclosure according to the Target Configuration Form 2.

When the target driver 1409 of the drive enclosure 200 receives a command from the host computer 110, the host command processing unit 1410 starts the processing of step 1600 and subsequent steps.

First, the host command processing unit 1410 analyzes the received NVMe command (for the format of host command, refer to the format 910 in FIG. 9A) and reads the fields of command type 912, NID (namespace ID) 913 which is an identifier of the namespace, start address 914, and data transfer length 915 (step 1601).

Next, the processing branches depending on the command type (step 1602). If the command type is a read command, the processing proceeds to step 1603. If the command type is a write command, the processing proceeds to step 1623. If the command type is a management command, the processing proceeds to step 1617. The flow in the case where the command type is a read command in step 1601 will be described below.

When the processing branches to step 1603, the host command processing unit 1410 secures a buffer area for storing read data (step 1603). Next, a read command (read request) of the enclosure command is created (step 1604). The read command reads data in the address range specified by the read command of the host computer 110 and stores the data in the secured buffer area. The command issued by the drive enclosure to the storage controller is called an enclosure command. The format and creation method of the enclosure command will be described in FIG. 22.

Next, the created enclosure command is transmitted to the storage controller 121 by using the enclosure command communication unit (initiator) 1411 (step 1605). Next, the processing waits for a command completion response from the storage controller 121 (step 1606). Next, the completion response of the read command from the storage controller 121 is received via the enclosure command communication unit (initiator) 1411, and the completion response of the read command is analyzed (step 1607). In step 1607, if the target data of the host command is not stored in the drive 218 connected in the same drive chassis 140 as the target driver 1409 that has received the host command, based on the address conversion table, the storage controller transmits a completion response including a normal read response to the enclosure. If the target data of the host command is stored in a drive in the same drive chassis 140 as the target driver 1409 that has received the host command, the storage controller transmits a completion response including an offload instruction. When the completion response is an error, processing at the time of abnormality occurrence is performed, but the description thereof is omitted here. The following description is continued assuming that the completion response is successful.

Next, the processing branches depending on the type of the completion response (1608). If the completion response is a read response, the processing proceeds to step 1609. If the completion response is a read response with an offload instruction, the processing proceeds to step 1613. In the following, the flow in the case where the response type of the command in step 1608 is a read response will be described.

When the processing branches from step 1608 to step 1609, the read data is transferred to the host computer 110 (step 1609). Specifically, the data transfer control unit (between the host computer and the drive enclosure) 1414 transfers the read data stored in the buffer to the physical memory area 503 in the host computer 110 specified by the read command. Here, as in Example 1, it will be described that data transfer is performed by RDMA Write on a memory area of a command issuing source specified in a command. However, in the present example in which the drive chassis operates as a target of NVMe over Fabrics with respect to the host computer instead of the storage controller, not only RDMA but also TCP, Fibre Channel or the like can be used as the NVMe transport. Therefore, data transfer is not limited to RDMA Write, and data transfer defined by NVMe transport may be used.

Next, the host command processing unit 1410 creates a completion response of the command corresponding to the read command from the host computer 110 (step 1610). Next, the command completion response is transmitted to the host computer 110 by using the target driver 1409 (step 1611). Next, the secured buffer area is released (step 1612). Finally, the processing ends (step 1635).

Next, returning to the description of step 1608 and subsequent steps in the flowchart, the processing flow in the case where the response type of the command is a read response with an offload instruction will be described. When the processing branches from step 1608 to step 1613, the offload command processing unit 1416 reads data to be read from the drive into the buffer area secured according to the offload instruction (step 1613). The drive 508 which has stored the data to be read is identified by the identification name 402 specified in the offload instruction. The values of the offload instruction are specified as the namespace ID, start address and the data transfer length of the read command issued to the drive. The drive enclosure reads data from the drive which is a storage unit according to the offload command. The method in which the drive enclosure reads data from the own drive is a common method and details thereof are omitted.

Next, the data transfer control unit (between the host computer and the drive enclosure) 1414 transfers the read data stored in the buffer to the physical memory area 503 in the host computer 110 specified by the read command (step 1614). Since data responding to commands does not necessarily need to be transferred from the request destination device of the queued commands, data is transferred directly from the drive enclosure to the host computer, eliminating the storage controller bottleneck.

Next, a completion response of the offload command is created (step 1615). Next, the offload command communication unit (target) 1415 is used to transmit the completion response of the offload command to the storage controller 121 (step 1616). Hereinafter, steps 1610, 1611, 1612 and 1635 are as described above. This is because it is necessary to notify the storage controller, which is the offload command issuing source, of the completion of the processing.

Next, returning to the description of step 1623 and subsequent steps in the flowchart, the processing flow in the case where the command type is a write command will be described. When the processing branches from step 1602 to step 1623, the host command processing unit 1410 secures a buffer area for storing write data (step 1623). Next, the data transfer control unit (between the host computer and the drive enclosure) 1414 transfers the data of the physical memory area 503 in the host computer 110 specified by the write command to the secured buffer area (step 1624). Next, the host command processing unit 1410 creates a write command of an enclosure command which writes the write data in the buffer area to the address range specified by the write command of the host computer 110 (step 1625).

Next, the enclosure command is transmitted to the storage controller 121 by using the enclosure command communication unit (initiator) 1411 (step 1626). Next, the processing waits for XFER RDY from the storage controller 121 (step 1627). XFER RDY is a message indicating that writing is ready. Next, the XFER RDY from the storage controller 121 is received via the enclosure command communication unit (initiator) 1411 (step 1628).

Next, the data transfer control unit (between the storage controller and the drive enclosure) 1413 transfers the write data stored in the buffer area to the storage controller (step 1629). Next, the processing waits for the command completion of the storage controller 121 (step 1630). Next, the command completion response of the write command is received from the storage controller 121 via the enclosure command communication unit (initiator) 1411, and the command completion response of the write command is analyzed (step 1631). Next, the completion response of the command corresponding to the write command from the host computer 110 is created (step 1632). Next, the command completion response is transmitted to the host computer 110 by using the target driver 1409 (step 1633). Next, the secured buffer area is released (step 1634). Finally, the processing ends (step 1635).

Next, returning to the description of step 1617 and subsequent steps in the flowchart, the processing flow in the case where the command type is a management command will be described. When the processing branches from step 1602 to step 1617, next, the content of the management command of the host computer 110 is copied to create a management command of the enclosure command (step 1617). Next, the enclosure command is transmitted to the storage controller 121 by using the enclosure command communication unit (initiator) 1411 (step 1618). Next, the processing waits for the command completion of the storage controller 121 (step 1619). Next, the command completion response of the management command is received from the storage controller 121 via the enclosure command communication unit (initiator) 1411, and the command completion response of the management command is analyzed (step 1620). Next, a completion response of the command corresponding to the management command from the host computer 110 is created (step 1621). Next, the command completion response is transmitted to the host computer 110 by using the target driver 1409 (step 1622). Finally, the processing ends (step 1635).

(17) Processing Procedure of Enclosure Command in Storage Controller According to Target Configuration Form 2

Figure 17:
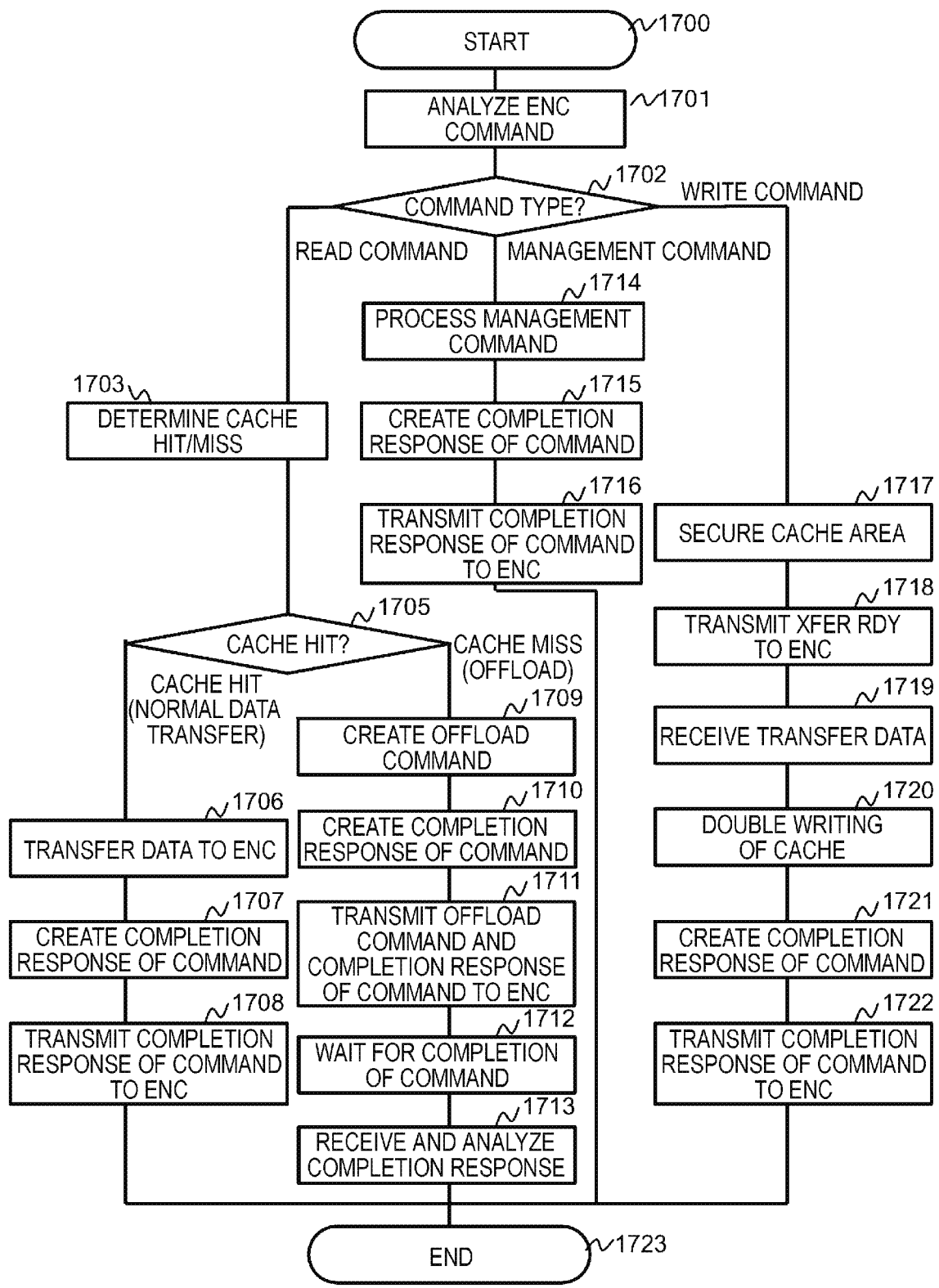
FIG. 17 is a flowchart illustrating a processing procedure of an enclosure command in a storage controller of Example 3.

FIG. 17 is a flowchart illustrating a processing procedure of an enclosure command in the storage controller according to the Target Configuration Form 2. When the enclosure command communication unit (target) 1401 of the storage controller 121 receives an enclosure command from the drive enclosure 200, the enclosure command processing unit 1402 starts the processing of step 1700 and subsequent steps.

First, the enclosure command processing unit 1402 analyzes the received enclosure command and reads the fields of command type, NID (namespace ID) which is an identifier of the namespace, start address, and data transfer length (step 1701). Next, the processing branches depending on the command type (step 1702). If the command type is a read command, the processing proceeds to step 1703. If the command type is a write command, the processing proceeds to step 1717. If the command type is a management command, the processing proceeds to step 1714. The flow in the case where the command type is a read command in step 1702 will be described below.

When the processing branches to step 1703, a cache hit/miss determination is performed based on the identification name 403 obtained from the enclosure command communication unit (target) 1401, the information of the NID, the start address and the data transfer length obtained in step 1701 (step 1703). Next, the processing branches depending on a cache hit or a cache miss (step 1705). In the case of a cache hit, the processing proceeds to step 1706, and in the case of a cache miss, the processing proceeds to step 1709. Here, the cache hit/miss determination determines whether or not data responding to an IO command from the host computer exists in the cache memory 204 of the storage controller. For example, if the IO command from the host computer is a read command, it is determined whether or not data responding to the read command exists in the cache memory 204.

In the case of a cache hit, data in the cache is transferred to the drive enclosure 200 by using the data transfer control unit (between the storage controller and the drive enclosure) 1403 (step 1706). Next, a completion response of read command of the enclosure command is created (step 1707). Next, the completion response of the command is transmitted to the drive enclosure 200 by using the enclosure command communication unit 1401 (target) (step 1708). Finally, the processing ends (step 1723).

Hereinafter, returning to step 1709 and subsequent steps in the flowchart, the processing flow in the case of a cache miss will be described. When the processing branches from step 1705 to step 1709, the data transfer offload unit 1405 creates an offload command necessary for data transfer by referring to the address conversion table or the like (step 1709). The control data required for the offload command and the creating method thereof are as described in FIGS. 9A to 9D.

Next, a completion response of read command of the enclosure command is created (step 1710). Next, the drive enclosure 200 of the data storage destination is identified from the identification name 403 obtained from the enclosure command communication unit (target) 1401, and the information of the NID, the start address and the data transfer length obtained in step 1701, and the offload command communication unit (initiator) 1406 is used to transmit completion responses of the offload command and the read command to the drive enclosure 200 (step 1711).

Next, the processing waits for the completion of the offload command from the drive enclosure 200 (step 1712). Next, a completion response of the offload command from the drive enclosure 200 is received via the offload command communication unit (initiator) 1406, and the completion response of the offload command is analyzed (step 1713). Finally, the processing ends (step 1723).

Hereinafter, returning to the description of step 1702 and subsequent steps in the flowchart, the processing flow in the case where the command type is a write command will be described. When the processing branches from step 1702 to step 1717, the enclosure command processing unit 1402 secures a cache area for storing write data (step 1717). Next, XFER RDY is transmitted to the drive enclosure 200 via the enclosure command communication unit (target) 1401 (step 1718). Next, the data transfer control unit (between the storage controller and the enclosure) 1403 receives the data transferred from the drive enclosure (step 1719).

Next, the write data is transferred to the other storage controller to double-write the cache (step 1720).

Next, a command completion response corresponding to the write command of the drive enclosure is created (step 1721).

Next, the completion response of the command is transmitted to the drive enclosure 200 by using the enclosure command communication unit (target) 1401 (step 1722). Finally, the processing ends (step 1723).

Hereinafter, returning to the description of step 1714 and subsequent steps in the flowchart, the processing flow in the case where the command type is a management command will be described. When the processing branches to step 1714, the enclosure command processing unit 1402 processes the management command according to the content specified by the management command (step 1714). Next, a completion response of the command including the processing result of the management command is created (step 1715). Next, the command completion response is transmitted to the drive enclosure 200 by using the enclosure command communication unit (target) 1401 (step 1716). Finally, the processing ends (step 1723).

(18) Processing Procedure of Destaging in Storage Controller According to Target Configuration Form 2

Figure 18:
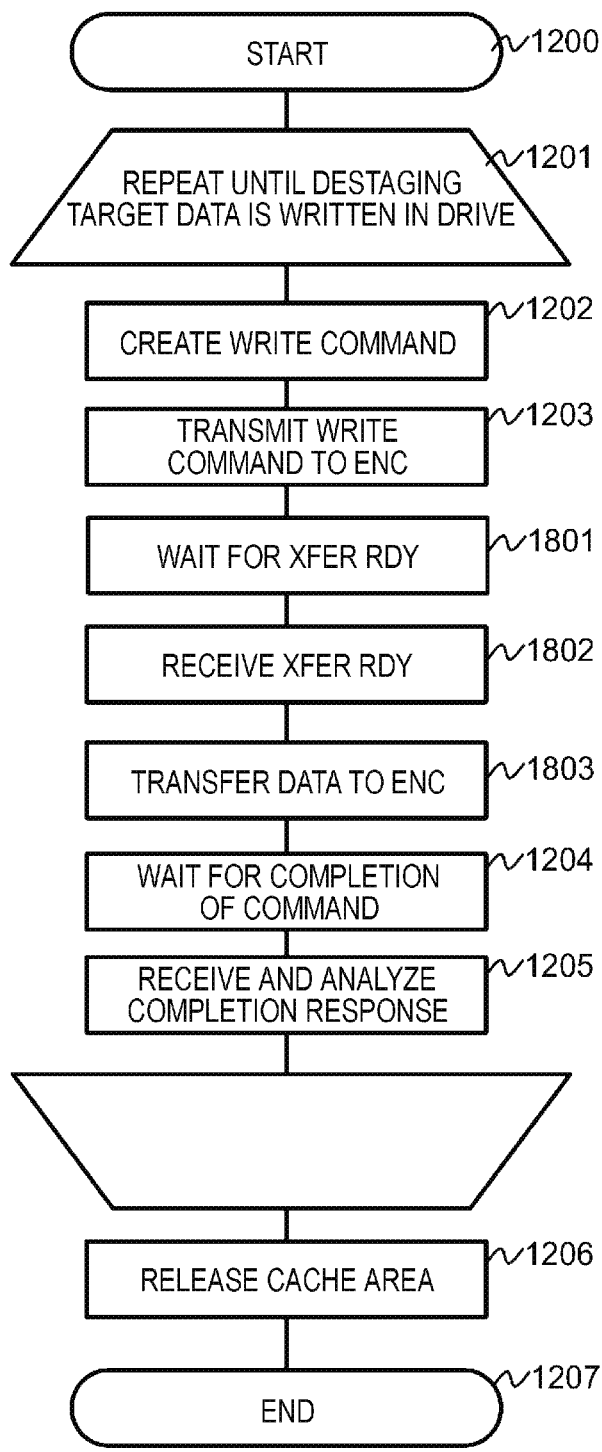
FIG. 18 is a flowchart illustrating a process procedure of destaging in the storage controller of Example 3.

FIG. 18 is a flowchart illustrating a processing procedure of destaging in the storage controller according to the Target Configuration Form 2. Since there are many points in common with FIG. 12, only the differences will be described for ease of understanding. The difference is that the point at which data transfer of write data in FIG. 12 was performed by RDMA Read of the drive enclosure 200 is changed to the transmission of data transferred from the storage controller 121.

The change points are from step 1801 to step 1803. That is, after step 1203, the destaging unit 1407 waits for XFER RDY from the drive enclosure 200 (step 1801). Next, XFER RDY is received from the drive enclosure via the offload command communication unit (initiator) 1406 (step 1802). Next, the data transfer control unit (between the storage controller and the enclosure) 1403 transmits the transferred data to the drive enclosure (step 1803). Step 1204 and subsequent steps are the same as in FIG. 12.

(21) Processing Procedure of Controller Command in Drive Enclosure According to Target Configuration Form 2

Figure 21:
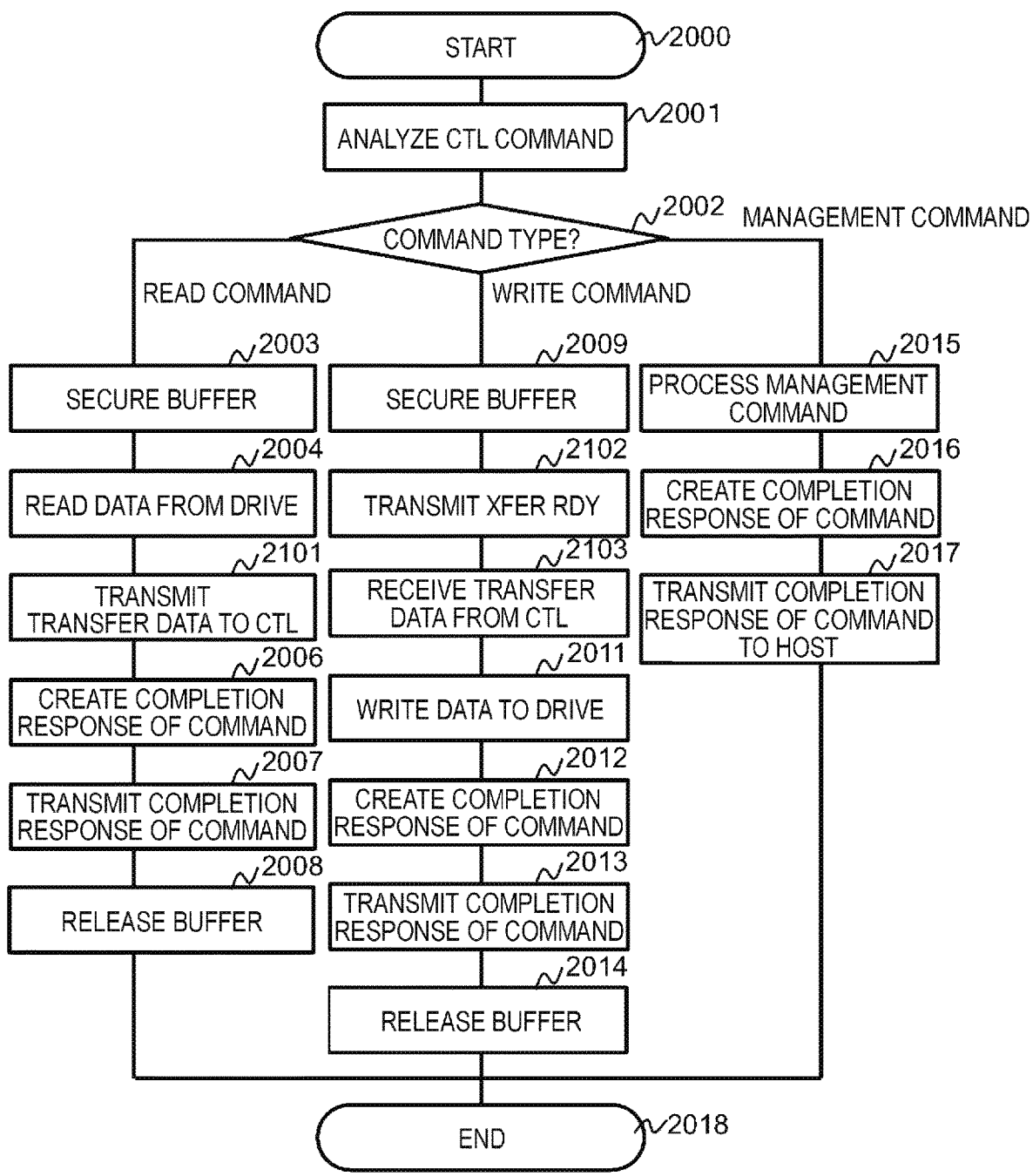
FIG. 21 is a flowchart illustrating a processing procedure of a controller command in the drive enclosure of Example 3.

FIG. 21 is a flowchart illustrating a processing procedure of a controller command in the drive enclosure according to the Farget Configuration Form 2.

Since there are many points in common with FIG. 20, only the differences will be described for ease of understanding. The difference is the data transfer with the storage controller. The data transfer by RDMA Write in step 2005 changes to data transfer in the data transfer control unit (between the storage controller and the drive enclosure) 1413 (step 2101). In addition, the data transfer by RDMA Read in step 2010 changes to XFER RDY transmission (step 2102) from the drive enclosure 200 to the storage controller 121 and reception (step 2103) of data transferred from the storage controller by the data transfer control unit (between the storage controller and the drive enclosure) 1413. The other steps are the same as in FIG. 20.

(22) Host Information Table of Drive Enclosure and Format of Enclosure Command

FIG. 22 is a diagram illustrating a host information table of the drive enclosure. FIG. 23 is a diagram illustrating a format of an enclosure command.

The host information table of FIG. 22 is configured from items of queue number 2201, host NQN 2202, and NVM subsystem NQN 2203. In Example 3, the drive enclosure 200 operates as a target of NVMe over Fabrics with respect to the host computer 110. Therefore, the drive enclosure 200 stores information on the host computer in the host information table so that the host computer information can be referred to in host command processing.

The queue number 2201 is the number of the IO queue between the host computer and the NVM subsystem. When the drive enclosure 200 receives a connect command from the host computer 110 to create an IO queue in order to manage the IO queue internally, the drive enclosure 200 assigns the queue number. The queue number is a unique value inside the drive enclosure 200. The host NQN 2202 and the NVM subsystem NQN 2203 are the NQN of the host computer 110 and the NQN of the NVM subsystem of the drive enclosure 200 linked by the above IO queue, respectively. The NVM subsystem NQN 2203 corresponds to the identification name 1503.

The fields of the enclosure command illustrated in FIG. 23 are configured from a command identifier 2211, a host NQN 2212, a drive enclosure number 2213, a drive enclosure memory address 2214, an NVM Subsystem NQN 2215, a command type 2216, an NID (namespace ID) 2217, a start address 2218, a data transfer length 2219, a memory address 2220, and an R key 2221.

The command identifier 2211 is an identifier for identifying each command. The host NQN 2212 is an NQN (corresponding to the host NQN 2202) of the host computer 110 which is a command issuing source. The enclosure number 2213 is a number for identifying the issuing source of the enclosure command and is the number of the drive enclosure 200 itself. The drive enclosure number is a number assigned by the storage controller 121 to manage the drive enclosure 200. The numbering timing is, for example, when the storage device starts up or when a drive enclosure is added.

The memory address 2214 is an address of a data buffer used by the drive enclosure 200 for data transfer with the storage controller 121. Data communication between the drive enclosure 200 and the storage controller 121 can use RDMA communication or FC (Fibre Channel) which is common in storage devices. If RDMA communication is used, R key is required in addition to the memory address 2214, but the description thereof is omitted here because the data communication not limited to RDMA communication.

The NVM subsystem NQN 2215 is an NQN (corresponding to the identification name 1503) of the NVM subsystem to be accessed by the host command.

The command type 2216, the NID 2217, the start address 2218, the data transfer length 2219, the memory address 2220, and the R key 2221 are the command identifier 911, the command type 912, the NID 913, the start address 914, the data transfer length 915, the memory address 916, and the R key 917 of the host command, respectively.

The host command processing unit 1410 sets the values of the fields 2211 to 2221 of the enclosure command as follows.

The host command processing unit 1410 sets a unique value among the executing enclosure commands in the command identifier 2211.

The host command processing unit 1410 checks the IO queue for which the target driver 1409 of the drive enclosure 200 has received a command from the host computer 110 and the entry of the host information table 2200 of the drive enclosure and sets the host NQN 2202 and the NVM subsystem NQN 2203 corresponding to the IO queue to the host NQN 2212 and the NVM subsystem NQN 2215 (corresponding to the identification name 1503).

The host command processing unit 1410 sets the own enclosure number as the enclosure number 2213, and the address of the data buffer used by the drive enclosure 200 for data transfer with the storage controller 121 as the enclosure memory address 2214.

The host command processing unit 1410 sets the values of the command identifier 911, the command type 912, the NID 913, the start address 914, the data transfer length 915, the memory address 916, the R key 917, of the host command received from the host computer, to the command type 2216, the NID 2217, the start address 2218, the data transfer length 2219, the memory address 2220, and the R key 2221.

In Example 3, unlike Examples 1 and 2, the drive enclosure connected to the host computer via the network receives an IO command directly from the host computer. If the IO command is a read command, the drive enclosure transfers read data directly to the host computer and also performs a completion report. That is, the drive enclosure provides the host computer with the created NVM subsystem as a storage area for the host computer.

According to Example 3, it is possible to reduce the processing load on the storage controller by the offload function of the drive enclosure and to transfer read data directly to the host computer in response to a read command while maintaining the data protection technology of the storage controller.

Example 4

(19) Configuration of Information Processing System of Example 4

Figure 19:
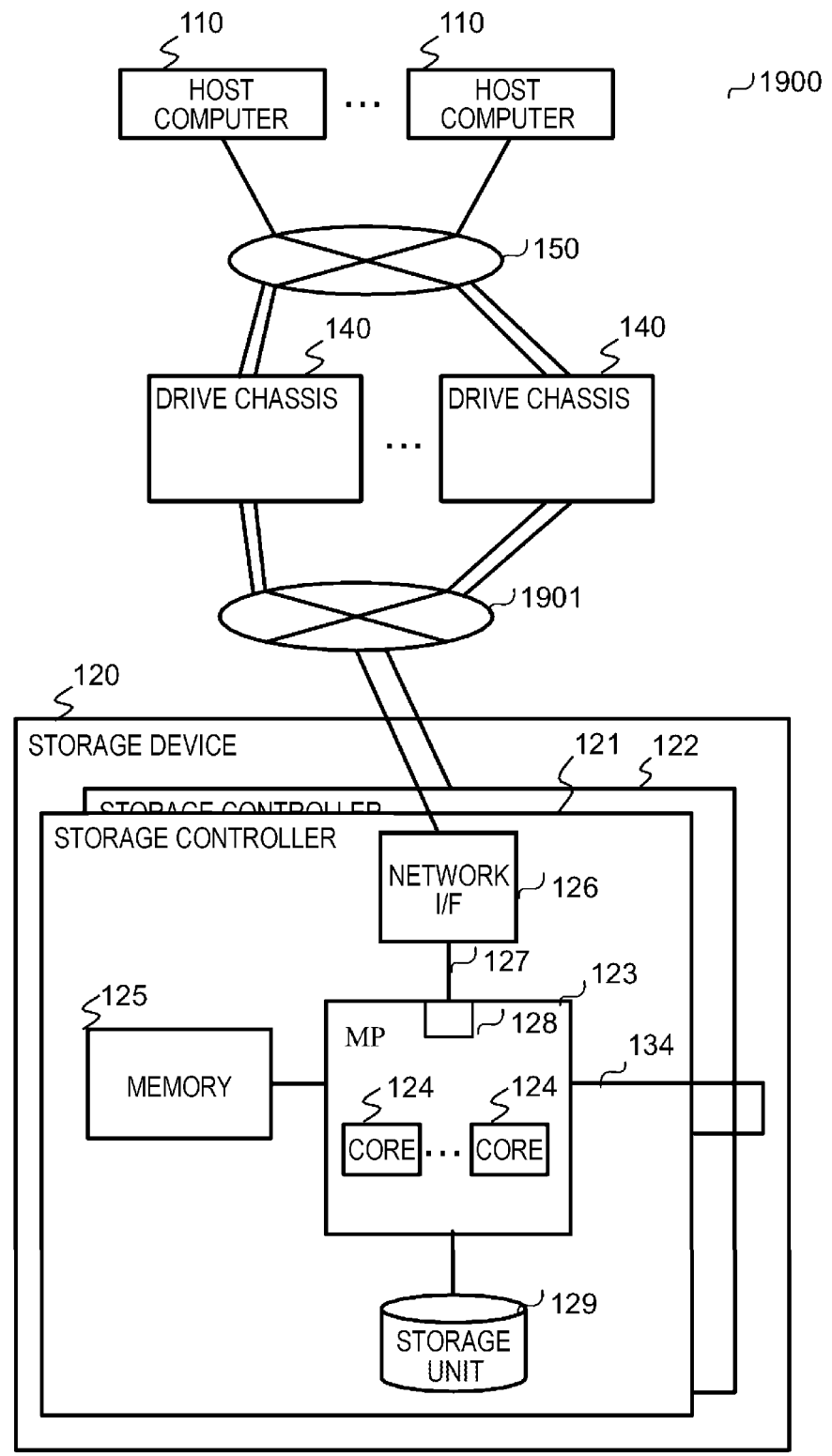
FIG. 19 is a block diagram illustrating a configuration of an information processing system of Example 4.

FIG. 19 is a diagram of a connection configuration of an information processing system according to a form (Connection Form 2: Example 4, Example 6, and Example 8) in which a storage controller is connected to a different network than the network connected to a host computer and a form of a Target Configuration Form 2.

Since there are many points in common with FIG. 1, only the differences will be described for ease of understanding. The difference from FIG. 1 is that the drive chassis 140 is connected to two separate networks of the network 150 and a network 1901. The network 150 is a network in which the host computer 110 and the drive chassis 140 are connected, and the network 1901 is a network in which the storage device 120 and the drive chassis 140 are connected. Here, the drive chassis 140 is connected to the network 150 and the network 1901 via the network I/F 205. In addition, the storage device 120 is connected to the network 1901 via the network I/F 126.

The control method of the storage device 120 and the drive chassis 140 in Example 4 is the same as that of Example 3, and thus, the description thereof is omitted.

The network 1901 may be a PCIe network. In this case, the drive chassis 140 is connected to the network 1901 via the PCIe port 206 instead of the network I/F 205. Also, the storage device 120 is connected to the network 1901 via the PCIe port 126 instead of the network I/F 126. The control method of the storage device 120 and the drive chassis 140 is the same as that of Example 3 except that data transfer method (for example, DMA) via PCIe network is used, and thus the description thereof is omitted.

According to Example 4, as in Example 3, the drive enclosure 140 can have a network configuration more suitable for a form in which an IO command or the like is received from the host computer.

Example 5

An outline of Example 5 will be described. Example 5 corresponds to an example in which the write IO of Example is speeded up. The configuration of the information processing system of Example 5 is as illustrated in FIG. 1. In Example 5, as in Example 3, a drive chassis operates as a target of NVMe over Fabrics with respect to the host computer instead of the storage controller (Target Configuration Form 2).

Write data is transferred from the host computer to the drive chassis without passing through the storage controller and the drive chassis writes the write data to the drive, whereby the speeding up of the write IO is realized. The storage controller determines the writing destination of write data, and the drive chassis inquires of the storage controller to acquire the writing destination of write data (Cooperation System 1 for write IO processing). The identification names of the host and the NVM subsystem in NVMe over Fabrics are the same as in Example 3 as illustrated in FIG. 15, and thus the description thereof is omitted.

(23) Program Configuration of Host Computer, Storage Controller, and Drive Enclosure in System (Cooperation System 1 of Write IO Processing) in which Storage Controller Determines Writing Destination of Write Data and Storage Controller is Inquired about Writing Destination of Write Data in Method of Speeding Up of Write IO in Form in which Drive Chassis Operates as Target of NVMe Over Fabrics with Respect to Host Computer Instead of Storage Controller (Target Configuration Form 2: Same as Example 3)

Figure 24:
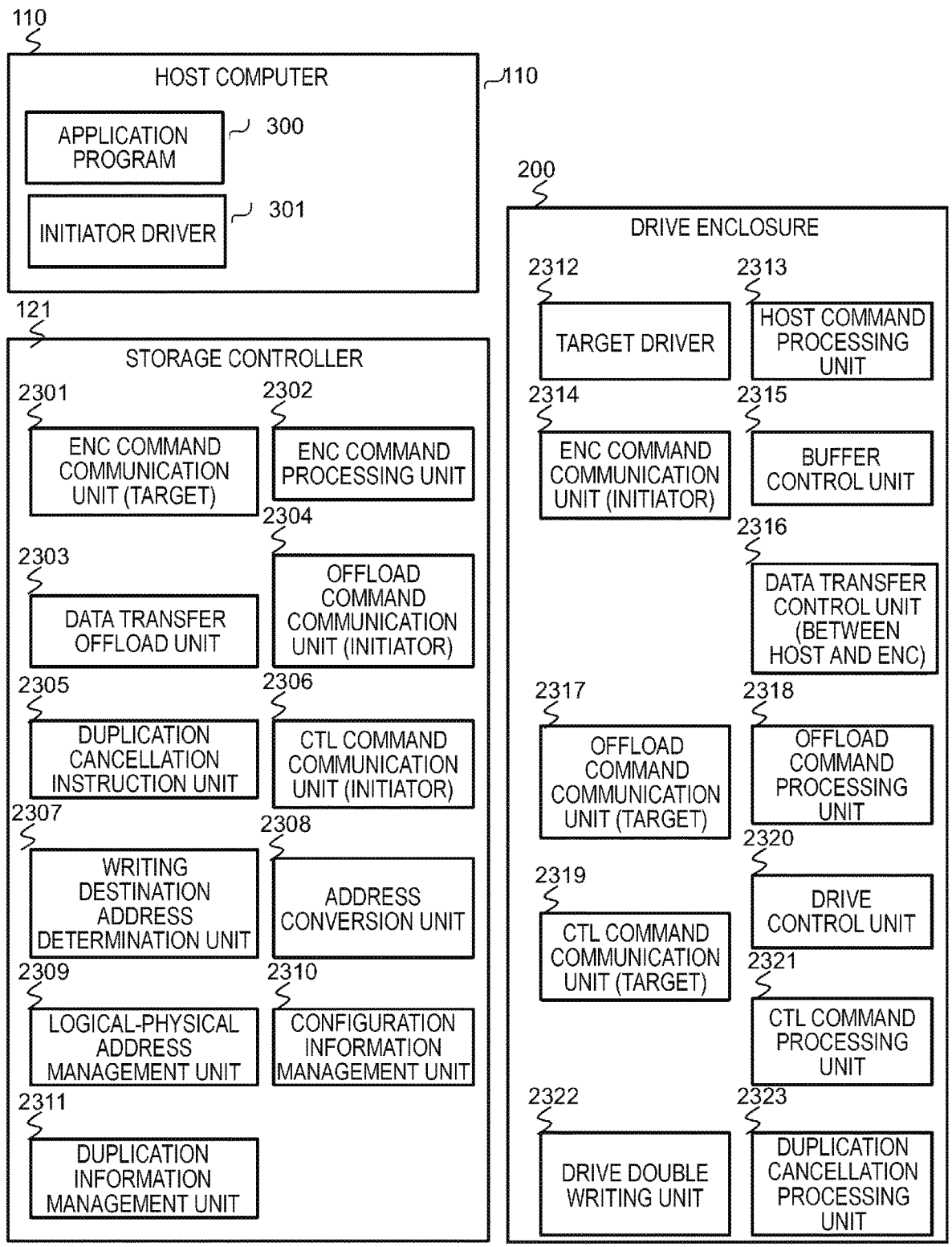
FIG. 24 is a configuration diagram of programs in a host computer, a storage controller, and a drive enclosure of Example 5.

FIG. 24 is a diagram illustrating a program configuration of a host computer, a storage controller, and a drive enclosure in a system in which the storage controller determines the writing destination of write data based on the address conversion table and the storage controller is inquired about the writing destination of write data (cooperation system 1 of write IO processing) in the method of speeding up write IO, in a form in which the drive chassis operates as a target of NVMe over Fabrics with respect to the host computer instead of the storage controller.

The program of the storage controller 121 is configured from an enclosure command communication unit (target) 2301, an enclosure command processing unit 2302, a data transfer offload unit 2303, an offload command communication unit (initiator) 2304, a duplication cancellation instruction unit 2305, a controller command transmission unit (initiator) 2306, a writing destination address determination unit 2307, an address conversion unit 2308, a logical-physical address management unit 2309, a configuration information management unit 2310, a duplication information management unit 2311, and an OS (not illustrated).

The enclosure command communication unit (target) 2301 provides an enclosure command communication unit (initiator) 2314 with a storage area compatible with NVMeoF.

The enclosure command processing unit 2302 receives a command issued by the drive enclosure 200 by using the enclosure command communication unit (target) 2301, and performs analysis of the command, read or write processing, creation of a completion response of the command, transmission of the completion response of the command via the enclosure command communication unit (target) 2301, and the like.

The data transfer offload unit 2303 creates a data transfer offload command and instructs the drive enclosure 200 to transfer data between the host computer and the drive enclosure.

The offload command communication unit (initiator) 2304 transmits an offload command to the drive enclosure and receives a response from the drive enclosure. The duplication cancellation instruction unit 2305 instructs the drive enclosure 200 to release the duplication area by using a controller command. The controller command transmission unit (initiator) 2306 transmits the controller command to the drive enclosure and receives a completion response from the drive enclosure. The writing destination address determination unit 2307 determines the writing destination address of the write data to the drive in the drive enclosure. The address conversion unit 2308 has an address conversion table (mapping table) of the data range 505, the data storage destination which is consist of the drive enclosure 200, the drive 508 and the storage area 509 in the drive 508 and converts the address of the data range 505 into the corresponding drive enclosure 200, the drive 508 and the address of the storage area 509 in the drive 508.

The logical-physical address management unit 2309 controls the transition of each state of the exclusive access state and exclusive access release state of the storage area 509 corresponding to the data range 505, and the double writing state and double writing cancellation state of the storage area 509.

The configuration management unit 2310 has the role of initializing, updating, and storing storage system configuration information. The configuration information includes the hardware configuration and configuration settings of the storage controller, and the node information, hardware configuration and configuration settings of the drive chassis. The duplication information management unit 2311 has a role of initializing, updating, and storing the arrangement of a parity-generated area 2801, a duplication area 2802, and a primary area 2803 and a secondary area 2804 in the duplication area 2802. Each area will be described with reference to FIGS. 28 and 29.

The program of drive enclosure 200 is configured from a target driver 2312, a host command processing unit 2313, an enclosure command communication unit (initiator) 2314, a data transfer control unit (between the host computer and the enclosure) 2316, an offload command communication unit (target) 2317, an offload command processing unit 2318, a controller command communication unit (target) 2319, a drive control unit 2320, a buffer control unit 2315, a controller command processing unit 2321, a drive double writing unit 2322, a duplication cancellation processing unit 2323, and an OS (not illustrated).

The target driver 2312 provides the initiator driver 301 of the host computer 110 with a storage area compatible with NVMeoF. The host command processing unit 2313 receives a command issued by the host computer by using the target driver 2312, and performs analysis of the command, read or write processing, creation of a completion response of the command, transmission of the completion response of the command via the target driver 2312, and the like. The enclosure command communication unit (initiator) 2314 issues an enclosure command to the enclosure command communication unit (target) of the storage controller 121. The data transfer control unit (between the host computer and the enclosure) 2316 performs data transfer processing between the host computer compatible with NVMeoF and the drive enclosure according to the instructions of the host command processing unit 2313 and the offload command processing unit 2318.

The offload command communication unit (target) 2317 receives the offload command of data transfer from the storage controller 121 and transmits a completion response. The offload command processing unit 2318 performs analysis of the offload command, read processing, write processing, creation of a completion response of the offload command, transmission of the completion response of the offload command via the offload command communication unit (target) 2317, and the like. The controller command communication unit (target) 2319 performs controller command reception and completion response transmission with the storage controller 121. The controller command processing unit 2321 receives a command issued by the storage controller by using the controller command communication unit (target) 2319, and performs analysis of the command, execution of duplication cancellation processing, creation of a completion response of the command, transmission of the completion response of the command via the controller command communication unit (target) 2319.

The drive control unit 2320 performs the management of the drive 218 and read or write processing on the drive 218 according to the instructions of the host command processing unit 2313, the offload command processing unit 2318, the drive double writing unit 2322, and the duplication cancellation processing unit 2323. The buffer control unit 2315 secures and releases a buffer, which is a temporary memory area for data transfer.

The drive double writing unit 2322 performs writing processing of write data to two drives. Writing to two drives prevents loss of user data due to a drive failure. The duplication cancellation processing unit 2323 performs processing of switching data protection by double writing to data protection by RAID.

Figure 25:
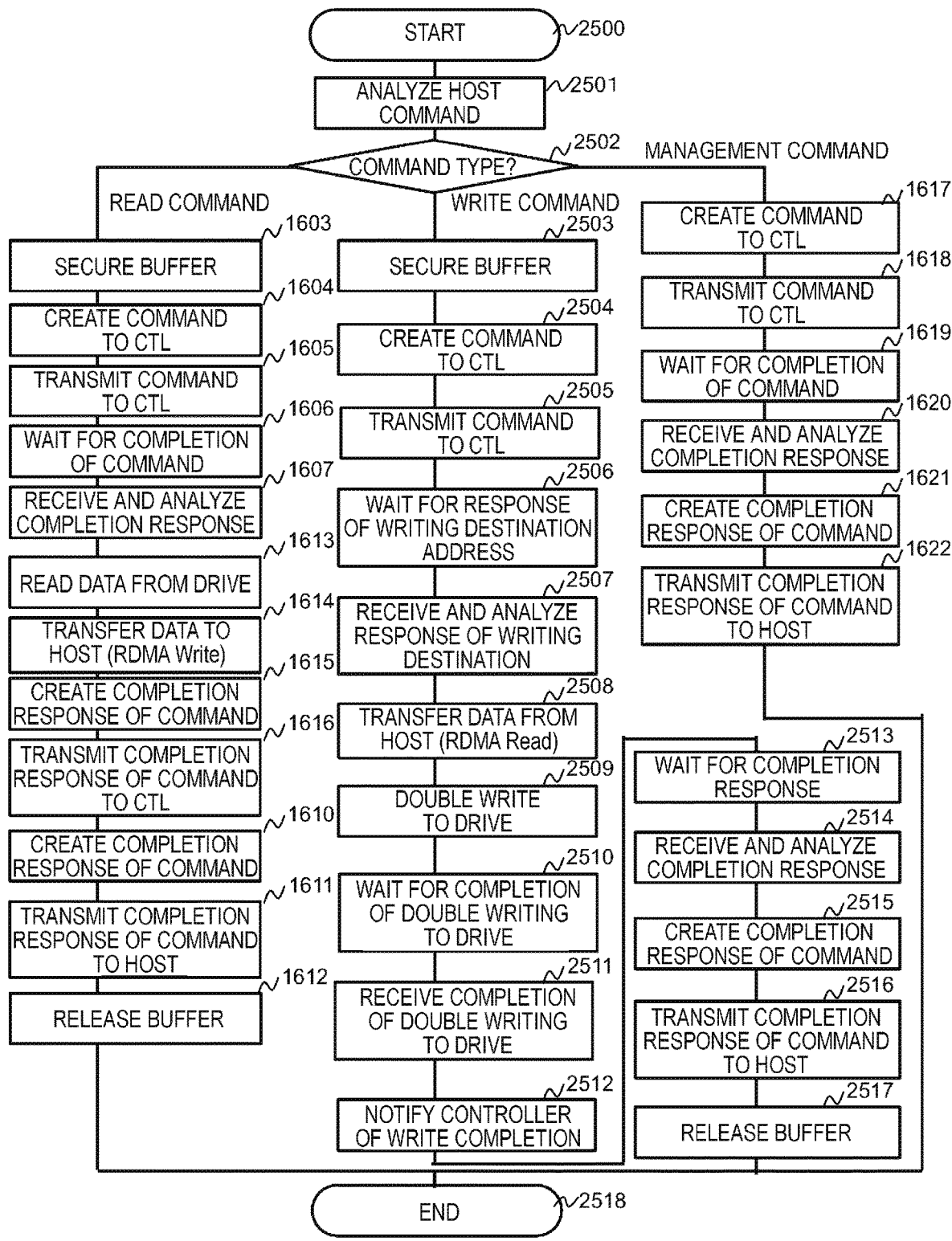
FIG. 25 is a flowchart illustrating a processing procedure of a host command in the drive enclosure of Example 5.

(25) Processing Procedure of Host Command in Drive Enclosure According to Target Configuration Form 2 and Cooperation System 1 of Write IO Processing FIG. 25 is a flowchart illustrating a processing procedure of a host command in the drive enclosure according to the Target Configuration Form 2 and the Cooperation System 1 of write IO processing. Since a part of the processing is common to the processing of FIG. 16, the step numbers in FIG. 16 are described for the common processing steps.

When the target driver 2312 of the drive enclosure 200 receives a command from the host computer 110, the host command processing unit 2313 starts the processing of step 2500 and subsequent steps.

First, the host command processing unit 2313 analyzes the received NVMe command (for the format of the command, refer to the format 910 of the host command in FIG. 9A) and reads the fields of command type 912, NID (namespace ID) 913 which is an identifier of the namespace, start address 914, and data transfer length 915 (step 2501).

Next, the processing branches depending on the command type (step 2502). If the command type is a read command, the processing proceeds to step 1603. If the command type is a write command, the processing proceeds to step 2503. If the command type is a management command, the processing proceeds to step 1617. The flow in the case where the command type is a read command in step 2502 will be described below.

When the processing branches to step 1603, the processing is the same as the processing in the case where the command type is a read command and the response type is offload in FIG. 16. Since the processing is the same, the subsequent description thereof is omitted.

Next, returning to the description of step 2502 and subsequent steps in the flowchart, the processing flow in the case where the command type is a write command will be described. When the processing branches from step 2502 to step 2503, the host command processing unit 2313 secures a buffer area for storing write data by using the buffer control unit 2315 (step 2503). Next, the host command processing unit 2313 notifies the storage controller 121 of the received write command, and also creates an enclosure command for inquiring about the writing destination address corresponding to the address range specified by the write command (step 2504).

Next, the host command processing unit 2313 transmits an enclosure command to the storage controller 121 via the enclosure command communication unit (initiator) 2314 (step 2505).

Next, the host command processing unit 2313 waits for a response of a writing destination address from the storage controller 121 (step 2506). Here, the writing destination address is obtained by the storage controller 121 with reference to the address conversion table. Next, the host command processing unit 2313 receives a notification of the writing destination address from the storage controller 121 via the enclosure command communication unit (initiator) 2314, and analyzes the notification to acquire the writing destination address (step 2507).

Next, the data transfer control unit (between the host computer and the drive enclosure) 2316 transfers the data of the physical memory area 503 in the host computer 110 specified by the write command to the secured buffer area (step 2508).

Next, the drive double writing unit 2322 double-writes the write data in the buffer area to the writing destination address received in step 2507 (step 2509). Double writing means writing in two drives, which will be described in detail with reference to FIGS. 28 and 29.

Next, the drive double writing unit 2322 waits for completion of double writing, that is, completion of writing from the drive corresponding to the double writing destination (step 2510). Next, the drive double writing unit 2322 receives a completion response of double writing (step 2511).

Next, the host command processing unit 2313 notifies the storage controller 121 of write completion via the enclosure command communication unit (initiator) 2314 (step 2512). Next, the host command processing unit 2313 waits for a completion response of the controller command (corresponding to the write command) from the storage controller 121 (step 2513).

Next, the host command processing unit 2313 receives a command completion response of the write command from the storage controller 121 via the enclosure command communication unit (initiator) 2314 and analyzes the command completion response of the write command (step 2514).

Next, a completion response of the command corresponding to the write command from the host computer 110 is created (step 2515). Next, the command completion response is transmitted to the host computer 110 by using the target driver 2312 (step 2516). Next, the secured buffer area is released (step 2517). Finally, the processing ends (step 2518).

Next, returning to the description of step 2502 and subsequent steps in the flowchart, the processing flow in the case where the command type is a management command will be described. When the processing branches from step 2502 to step 1617, the processing is the same as in the case where the command type is a management command in FIG. 16. Since the processing is the same, the subsequent description thereof is omitted.

Figure 27:
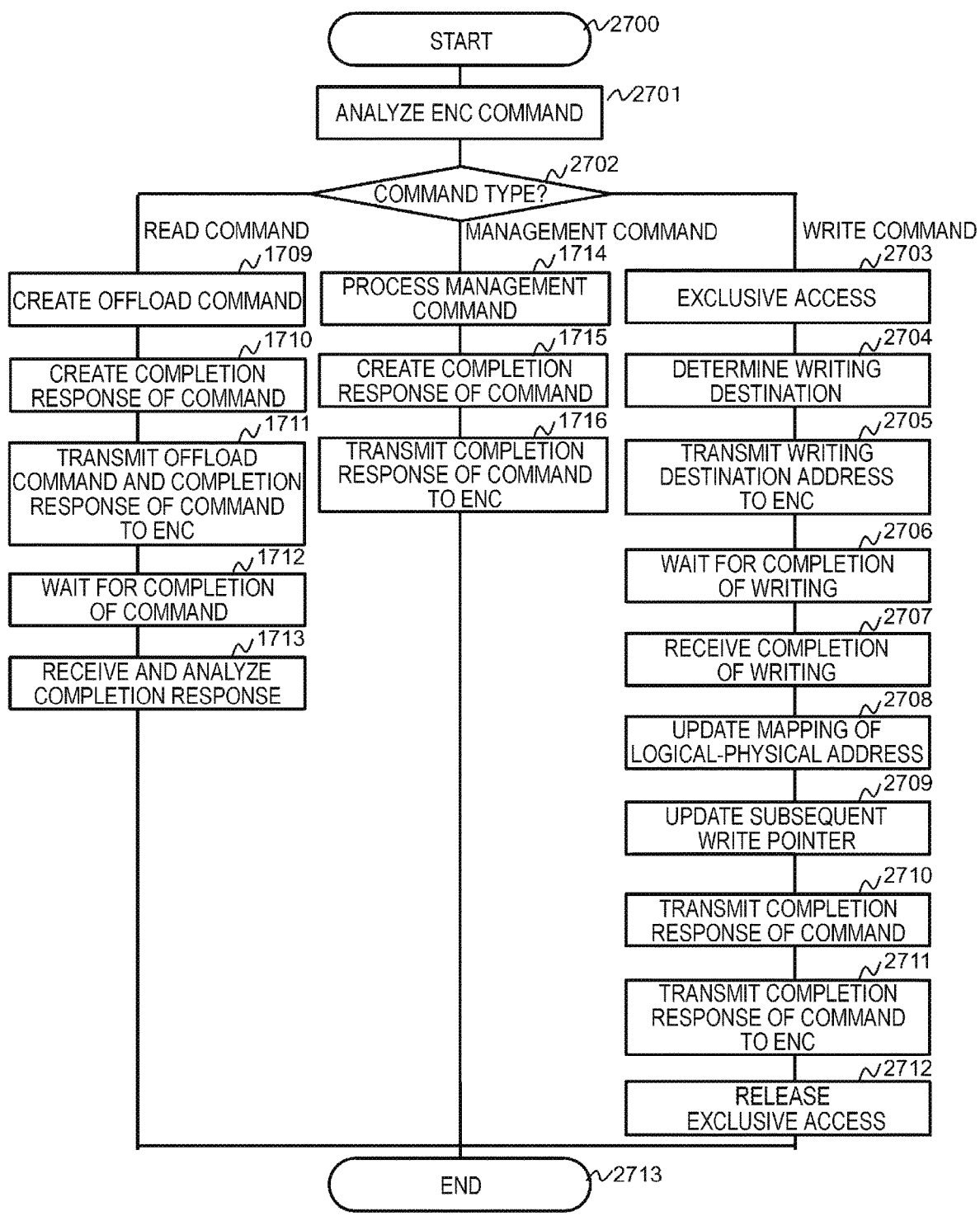
FIG. 27 is a flowchart illustrating a processing procedure of an enclosure command in the storage controller of Example 5.

(27) Processing Procedure of Enclosure Command in Storage Controller According to Target Configuration Form 2 and Cooperation System 1 of Write IO Processing FIG. 27 is a flowchart illustrating a processing procedure of an enclosure command in the storage controller according to the Target Configuration Form 2 and the Cooperation System 1 of write IO processing. Since a part of the processing is common to the processing of FIG. 17, the step numbers in FIG. 17 are described for the common processing steps.

When the enclosure command communication unit (target) 2301 of the storage controller 121 receives an enclosure command from the drive enclosure 200, the enclosure command processing unit 2302 starts the processing of step 2700 and subsequent steps.

First, the enclosure command processing unit 2302 analyzes the received enclosure command and reads the fields of command type, NID (namespace ID) which is an identifier of the namespace, start address, and data transfer length (step 2701). Next, the processing branches depending on the command type (step 2702). If the command type is a read command, the processing proceeds to step 1709. If the command type is a write command, the processing proceeds to step 2703. If the command type is a management command, the processing proceeds to step 1714.

When the processing branches to step 1709, the processing becomes the same as in the case of offload in FIG. 17. Since the processing is the same, the subsequent description thereof is omitted.

The flow in the case where the command type is a write command in step 2702 will be described below. When the processing branches to step 2703, the enclosure command processing unit 2302 performs exclusive access to the write range of the logical volume based on the identification name 403 obtained from the enclosure command communication unit (target) 2301, and the information of the NID, the start address and the data transfer length obtained in step 2301 (step 2703). The reason for performing exclusive access is to ensure data consistency even when a plurality of write commands that access the same logical address are received.

Next, the writing destination address of the write data, that is, the drive as the double writing destination and the physical address are determined (step 2704). In this processing flow, since the drive chassis writes the write data instead of the storage controller, it is necessary to wait for the drive chassis to write the write data and to update the address conversion table managed by the storage controller.

Next, the writing destination address is transmitted to the drive enclosure 200 via the offload command communication unit (initiator) 2304 (step 2705). Next, the processing waits for the write completion from the drive enclosure 200 (step 2706).

Next, the write completion from the drive enclosure 200 is received via the offload command communication unit (initiator) 2304 (step 2707). Next, the address conversion unit 2308 updates the correspondence relationship of the address conversion table (step 2708). That is, the identifier of the double writing destination drive and the physical address are mapped to the logical address of the write range of the logical volume specified by the write command.

Next, the writing destination address determination unit 2307 updates a subsequent write pointer (step 2709). The subsequent write pointer is a pointer indicating how far the subsequent write processing has progressed. The pointer is, for example, the physical address of the drive or an index corresponding to the physical address of the drive. Next, a completion response of the enclosure command is created (step 2710).

Next, the completion response of the command is transmitted to the drive enclosure 200 via the enclosure command communication unit (target) 2301 (step 2711). Thus, the drive chassis is notified of the completion of the update of the address conversion table. Next, the exclusive access is released (step 2712). The drive chassis notifies the host computer of the completion of the write command, and the processing ends (step 2713).

Next, returning to the description of step 2702 and subsequent steps in the flowchart, the processing flow in the case where the command type is a management command will be described. When the processing branches from step 2702 to step 1714, the processing is the same as in the case where the command type is a management command in FIG. 17. Since the processing is the same, the subsequent description thereof is omitted.

Figure 26:
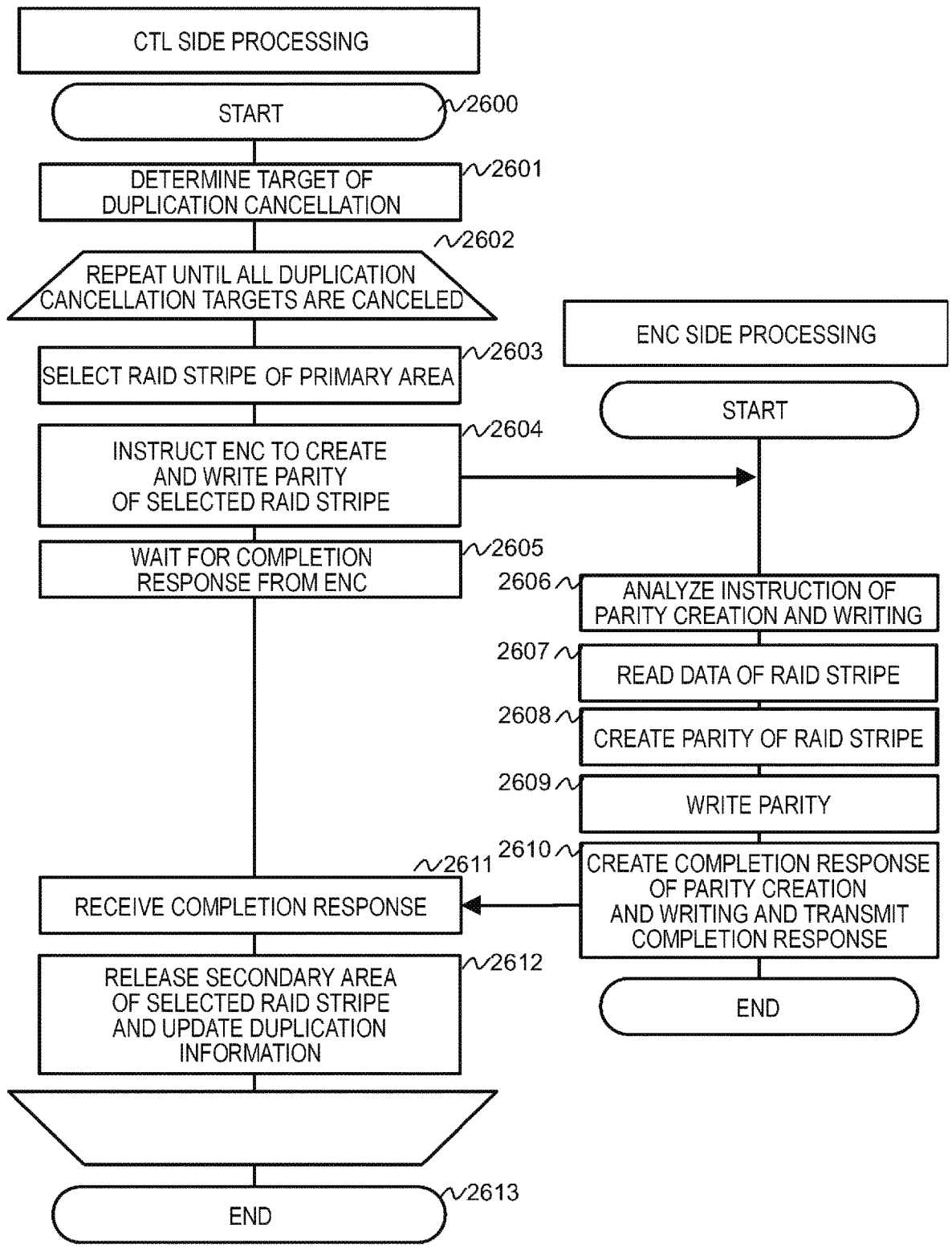
FIG. 26 is a flowchart illustrating a processing procedure of a controller command in the drive enclosure of Example 5.

(26) Processing Procedure of Controller Command in Drive Enclosure According to Target Configuration Form 2 and Cooperation System 1 of Write IO Processing FIG. 26 is a flowchart illustrating a processing procedure of a controller command in the drive enclosure according to the Target Configuration Form 2 and the Cooperation System 1 of write IO processing.

When the duplication cancellation instruction unit 2305 of the storage controller 121 determines that the destaging conditions are satisfied (for example, the written amount of the duplication area is equal to or more than a threshold), the duplication cancellation instruction unit 2305 performs the processing of step 2600 and subsequent steps.

First, the duplication cancellation instruction unit 2305 determines a duplication cancellation target (step 2601). As a method of determining a duplication cancellation target, for example, a RAID stripe that is a duplication cancellation target is preferentially selected from the oldest writing time until the written amount of the duplication area becomes equal to or less than a threshold. Next, the subsequent processing is repeated until all duplication cancellation targets are canceled (step 2602).

Next, one RAID stripe in the primary area 2803 is selected as a target of duplication cancellation (step 2603). Next, the drive enclosure 200 is instructed to perform duplication cancellation of the selected RAID stripe, that is, parity generation and writing via the controller command communication unit (initiator) 2306 (step 2604).

Next, the controller command processing unit 2321 of the drive enclosure 200 waits for a response from the drive enclosure 200 (step 2605). Next, the controller command processing unit 2321 of the drive enclosure 200 receives a duplication cancellation instruction from the storage controller 121 via the controller command communication unit (target) 2319 and analyzes the instruction (step 2606). Next, the duplication cancellation processing unit 2323 reads data of the RAID stripe specified in the duplication cancellation instruction (step 2607).

Next, the parity of the read data is generated (step 2608). Next, the generated parity is written (step 2609). Next, the controller command processing unit 2321 creates a completion response of the duplication cancellation instruction and transmits the completion response to the storage controller 121 via the controller command communication unit (target) 2319 (step 2610).

Next, the duplication cancellation instruction unit 2305 receives the completion response from the drive enclosure 200 via the controller command communication unit (initiator) 2306 (step 2611). Next, the duplication information management unit 2311 releases the secondary area of the selected RAID stripe and updates the duplication information, and the logical-physical address management unit 2309 updates the state of the corresponding storage area 509 to the double writing cancellation state (step 2612). Next, If the repetition of step 2602 continues, the processing proceeds to step 2603. When the repetition of step 2602 is completed, finally, the processing ends (step 2613).

(28) Duplication Area and Parity-Generated Area in Drive Enclosure

Figure 28:
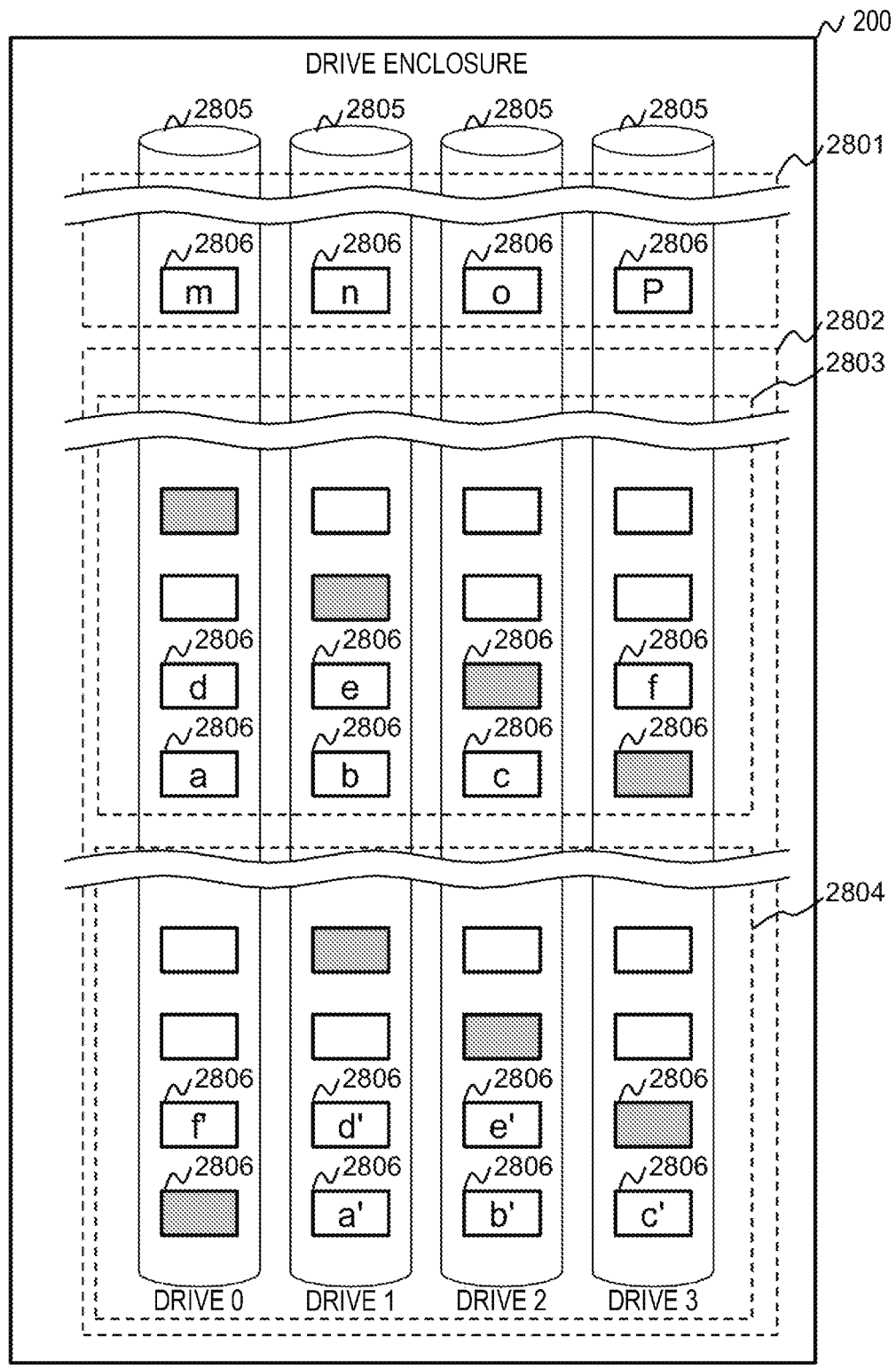
FIG. 28 is a diagram illustrating a duplication area and a parity-generated area in the drive enclosure of Example 5.

FIG. 28 is a diagram illustrating a duplication area and a parity-generated area in the drive enclosure.

The drive 2805 is the drive 218 that belongs to a RAID group in the drive enclosure. In the drawing, a RAID group having a RAID level of RAID 5, which consists of four drives, is illustrated as an example. The number of drives is not limited to four, and the RAID level is not limited to RAID 5. For example, the RAID group can be configured to have N+1 drives in RAID 5 (N data drives and 1 parity drive), N+2 drives in RAID 6 (N data drives and 2 parity drives), and the like.

The parity-generated area 2801 is configured from parity-generated parity cycles. In the drawing, "m", "n", "o", and "P" of the stripe 2806 are parity cycles. The stripe 2806 is a RAID stripe. The stripe "P" is a parity that is the redundant data of the stripes "m", "n", and "o" redundant.

The duplication area 2802 is a writing destination of the write data and includes the primary area 2803 and the secondary area 2804.

The primary area 2803 in the duplication area is configured from the stripes 2806 ("a" to "f") storing write data, the stripes 2806 (no description of characters) not written yet and storing no write data, and the stripes 2806 with no parity generated (hatched in gray and no description of characters).

The secondary area 2804 in the duplication area is a copy of the primary area 2803 and has the same configuration. In the drawing, in the stripes 2806 ("a" to "f"), the stripes 2806 ("a'" to "f'") correspond to the copy relationship. Each stripe corresponding to the copy relationship is arranged to be an area of a separate drive as a measure against user data loss due to a drive failure. For example, "a" of the stripes 2806 is located in drive 0, "a'" of the stripes 2806 is located in drive 1, which is shifted by one. As a result, even if one drive fails, at least one of the two pieces of duplicated user data remains, and therefore, user data loss can be prevented.

As a difference between the primary area 2803 and the secondary area 2804, the parity cycle of the primary area 2803 becomes the parity-generated area 2801 after parity generation, and the parity cycle of the secondary area 2904 is reused as the duplication area 2802 as a write data storage destination after parity generation.

The parity-generated area 2801 and the duplication area 2802 are logical management areas. Therefore, even if the area to which the stripe 2806 belongs is changed, only the management information (metadata) of the stripe 2806 is changed, and data migration that imposes an IO load on the drive is not performed.

In addition thereto, free space exists in the storage area of the drive belonging to the RAID group, but the illustration thereof is omitted. Also, two or more secondary areas 2804 may be provided depending on the level of data protection. For example, in order to achieve a level of data protection equivalent to RAID 6, that is, to prevent data loss even if there are two drive failures, two secondary areas 2804 are prepared.

(29) Correspondence Relationship Between Duplicate Areas in Drive Enclosure

Figure 29:
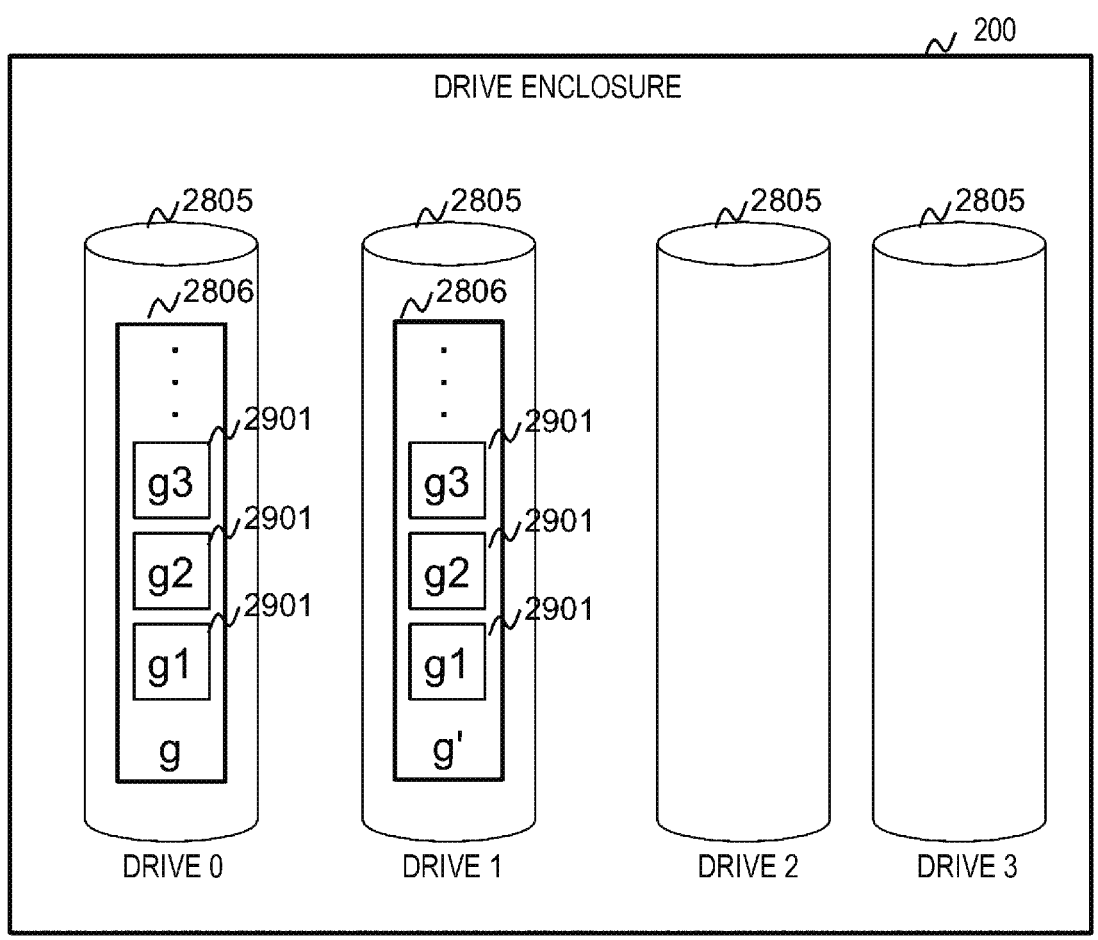
FIG. 29 is a diagram illustrating a correspondence relationship between double writing in the drive enclosure of Example 5.

FIG. 29 is a diagram illustrating a correspondence relationship between duplicate areas in the drive enclosure.

Writing of write data to the duplication areas is performed by subsequent write (also called log-structured write). The subsequent write is a method of sequentially writing received user data and excels at writing performance. The writing destination is the stripe 2806 of the primary area 2803 and the secondary area 2804 which are not written yet and do not store write data. In the drawing, the stripe of the primary area 2803 is indicated by a stripe 2806 "g" and the stripe of the secondary area is indicated by a stripe 2806 "g'". In the drawing, the descriptions other than the stripe 2806 "g" and the stripe 2806 "g'" are omitted. As described above, the stripe 2806 "g" and the stripe 2806 "g'" are in a copy relationship and are located in different drives. The drive double writing unit 2322 sequentially writes user data 2901 according to the write request of the host computer (in the drawing, "g1", "g2", and "g3"). When the stripes 2806 "g" and "g'" are filled with user data and cannot write any more user data, then the drive double writing unit 2322 move to the next stripe 2806 and continue writing.

According to Example 5, it is possible to reduce the processing load on the storage controller by the offload function of the drive enclosure and to reduce the processing load on the storage controller by performing double writing processing on the drive chassis in response to a write command while maintaining the data protection technology of the storage controller.

Example 6

Example 6 is an example of a form (Connection Form 2) in which the storage controller in Example 5 is connected to the other network than the network connected to the host computer. The Connection Form 2 is as described in Example 4.

The control method of the storage device 120 and the drive chassis 140 in Example 6 is the same as that of Example 5, and thus the description thereof is omitted.

Example 7

Example 7 and Example 5 are common in that the drive chassis operates as a target of NVMe over Fabrics with respect to the host computer instead of the storage controller, and the write data is directly transferred from the host computer to the drive chassis. On the other hand, Example 7 and Example 5 differ in where the writing destination of the write data is determined. Specifically, while the storage controller 121 determines the writing destination of write data and updates the mapping of logical-physical address in Example 5, Example 7 differs in that the drive enclosure 200 determines the writing destination of write data, and the storage controller 121 updates the mapping of logical-physical address based on the logical-physical address mapping notified by the drive enclosure 200. Example 7 does not require inquiring of the storage controller 121 about the writing destination of write data as compared with Example 5 and has an advantage that the response time of the write command processing can be shortened. On the other hand, in Example 7, in order to realize highly reliable storage processing in a low-reliable drive enclosure 200 in which control information is volatilized due to a failure such as power cuts, a mechanism is required to notify the storage controller of the subsequent write pointer. The identification names of the host computer and the NVM subsystem in NVMe over Fabrics are the same as in Example 5 as illustrated in FIG. 15, and thus the description thereof is omitted.

(30) Program Configuration of Host Computer, Storage Controller, and Drive Enclosure of System (Cooperation System 2 of Write IO Processing) in which Drive Enclosure Determines Writing Destination of Write Data in Method of Speeding Up of Write IO, in Form in which Drive Chassis Operates as Target of NVMe Over Fabrics with Respect to Host Computer Instead of Storage Controller (Target Configuration Form 2: Same as Example 3).

Figure 30:
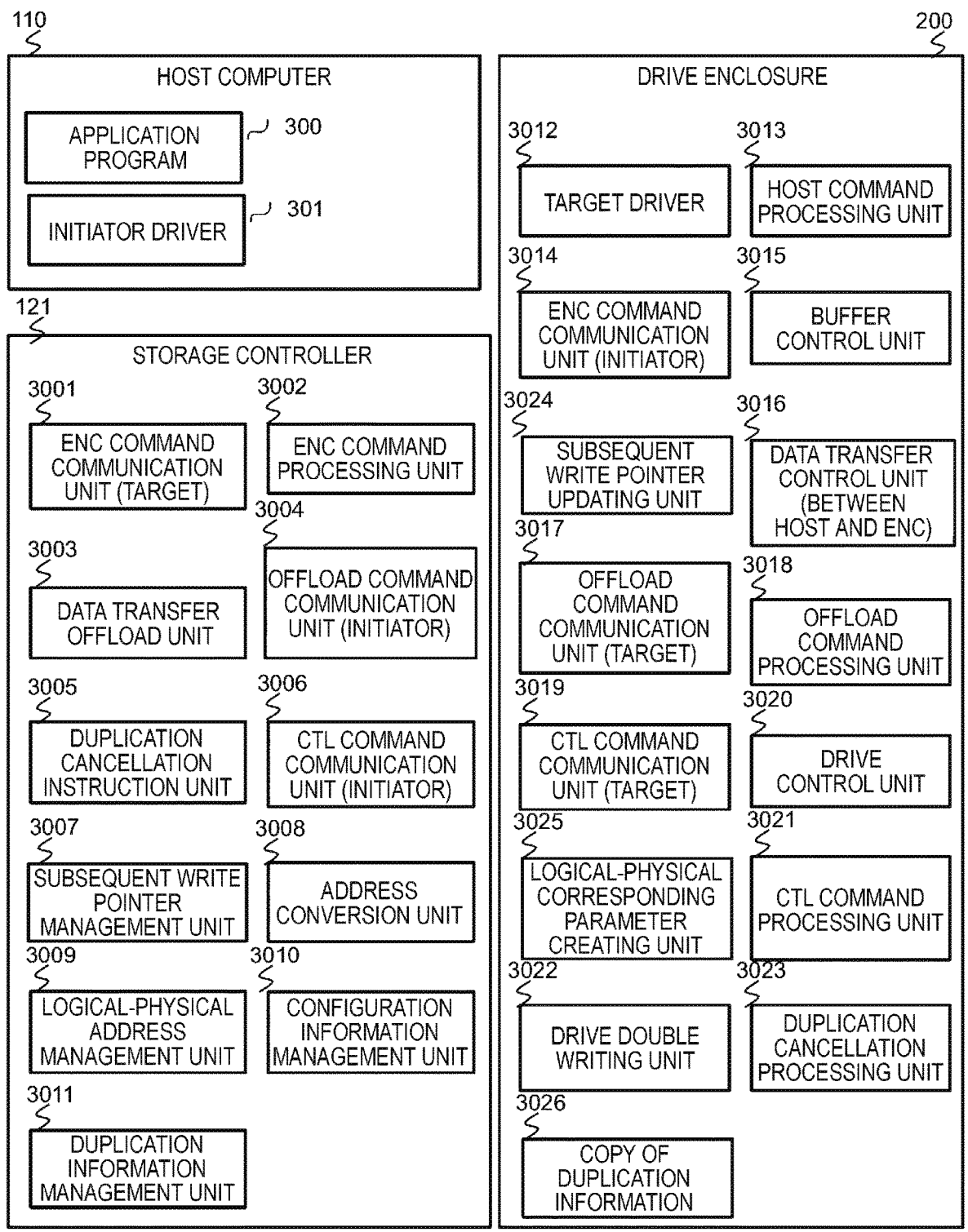
FIG. 30 is a configuration diagram of programs in a host computer, a storage controller, and a drive enclosure of Example 7.

FIG. 30 is a diagram illustrating a program configuration of a host computer, a storage controller, and a drive enclosure of a system (Cooperation System 2 of write IO processing) in which the drive enclosure determines the writing destination of write data in the method of speeding up of write IO, in a form in which the drive chassis operates as a target of NVMe over Fabrics with respect to the host computer instead of the storage controller.

The program of the storage controller 121 has parts in common with the components in FIG. 24, and differences will mainly be described. 3001 to 3006 and 2301 to 2306, and 3008 to 3011 and 2308 to 2311 are common components, respectively. The difference between FIG. 30 and FIG. 24 in the program of the storage controller 121 is that the writing destination address determination unit of FIG. 24 is eliminated and a subsequent write pointer management unit 3007 is added. The subsequent write pointer is a pointer indicating how far the subsequent write processing has progressed and is control information necessary for ensuring user data integrity, data recovery, and resuming of storage processing when a failure occurs in the drive enclosure. The subsequent write pointer management unit 3007 has a role of storing a copy of the subsequent write pointer with a reliable storage controller instead of the unreliable drive enclosure 200.

The program of the drive enclosure 200 has parts in common with the components in FIG. 24, and differences will be mainly described. Components 3012 to 3023 and components 2312 to 2323 are common components, respectively. The difference between FIG. 30 and FIG. 24 in the program of the drive enclosure 200 is that a subsequent write pointer updating unit 3024, a logical-physical corresponding parameter creating unit 3025, and a copy of duplication information 3026 are added. The subsequent write pointer updating unit 3024 has a role of updating the subsequent write pointer. The logical-physical corresponding parameter creating unit 3025 has a role of creating logical-physical corresponding parameters (information corresponding to an entry of the address conversion table) which are parameters for notifying the storage controller 121 of the correspondence relationship between the logical address of the write range of the logical volume specified by the write command, and the identifier and physical address of the drive as the double writing destination. The copy of the duplication information 3026 is a copy of duplication information managed by the duplication information management unit 3011 of the storage controller 121. By having a copy of the duplication information in the drive enclosure 200, it is possible to reduce the frequency of inquiring of the storage controller 121 about the duplication information in write command processing and to improve the processing efficiency.

Figure 31:
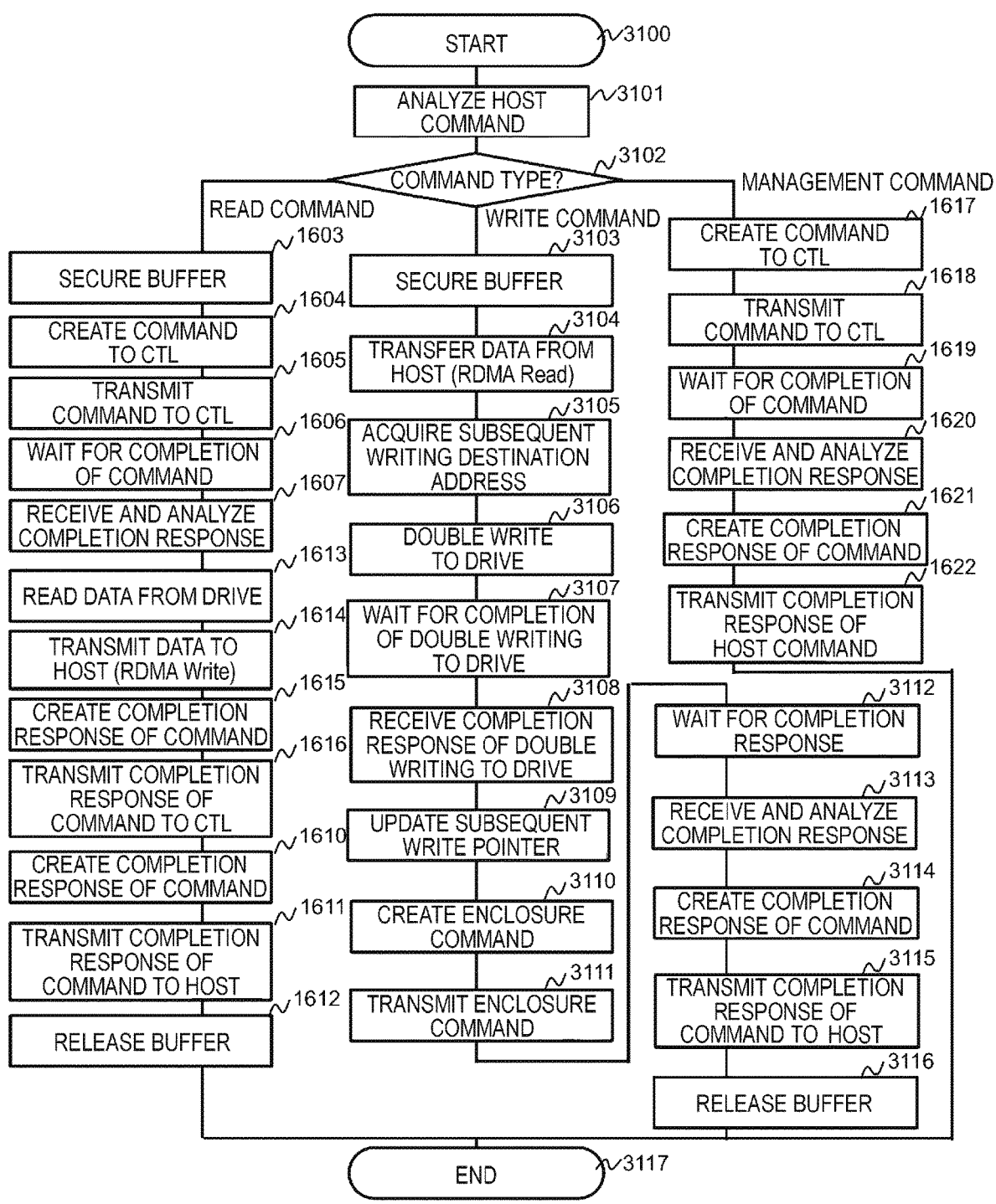
FIG. 31 is a flowchart illustrating a processing procedure of a host command in the drive enclosure of Example 7.

(31) Processing Procedure of Host Command in Drive Enclosure According to Target Configuration Form 2 and Cooperation System 2 of Write IO Processing FIG. 31 is a flowchart illustrating a processing procedure of a host command in the drive enclosure according to the Target Configuration Form 2 and the Cooperation System 2 of write IO processing. Since a part of the processing is common to the processing of FIG. 16, the step numbers in FIG. 16 are described for the common processing steps.

When the target driver 3012 of the drive enclosure 200 receives a command from the host computer 110, the host command processing unit 3013 starts the processing of step 3100 and subsequent steps.

First, the host command processing unit 3013 analyzes the received NVMe command (for the format of host command, refer to the format 910 in FIG. 9A) and reads the fields of command type 912, NID (namespace ID) 913 which is an identifier of the namespace, start address 914, and data transfer length 915 (step 3101).

Next, the processing branches depending on the command type (step 3102). If the command type is a read command, the processing proceeds to step 1603. If the command type is a write command, the processing proceeds to step 3103. If the command type is a management command, the processing proceeds to step 1617. The flow in the case where the command type is a read command in step 3102 will be described below.

When the processing branches to step 1603, the processing is the same as the processing in the case where the command type is a read command and the response type is offload in FIG. 16. Since the processing is the same, the subsequent description thereof is omitted.

Next, returning to the description of step 3102 and subsequent steps in the flowchart, the processing flow in the case where the command type is a write command will be described. When the processing branches from step 3102 to step 3103, the host command processing unit 2313 secures a buffer area for storing write data by using the buffer control unit 3015 (step 3103).

Next, the data transfer control unit (between the host computer and the drive enclosure) 3016 transfers the data of the physical memory area 503 in the host computer 110 specified by the write command to the secured buffer area (step 3104).

Next, the host command processing unit 3013 acquires a subsequent writing destination address (step 3105). The subsequent writing destination address is an address pointed to by the subsequent write pointer. Next, the drive double writing unit 3022 double-writes the write data in the buffer area to the writing destination address determined in step 3105 (step 3106).

Next, the drive double writing unit 3022 waits for completion of double writing, that is, completion of writing from the drive corresponding to the double writing destination (step 3107). Next, the drive double writing unit 2322 receives a completion response of double writing (step 3108).

Next, the subsequent write pointer updating unit 3024 updates the subsequent write pointer to the leading address of a next writing destination (step 3109). The subsequent write pointer is determined in accordance with the double writing method of FIGS. 28 and 29. Next, the logical-physical corresponding parameter creating unit 3025 creates the logical-physical corresponding parameters, and the host command processing unit 3013 creates an enclosure command including information on the received write command and the logical-physical corresponding parameters (step 3110).

Next, the host command processing unit 3013 transmits an enclosure command to the storage controller 121 via the enclosure command communication unit (initiator) 3014 (step 3111). Next, the host command processing unit 3013 waits for a completion response of the controller command (corresponding to the write command) from the storage controller 121 (step 3112). Next, the host command processing unit 3013 receives a completion response from the storage controller 121 via the enclosure command communication unit (initiator) 3014 and analyzes the completion response (step 3113).

Next, a completion response of the command corresponding to the write command from the host computer 110 is created (step 3114). Next, the command completion response is transmitted to the host computer 110 by using the target driver 3012 (step 3115). Next, the secured buffer area is released (step 3116). Finally, the processing ends (step 3117).

Next, returning to the description of step 2502 and subsequent steps in the flowchart, the processing flow in the case where the command type is a management command will be described. When the processing branches from step 3102 to step 1617, the processing is the same in the case where the command type is a management command in FIG. 16. Since the processing is the same, the subsequent description thereof is omitted.

Figure 32:
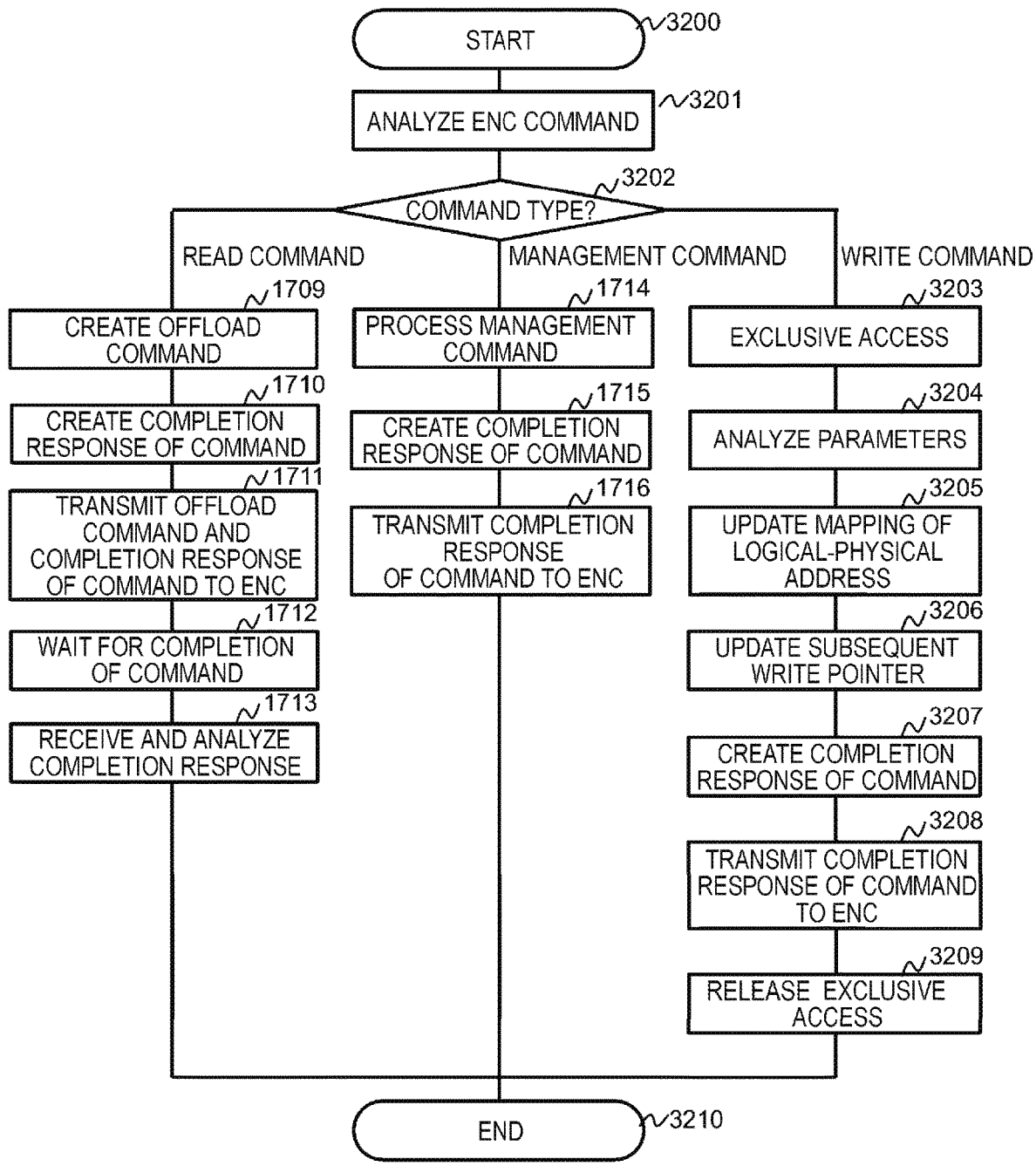
FIG. 32 is a flowchart illustrating a processing procedure of an enclosure command in the storage controller of Example 7.

(32) Processing Procedure of Enclosure Command in Storage Controller According to Target Configuration Form 2 and Cooperation System 2 of Write IO Processing FIG. 32 is a flowchart illustrating a processing procedure of an enclosure command in the storage controller according to the Target Configuration Form 2 and the Cooperation System 2 of write IO processing. Since a part of the processing is common to the processing of FIG. 17, the step numbers in FIG. 17 are described for the common processing steps.

When the enclosure command communication unit (target) 3001 of the storage controller 121 receives an enclosure command from the drive enclosure 200, the enclosure command processing unit 3002 starts the processing of step 3200 and subsequent steps.

First, the enclosure command processing unit 3002 analyzes the received enclosure command and reads the fields of command type, NID (namespace ID) which is an identifier of the namespace, start address, data transfer length (step 3201).

Next, the processing branches in the command type (step 3202). If the command type is a read command, the processing proceeds to step 1709. If the command type is a write command, the processing proceeds to step 3203. If the command type is a management command, the processing proceeds to step 1714.

When the processing branches to step 1709, the processing becomes the same as in the case of offload in FIG. 17. Since the processing is the same, the following description is omitted.

The flow in the case where the command type is a write command in step 3202 will be described below. When the processing branches to step 3203, the enclosure command processing unit 3002 performs exclusive access to the write range of the logical volume based on the identification name 403 obtained from the enclosure command communication unit (target) 3001, and the information of the NID, the start address and the data transfer length obtained in step 2301 (step 3203). The reason for exclusive access is to ensure data consistency even when a plurality of read and write commands that access the same logical address are received.

Next, the logical-physical corresponding parameters specified in the command, that is, the parameters of the drive and physical address as the double writing destination are analyzed (step 3204). Next, the address conversion unit 3008 updates the correspondence relationship (mapping of logical-physical address) of the address conversion table according to the result of the analyzed parameters (step 3205). Next, the subsequent write pointer managing unit 3007 updates the subsequent write pointer corresponding to the drive enclosure of the command issuing source according to the content of the subsequent write pointer specified in the command (step 3206). Next, the enclosure command processing unit 3002 creates a completion response of the enclosure command (step 3207).

Next, the enclosure command processing unit 3002 transmits a completion response to the drive enclosure 200 via the enclosure command communication unit (target) 3001 (step 3208). Next, the enclosure command processing unit 3002 releases exclusive access (step 3209). Finally, the processing ends (step 3210).

Next, returning to the description of step 3202 and subsequent steps in the flowchart, the processing flow in the case where the command type is a management command will be described. When the processing branches from step 3202 to step 1714, the processing is the same as in the case where the command type is a management command in FIG. 17. Since the processing is the same, the subsequent description thereof is omitted.

Example 8

Example 8 is an example of a form (Connection Form 2) in which the storage controller in Example 7 is connected to the other network than the network connected to the host computer. The Connection Form 2 is as described in Example 4.

The control method of the storage device 120 and the drive chassis 140 in Example 8 is the same as that of Example 7, and thus, the description thereof is omitted.

Example 9

Example 9 and Example 5 are common in that the storage controller determines the writing destination of write data. On the other hand, Example 9 differs from Example 5 in that the storage controller operates as a target of NVMe over Fabrics with respect to the host computer. The identification names of the host and the NVM subsystem in NVMe over Fabrics are the same as in Examples 1 and 2 as illustrated in FIG. 4, and thus, the description thereof is omitted.

(33) Program Configuration of Host Computer, Storage Controller, and Drive Enclosure of System (Cooperation System 1 of Write IO Processing) in which Storage Controller Determines Writing Destination of Write Data and Storage Controller is Inquired about Writing Destination of Data Write in Method of Speeding Up of Write IO in Form in which Storage Controller Operates as Target of NVMe Over Fabrics with Respect to Host Computer (Target Configuration Form 1: Same as Examples 1 and 2)

Figure 33:
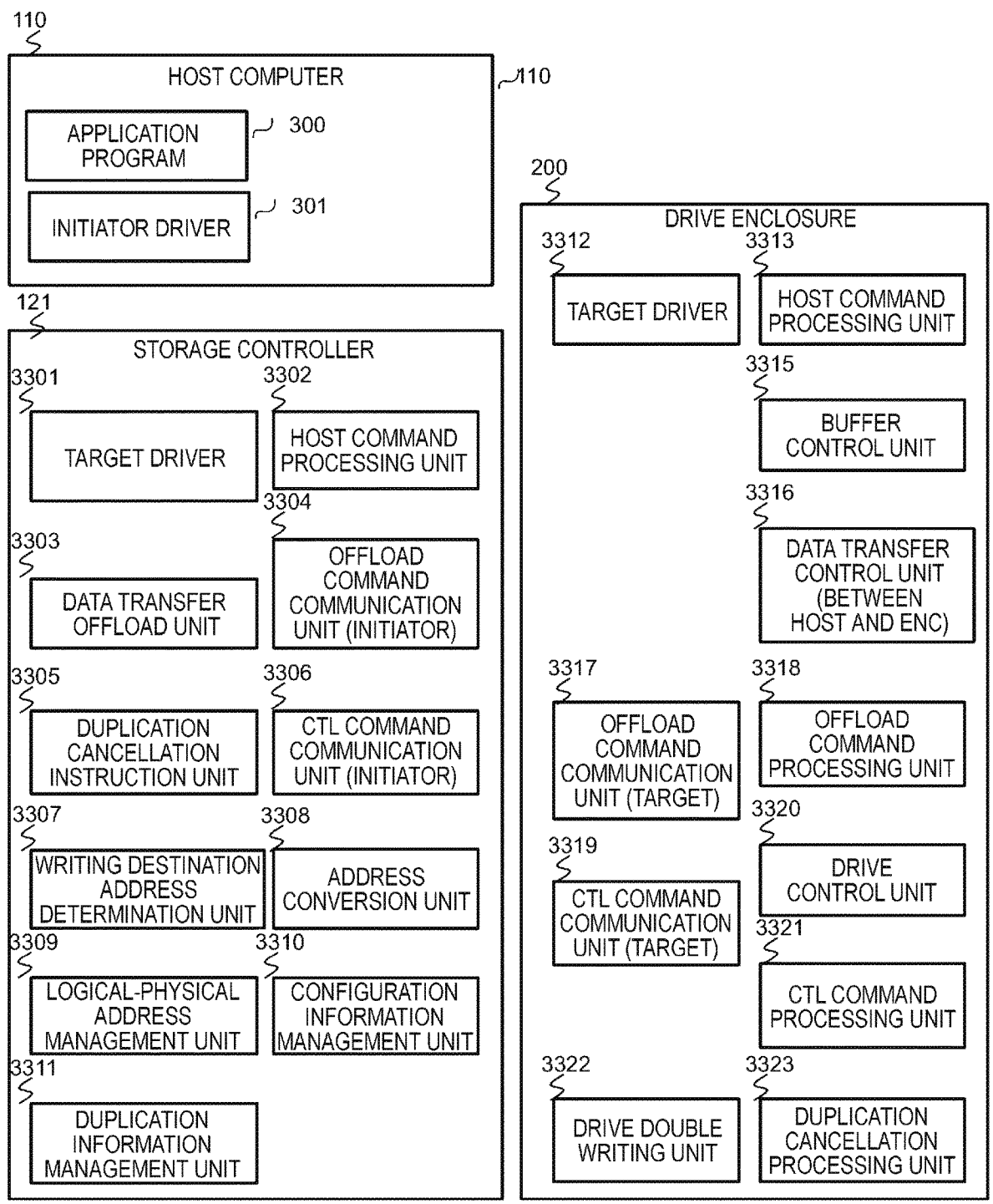
FIG. 33 is a configuration diagram of programs in a host computer, a storage controller, and a drive enclosure of Example 9.

FIG. 33 is a diagram illustrating a program configuration of a host computer, a storage controller, and a drive enclosure of a system in which the storage controller determines the writing destination of write data and the storage controller is inquired about the writing destination of write data (Cooperation System 1 of write IO processing) in the method of speeding up write IO, in a form in which the storage controller operates as a target of NVMe over Fabrics with respect to the host computer.

The program of the storage controller 121 has parts in common with the components in FIG. 24, and differences will mainly be described. 3303 to 3011 and 2303 to 2311 are common components, respectively. The difference between FIG. 33 and FIG. 24 in the program of the storage controller 121 is that the enclosure command communication unit (target) 2301 and the enclosure command processing unit 2302 in FIG. 24 are eliminated and a target driver 3301 and a host command processing unit 3302 are added.

The program of the drive enclosure 200 has parts in common with the components in FIG. 24, and differences will be mainly described. 3312 to 3323 and 2312 to 2323 (except for 2314) are common components, respectively. The difference between FIG. 33 and FIG. 24 in the program of the drive enclosure 200 is that the enclosure command communication unit (initiator) 2314 is eliminated.

Figure 34:
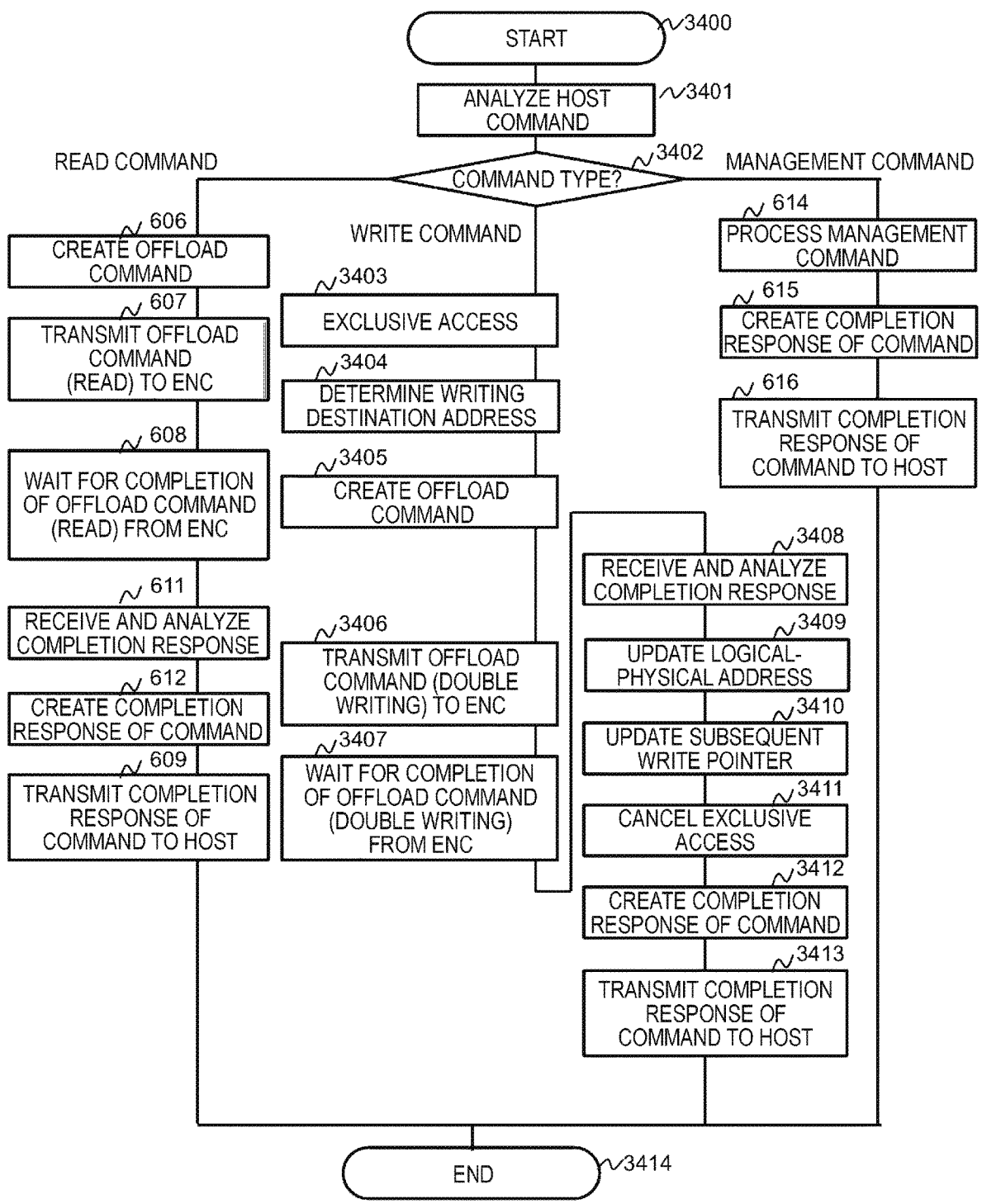
FIG. 34 is a flowchart illustrating a processing procedure of a host command in the storage controller of Example 9.

(34) Processing Procedure of Host Command in Storage Controller According to Target Configuration Form 1 and Cooperation System 1 of Write IO Processing FIG. 34 is a flowchart illustrating a processing procedure of the host command in the storage controller according to the Target Configuration Form 1 and the Cooperation System 1 of write IO processing. Since a part of the processing is common to the processing of FIG. 6, the step numbers in FIG. 6 are described for the common processing steps.

When the target driver 3301 of the storage controller 121 receives a command from the host computer 110, the host command processing unit 3302 starts the processing of step 3400 and subsequent steps.

First, the host command processing unit 3302 uses the information in the host information table 920 of the storage controller to obtain the identification name 923 (403 in FIG. 4) that is an NVM subsystem NQN (refer to FIG. 9B) and analyzes the received NVMe command (refer to FIG. 9A for the received NVMe command) to read the command type 912, the NID (namespace ID) 913 which is an identifier of the namespace, the start address 914, and the data transfer length 915 (step 3401).

Next, the processing branches depending on the command type (step 3402). If the command type 912 is a read command, the processing proceeds to step 606. If the command type is a management command, the processing proceeds to step 614. If the command type is a write command, the processing proceeds to step 3403.

When the processing branches to step 606, the processing is the same as the processing in the case where the command type is an IO command and the data transfer method is offload in FIG. 6. Since the processing is the same, the following description is omitted.

Next, returning to the description of step 3402 and subsequent steps in the flowchart, the processing flow in the case where the command type is a management command will be described. When the processing branches from step 3402 to step 614, the processing is the same as in the case where the command type is a management command in FIG. 6. Since the processing is the same, the subsequent description thereof is omitted.

Next, returning to the description of step 3402 and subsequent steps in the flowchart, the processing flow in the case where the command type is a write command will be described. When the processing branches from step 3402 to step 3403, the host command processing unit 3302 performs exclusive access to the write range of the logical volume based on the identification name 403 obtained from the target driver 3301, the information of the NID, the start address and the data transfer length obtained in step 2301 (step 3403).

Next, the writing destination address determination unit 3307 determines the writing destination address of the write data with reference to the address conversion table (step 3404). Next, the host command processing unit 3302 creates an offload command including the determined writing destination address to make the drive enclosure to process the write command (step 3405).

Next, the host command processing unit 3302 transmits the offload command to the drive enclosure 200 via an offload command communication unit (initiator) 3306 (step 3406). Next, the processing waits for the completion of the offload command (step 3407). Next, the host command processing unit 3302 receives a completion response of the offload command from the drive enclosure 200 via the offload command communication unit (initiator) 3306 and analyzes the completion response (step 3408).

Next, the address conversion unit 3308 updates the mapping of logical-physical address (updates the correspondence relationship in the address conversion table) (step 3409). That is, the identifier of the drive and the physical address as the double writing destination are mapped to the logical address of the write range of the logical volume specified by the write command. Next, the writing destination address determination unit 3307 updates the subsequent write pointer (step 3410). Next, the host command processing unit 3302 cancels exclusive access (step 3411).

Next, a completion response of the command corresponding to the write command from the host computer 110 is created (step 3412). Next, the command completion response is transmitted to the host computer 110 by using the target driver 3301 (step 3413). Finally, the processing ends (step 3414).

Figure 35:
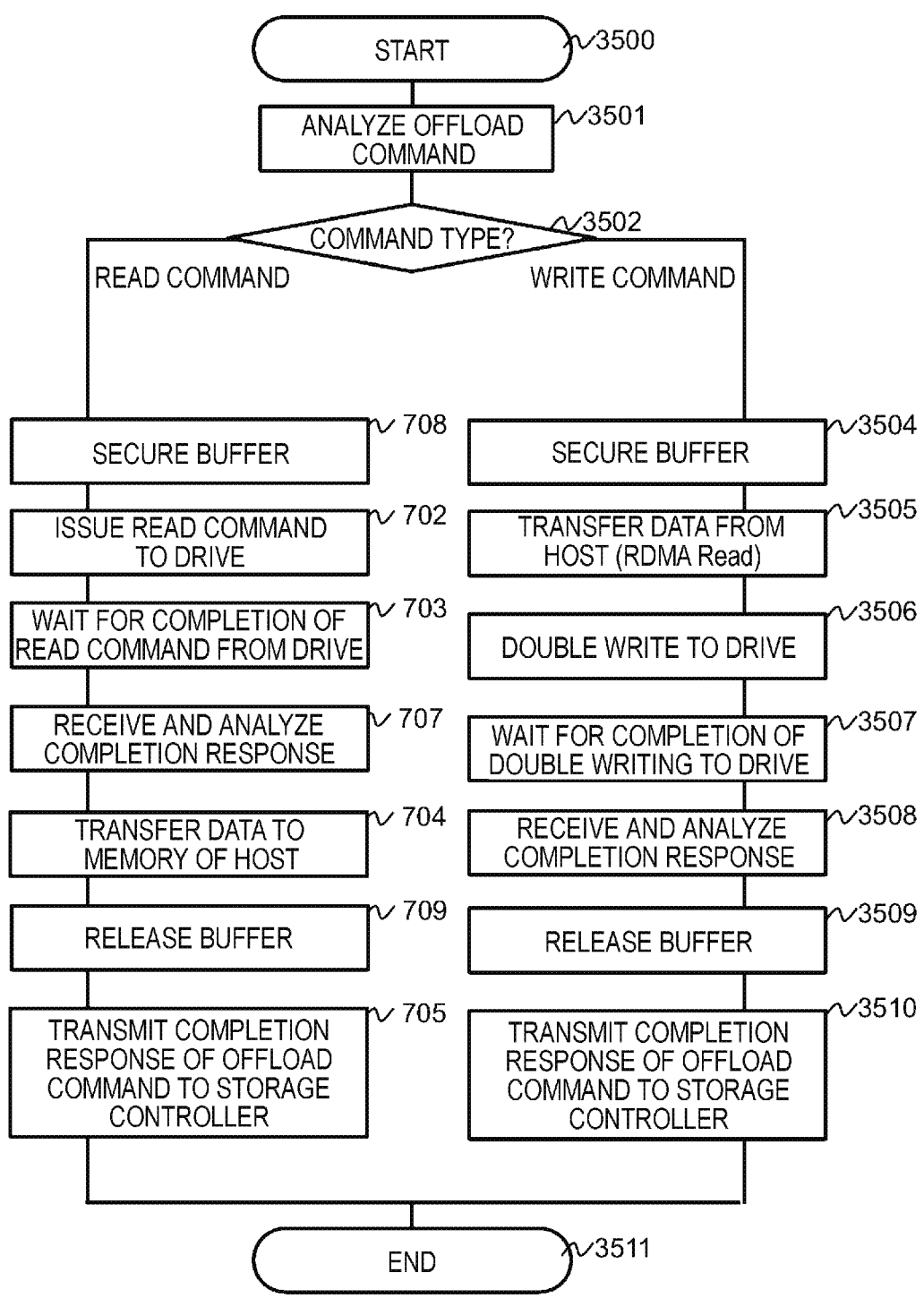
FIG. 35 is a flowchart illustrating a processing procedure of an offload command in the drive enclosure of Example 9.

(35) Processing Procedure of Data Transfer Offload Command in Drive Enclosure According to Target Configuration Form 1 and Cooperation System 1 of Write IO Processing FIG. 35 is a flowchart illustrating a processing procedure of an offload command of data transfer in the drive enclosure according to the Target Configuration Form 1 and the Cooperation System 1 of write IO processing. Since a part of the processing is common to the processing of FIG. 7, the step numbers in FIG. 7 are described for the common processing steps.

When receiving the offload command from the storage controller 121 via the offload command communication unit (target) 313, the offload command processing unit 3318 of the drive enclosure 200 starts the processing of step 3500 and subsequent steps.

First, the offload command processing unit 3318 reads each field of the offload command (step 3501). Each field is described in FIG. 9D.

Next, the processing branches depending on the command type (step 3502). If the data transfer direction 909 is from the storage system to the host computer, the command type is determined to be offload of the read command, and if the data transfer direction 909 is from the host computer to the storage system, the command type is determined as offload of the write command. If the command type is the offload of a read command, the processing proceeds to step 708. If the command type is the offload of a write command, the processing proceeds to step 3504.

If the processing branches to step 708, the processing becomes the same as the processing of step 708 and subsequent steps of FIG. 7. Since the processing is the same, the following description is omitted.

Next, returning to the description of step 3502 and subsequent steps in the flowchart, the processing flow in the case where the command type is offload of the write command will be described. When the processing branches from step 3502 to step 3504, the offload command processing unit 3318 secures a buffer by using a buffer control unit 3315 (step 3504). Next, the data transfer control unit (between the host computer and the drive enclosure) 3316 transfers the data of the physical memory area 503 in the host computer 110 specified by the write command to the secured buffer area (step 3505). Next, the drive double writing unit 3322 double-writes the write data in the buffer area to the writing destination address specified in the offload command (step 3506). Next, the drive double writing unit 3322 waits for a completion response of double writing, that is, completion of writing from the drive corresponding to the double writing destination (step 3507). Next, the drive double writing unit 2322 receives a completion response of double writing (step 3508). Next, the offload command processing unit 3318 releases the buffer secured in step 3504 (step 3509). Next, the offload command processing unit 3318 creates a completion response of the offload command and transmits the completion response (step 3510). Finally, the processing ends (step 3511).

What is claimed is:

1. A storage system comprising:
    at least one drive chassis having a storage unit; and
    a storage controller connected to the drive chassis, wherein
    the storage system is connected to a host computer; the drive chassis
    creates a logical volume having a specified identification name according to an instruction from the storage controller and provides the logical volume to the host computer as a storage area,
    receives a first command issued from the host computer to the drive chassis providing the logical volume, and
    transmits a second command corresponding to the first command to the storage controller;
    the storage controller transmits a response to the second command to the drive chassis;
    the drive chassis transmits a response to the first command to the host computer according to the response to the second command when receiving the response to the second command from the storage controller; and
    the logical volume corresponds to a data storage area protected by the storage controller;
    wherein the storage controller manages an address conversion table, in which a logical address of the logical volume managed by the storage controller is associated with a physical address of the storage unit,
    when receiving the second command, the storage controller sets a physical address for storing write target data and transmits the physical address to the drive chassis as a response to the second command, and
    the storage controller updates the address conversion table based on the logical address included in the second command and the set physical address.

2. The storage system according to claim 1, wherein
    the first command is a first read command,
    the second command is a second read command,
    the storage controller creates data transfer parameters used for data transfer of a logical address range of the logical volume specified by the second read command and transmits the parameters to the drive chassis, and
    the drive chassis reads data from the storage unit according to the data transfer parameters when receiving the data transfer parameters from the storage controller, transfers the data to the host computer, and transmits the response.

3. The storage system according to claim 2, wherein
    the first read command includes information on a command type, and a start address and a data transfer length in the logical volume, and
    the second read command includes a command type for the first read command, a start address in the logical volume as a target of a read command, a data transfer length, an identifier of the host computer as a read command issuing source, an identifier of a drive chassis that has received the first read command, and a memory address of a data storage destination of the host computer.

4. The storage system according to claim 2, wherein
    if data corresponding to the address range of the logical volume specified in the second read command is not on a cache of the storage controller, the storage controller creates the data transfer parameters used for data transfer of the address range of the logical volume specified in the second read command and transmits the data transfer parameters to the drive chassis, and
    if data corresponding to the address range of the logical volume specified in the second read command is on a cache of the storage controller, the storage controller uses data on the cache as data to be transmitted to the host computer.

5. The storage system according to claim 4, wherein
    if data corresponding to the address range of the logical volume specified in the second read command is on a cache of the storage controller, the storage controller transmits data on the cache to the drive chassis, and
    the drive chassis transfers the data received from the storage controller to the host computer.

6. The storage system according to claim 2, wherein
the storage controller generates the data transfer parameters from the logical address of the logical volume specified in the first read command, based on an address conversion table that manages correspondence between a logical address of the logical volume and a physical address of the storage unit that constitutes the logical volume.

7. The storage system according to claim 4, wherein
the data transfer parameters include an identifier of the host computer, information such as a memory address of a data storage destination of the host computer, an identifier of the storage unit and an address in the storage unit of a data storage destination, and a data transfer length.

8. The storage system according to claim 2, wherein
the storage controller manages a correspondence relationship between a logical address of the logical volume managed by the storage controller and a physical address of the storage unit and converts the logical address of the data range included in the first read command and the second read command into a physical address of the corresponding storage area to include the physical address in the data transfer parameters.

9. The storage system according to claim 1, further comprising a network which includes a first network connecting the host computer and the drive chassis, and a second network connecting the drive chassis and the storage controller.

10. The storage system according to claim 1, wherein
when receiving a write command from the host computer, the drive chassis transfers the write command to the storage controller, and
when receiving a message indicating that the storage controller is ready for writing, the drive chassis transfers write data of the write command to the storage controller.

11. The storage system according to claim 1, wherein
the first command is a first write command and includes information on a command type, and a start address and a data transfer length in the logical volume,
the second command is a second write command and includes a logical address of data related to the first write command, and
the drive chassis stores the data corresponding to the first write command in the storage unit.

12. The storage system according to claim 11, wherein
the drive chassis performs first redundancy to store a plurality of pieces of write target data by using a plurality of drives.

13. The storage system according to claim 12, wherein
the first redundancy is performed before the response to the first write command to the host computer, and
after the response, redundant data of the data to be written is created and stored, and second redundancy is performed to reduce the number of the plurality pieces of stored write target data.

14. The storage system according to claim 11, wherein
the storage controller updates the address conversion table after receiving a notification of completion of write processing for the write target data from the drive chassis.

15. The storage system according to claim 14, wherein
the storage controller reports completion of the update of the address conversion table to the drive chassis, and the drive chassis transmits a response to the first write command to the host computer when receiving the completion of the update of the address conversion table.

16. The storage system according to claim 11, wherein
the second write command includes a command type for the first write command, a start address in the logical volume as a target of a write command, a data transfer length, an identifier of the host computer as the read command issuing source, an identifier of a drive chassis that has received the first write command, and a memory address of a data storage destination of the host computer.

17. A storage system comprising:
at least one drive chassis having a storage unit and a storage controller connected to the drive chassis, wherein
the storage system is connected to a host computer;
the drive chassis creates a logical volume having a specified identification name according to an instruction from the storage controller and provides the logical volume to the host computer as a storage area,
receives a first command issued from the host computer to the drive chassis providing the logical volume, and
transmits a second command corresponding to the first command to the storage controller;
the storage controller transmits a response to the second command to the drive chassis;
the drive chassis transmits a response to the first command to the host computer according to the response to the second command when receiving the response to the second command from the storage controller; and
the logical volume corresponds to a data storage area protected by the storage controller; wherein
the storage controller manages the address conversion table, in which a logical address of the logical volume managed by the storage controller is associated with a physical address of the storage device,
the drive chassis
sets a physical address for storing write target data, and transmits the second command including the set physical address and a logical address of data related to the first write command to the storage controller, and
the storage controller updates the address conversion table based on the logical address and the physical address included in the received second command.

18. A data transfer method of a storage system including at least one drive chassis having a storage unit and a storage controller connected to the drive chassis, the storage system being connected to a host computer, wherein
the drive chassis
creates a logical volume having a specified identification name according to an instruction from the storage controller and provides the logical volume to the host computer as a storage area,
receives a first command issued from the host computer to the drive chassis providing the logical volume, and
transmits a second command corresponding to the first command to the storage controller;
the storage controller transmits a response to the second command to the drive chassis;
the drive chassis transmits a response to the first command to the host computer according to the response to the second command when receiving the response to the second command from the storage controller; and
the logical volume corresponds to a data storage area protected by the storage controller;

wherein the storage controller manages an address conversion table, in which a logical address of the logical volume managed by the storage controller is associated with a physical address of the storage unit, when receiving the second command, the storage controller sets a physical address for storing write target data and transmits the physical address to the drive chassis as a response to the second command, and the storage controller updates the address conversion table based on the logical address included in the second command and the set physical address.

19. A data transfer method of a storage system including at least one drive chassis having a storage unit and a storage controller connected to the drive chassis, the storage system being connected to a host computer, wherein the drive chassis creates a logical volume having a specified identification name according to an instruction from the storage controller and provides the logical volume to the host computer as a storage area, receives a first command issued from the host computer to the drive chassis providing the logical volume, and transmits a second command corresponding to the first command to the storage controller;

the storage controller transmits a response to the second command to the drive chassis;

the drive chassis transmits a response to the first command to the host computer according to the response to the second command when receiving the response to the second command from the storage controller; and the logical volume corresponds to a data storage area protected by the storage controller; wherein the storage controller manages the address conversion table, in which a logical address of the logical volume managed by the storage controller is associated with a physical address of the storage device, the drive chassis sets a physical address for storing write target data, and transmits the second command including the set physical address and a logical address of data related to the first write command to the storage controller, and the storage controller updates the address conversion table based on the logical address and the physical address included in the received second command.

* * * * *